United States Patent
Ikeda

(10) Patent No.: US 10,965,943 B2
(45) Date of Patent: Mar. 30, 2021

(54) IMAGE PROCESSING APPARATUS AND IMAGE PROCESSING METHOD

(71) Applicant: SONY CORPORATION, Tokyo (JP)

(72) Inventor: Masaru Ikeda, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/468,169

(22) PCT Filed: Nov. 30, 2017

(86) PCT No.: PCT/JP2017/043005
§ 371 (c)(1),
(2) Date: Jun. 10, 2019

(87) PCT Pub. No.: WO2018/123423
PCT Pub. Date: Jul. 5, 2018

(65) Prior Publication Data
US 2020/0014921 A1 Jan. 9, 2020

(30) Foreign Application Priority Data
Dec. 28, 2016 (JP) .............................. JP2016-256930

(51) Int. Cl.
H04N 19/86 (2014.01)
H04N 19/117 (2014.01)
(Continued)

(52) U.S. Cl.
CPC ......... *H04N 19/117* (2014.11); *H04N 19/136* (2014.11); *H04N 19/176* (2014.11); *H04N 19/182* (2014.11); *H04N 19/86* (2014.11)

(58) Field of Classification Search
None
See application file for complete search history.

(56) References Cited

U.S. PATENT DOCUMENTS

| 7,778,480 B2* | 8/2010 | Huang | G06T 5/002 |
| | | | 358/426.01 |
| 8,369,404 B2* | 2/2013 | Sekiguchi | H04N 19/70 |
| | | | 375/240.14 |

(Continued)

FOREIGN PATENT DOCUMENTS

JP S61-121589 A 6/1986
JP 2010-141883 A 6/2010
(Continued)

OTHER PUBLICATIONS

Chen et al., Algorithm Description of Joint Exploration Test Model 4, Joint Video Exploration Team (JVET) of ITU-T SG 16 WP 3 and ISO/IEC JTC 1/SC 29/WG 11, Oct. 15-21, 2016, pp. 1-36, 4th Meeting: Chengdu, CN.

(Continued)

*Primary Examiner* — Mohammad J Rahman
(74) *Attorney, Agent, or Firm* — Paratas Law Group, PLLC

(57) ABSTRACT

There is provided an image processing apparatus and an image processing method, the image processing apparatus including: a decoding section configured to decode an encoded stream to generate a decoded image; a determination section configured to determine whether to apply an extended strong filter, which is applied in an extended application range in which an application range of a deblocking filter is extended, to pixels positioned near a block boundary of the decoded image generated by the decoding section, in accordance with a state of pixels included in the extended application range; and a filtering section configured to apply the extended strong filter to pixels for which the determination section determines to apply the extended strong filter.

14 Claims, 31 Drawing Sheets

(51) Int. Cl.
*H04N 19/136* (2014.01)
*H04N 19/176* (2014.01)
*H04N 19/182* (2014.01)

(56) References Cited

U.S. PATENT DOCUMENTS

| | | | |
|---|---|---|---|
| 8,917,778 B2* | 12/2014 | Sakurai | H04N 5/21 375/240.26 |
| 9,313,499 B2* | 4/2016 | Narroschke | H04N 19/82 |
| 9,591,306 B2* | 3/2017 | Wedi | H04N 19/139 |
| 10,116,932 B2* | 10/2018 | Ikai | H04N 19/176 |
| 2003/0058944 A1* | 3/2003 | MacInnis | H04N 19/176 375/240.13 |
| 2006/0104349 A1* | 5/2006 | Joch | H04N 19/86 375/240.03 |
| 2008/0101720 A1* | 5/2008 | Wang | H04N 19/176 382/275 |
| 2009/0196342 A1* | 8/2009 | Divorra Escoda | H04N 19/50 375/240.02 |
| 2010/0142623 A1* | 6/2010 | Vaduganathan | H04N 19/42 375/240.25 |
| 2010/0142844 A1* | 6/2010 | Pereira | H04N 19/117 382/261 |
| 2013/0058401 A1* | 3/2013 | Song | H04N 19/865 375/240.03 |
| 2013/0182764 A1* | 7/2013 | Narroschke | H04N 19/82 375/240.12 |
| 2013/0182779 A1* | 7/2013 | Lim | H04N 19/597 375/240.29 |
| 2013/0287124 A1* | 10/2013 | Norkin | H04N 19/124 375/240.29 |
| 2013/0294524 A1* | 11/2013 | Van der Auwera | H04N 19/70 375/240.18 |
| 2013/0294705 A1* | 11/2013 | Kondo | G06T 5/001 382/238 |
| 2013/0322548 A1* | 12/2013 | Narroschke | H04N 19/80 375/240.24 |
| 2013/0329814 A1* | 12/2013 | Norkin | H04N 19/176 375/240.29 |
| 2013/0343456 A1* | 12/2013 | Narroschke | H04N 19/82 375/240.03 |
| 2014/0056350 A1* | 2/2014 | Wedi | H04N 19/105 375/240.12 |
| 2014/0192892 A1* | 7/2014 | Van der Auwera | H04N 19/176 375/240.24 |
| 2014/0204999 A1* | 7/2014 | Park | H04N 19/134 375/240.02 |
| 2014/0321552 A1* | 10/2014 | He | H04N 19/50 375/240.16 |
| 2014/0369428 A1* | 12/2014 | Park | H04N 19/82 375/240.29 |
| 2015/0063471 A1* | 3/2015 | Zhu | G06F 3/1454 375/240.29 |
| 2017/0289544 A1* | 10/2017 | Lu | H04N 19/117 |

FOREIGN PATENT DOCUMENTS

| | | |
|---|---|---|
| WO | WO 2005/117447 A2 | 12/2005 |
| WO | WO 2011/145601 A1 | 11/2011 |

OTHER PUBLICATIONS

Kawamura et al., Extended deblocking-filter decision for large block boundary, Joint Video Exploration Team (JVET) of ITU-T SG 16 WP 3 and ISO/IEC JTC 1/SC 29/WG 11, Oct. 15-21, 2016, pp. 1-3, 4th Meeting: Chengdu, CN.

ITU, High efficiency video coding, Series H: Audiovisual and Multimedia Systems Infrastructure of audiovisual services—Coding of moving video, ITU-T Recommendation H.265, Apr. 2015, pp. 1-610.

Rosewarne et al., High Efficiency Video Coding (HEVC) Test Model 16 (HM16) Improved Encoder Description Update 6, Joint Collaborative Team on Video Coding (JCT-VC) of ITU-T SG16 WP3 and ISO/IEC JTC1/SC29/WG11, May 26-Jun. 1, 2016, pp. 1-9, 24th Meeting: Geneva, CH.

Nov. 25, 2019, European Search Report issued for related EP Application No. 17887327.9.

Norkin et al., Description of CE12: deblocking filtering, Joint Collaborative Team on Video Coding (JCT-VC) of ITU-T SG16 WP3 and ISO/IEC JTC1/SC29/WG 11, 6th Meeting, Jul. 14-22, 2011, pp. 1-15, Torino, IT.

* cited by examiner

IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2017/043005 (filed on Nov. 30, 2017) under 35 U.S.C. § 371, which claims priority to Japanese Patent Application No. 2016-256930 (filed on Dec. 28, 2016), which are all hereby incorporated by reference in their entirety.

TECHNICAL FIELD

The present disclosure relates to an image processing apparatus and an image processing method.

BACKGROUND ART

In H.265/HEVC, one of the standard image coding scheme specifications, to restrain degradations in image quality caused by blocking artifacts that occur during image coding, a deblocking filter is applied to the block boundaries for example (see Non-Patent Literature 1). A deblocking filter includes a strong filter and a weak filter, and a determination formula for each filter is used on a block boundary to determine which filter to apply.

Also, currently, for the purpose of improving the coding efficiency further over H.265/HEVC, the standards work of a next-generation image coding scheme called Future Video Coding (FVC) is being carried out by the Joint Video Exploration Team (JVET), a joint standards body of ITU-T and ISO/IEC (for example, see Non-Patent Literature 2).

In the FVC standards work, Non-Patent Literature 3 below proposes applying a deblocking filter over a wider range of application than the strong filter in H.265/HEVC. With the technique proposed in Non-Patent Literature 3, by setting the range of filter application from 3 pixels to 7 pixels positioned near a block boundary, it is possible to apply a stronger filter.

CITATION LIST

Non-Patent Literature

Non-Patent Literature 1: Recommendation ITU-T H.265, (04/2015) "High efficiency video coding", April 2015

Non-Patent Literature 2: J. Chen, E. Alshina, G. J. Sullivan, J.-R, Ohm. J. Boyce, "Algorithm Description of Joint Exploration Test Model 4", JVET-D1001_v3, Joint Video Exploration Team (JVET) of ITU-T SG 16 WP 3 and ISO/IEC JTC 1/SC 29/WG 11 4th Meeting: Chengdu, CN, 15-21 Oct. 2016

Non-Patent Literature 3: K. Kawamura, S. Naito, "Extended deblocking-filter decision for large block boundary", JVET-D0047, Joint Video Exploration Team (JVET) of ITU-T SG 16 WP 3 and ISO/IEC: JTC 1/SC 29/WG 11 4th Meeting: Chengdu, CN, 15-21 Oct. 2016

DISCLOSURE OF INVENTION

Technical Problem

However, with the filter determination method of the related art, there is a risk that an inappropriate filter will be applied. For example, in some cases, the strong filter is applied excessively, and the peak signal-to-noise ratio (PSNR) is lowered greatly by the application of the deblocking filter.

The present disclosure has been devised in light of such circumstances, and makes it possible to apply a more appropriate filter in the deblocking filter process.

Solution to Problem

According to the present disclosure, there is provided an image processing apparatus including: a decoding section configured to decode an encoded stream to generate a decoded image; a determination section configured to determine whether to apply an extended strong filter, which is applied in an extended application range in which an application range of a deblocking filter is extended, to pixels positioned near a block boundary of the decoded image generated by the decoding section, in accordance with a state of pixels included in the extended application range; and a filtering section configured to apply the extended strong filter to pixels for which the determination section determines to apply the extended strong filter.

In addition, according to the present disclosure, there is provided an image processing method including: decoding an encoded stream to generate a decoded image; determining whether to apply an extended strong filter, which is applied in an extended application range in which an application range of a deblocking filter is extended, to pixels positioned near a block boundary of the generated decoded image, in accordance with a state of pixels included in the extended application range; and applying the extended strong filter to pixels for which it is determined to apply the extended strong filter.

In addition, according to the present disclosure, there is provided an image processing apparatus including: a determination section configured to determine whether to apply an extended strong filter, which is applied in an extended application range in which an application range of a deblocking filter applied to pixels positioned near a block boundary of a locally-decoded decoded image is extended, to pixels positioned near the block boundary of the decoded image, in accordance with a state of pixels included in the extended application range; a filtering section configured to apply the extended strong filter to pixels for which the determination section determines to apply the extended strong filter; and an encoding section configured to encode an image using the decoded image to which the filtering section has applied the extended strong filter.

In addition, according to the present disclosure, there is provided an image processing method including: determining whether to apply an extended strong filter, which is applied in an extended application range in which an application range of a deblocking filter applied to pixels positioned near a block boundary of a locally-decoded decoded image is extended, to pixels positioned near the block boundary of the decoded image, in accordance with a state of pixels included in the extended application range; applying the extended strong filter to pixels for which it is determined to apply the extended strong filter; and encoding an image using the decoded image to which the extended strong filter has been applied.

Advantageous Effects of Invention

According to the present disclosure as described above, it is possible to apply a more appropriate filter in the deblocking filter process.

MODE(S) FOR CARRYING OUT THE INVENTION

Figure 1:
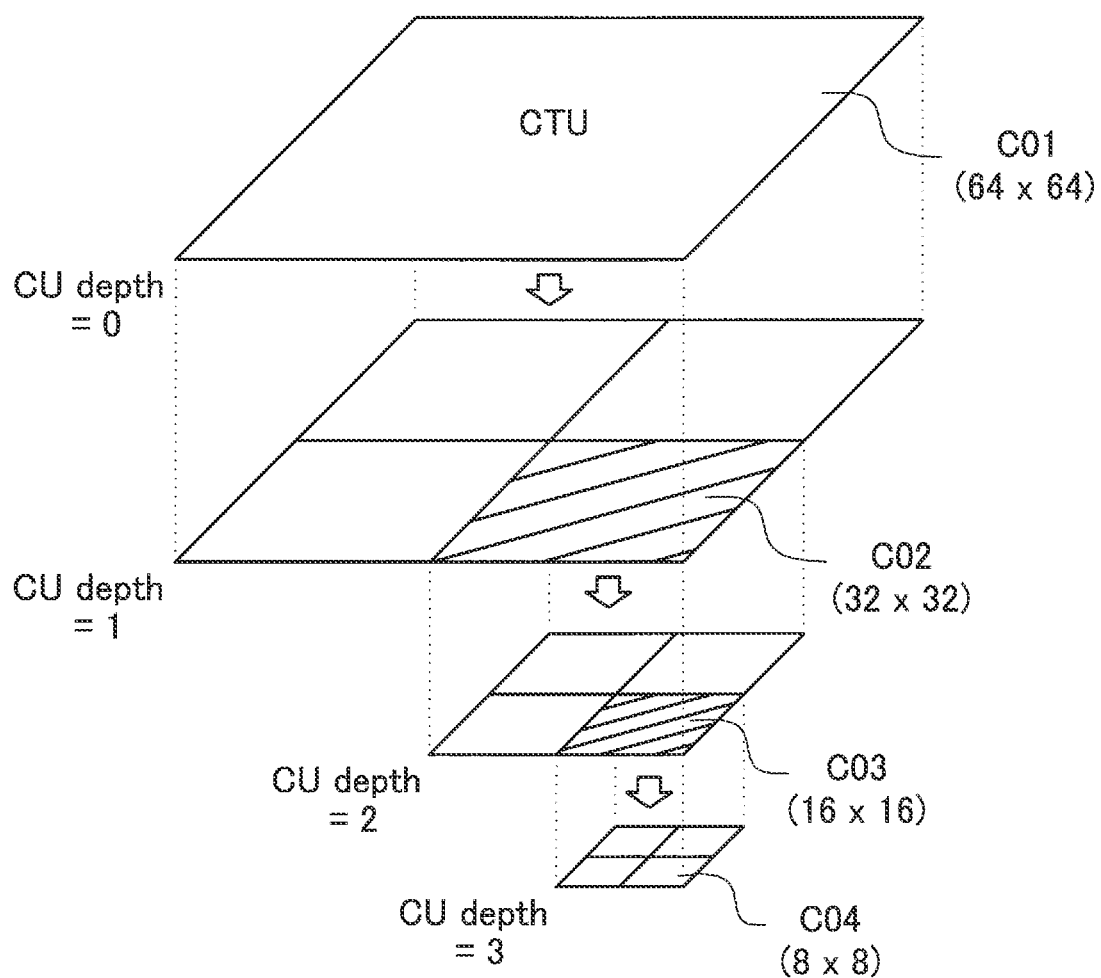
FIG. 1 is an explanatory diagram for explaining an overview of recursive block partitioning for CUs in HEVC.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Hereinafter, the description will proceed in the following order.

1. Background
1-1. Block structure
1-2. Existing deblocking filter
2. Overview of apparatus
2-1. image coding apparatus
2-2. Image decoding apparatus
3. First example
3-1. Exemplary configuration of deblocking filter
3-2. Process flow
3-3. Modifications
4. Second example
4-1. Exemplary configuration of de blocking filter
4-2. Process flow
4-3. Modifications
5. Exemplary hardware configuration
6. Application example
7. Conclusion

1. Background

[1-1. Block Structure]

With older image coding schemes such as MPEG-2 or H.264/AVC, a coding process is executed in processing units called macroblocks. Macroblocks are blocks having a uniform size of 16×16 pixels. Conversely, with HEVC, a coding process is executed in processing units called coding units (CUs). CUs are blocks having a variable size, formed by recursively partitioning a coding tree unit (CTU). The maximum selectable CU size is 64×64 pixels. The minimum selectable CU size is 8×8 pixels.

As a result of implementing CUs having a variable size, with HEVC it is possible to adaptively adjust image quality and coding efficiency according to image content. A prediction process for predictive coding is executed in processing units called prediction units (PUs). PUs are formed by partitioning a CU according to one of several partitioning patterns. Furthermore, an orthogonal transform process is executed in processing units called transform units (TUs). TUs are formed by partitioning a CU or a PU down to a certain depth.

FIG. 1 is an explanatory diagram for explaining an overview of recursive block partitioning for CUs in HEVC. CU block partitioning is performed by recursively repeating the partitioning of a single block into 4(=2×2) sub-blocks, and a tree structure having a quadtree shape is formed as a result. One entire quadtree is called a coding tree block (CTB), and the logical unit corresponding to a CTB is called a CTU. In the upper part of FIG. 1, as one example, a CU C01 having a size of 64×64 pixels is illustrated. The partitioning depth of the CU C01 is equal to zero. This means that the CU C01 corresponds to the root of the CTU. The size of the CTU or CTB may be designated by a parameter encoded in a sequence parameter set (SPS). A CU C02 is one of four CUs partitioned from the CU C01, and has a size of 32/32 pixels. The partitioning depth of the CU C02 is equal to 1. A CU C03 is one of four CUs partitioned from the CU C02, and has a size of 16×16 pixels. The partitioning depth of the CU C03 is equal to 2. A CU C04 is one of four CUs partitioned from the CU C03, and has a size of 8×8 pixels. The partitioning depth of the CU C04 is equal to 3. In this way, CUs are formed by recursively partitioning an image to be coded. The partitioning depth is variable. For example, in a flat image region such as a blue sky, CUs of larger size (that is, smaller depth) may be set. On the other hand, in a steep image region including many edges. CUs of smaller size (that is, greater depth) may be set. Additionally, the set CUs become the processing units of the coding process.

Figure 2:
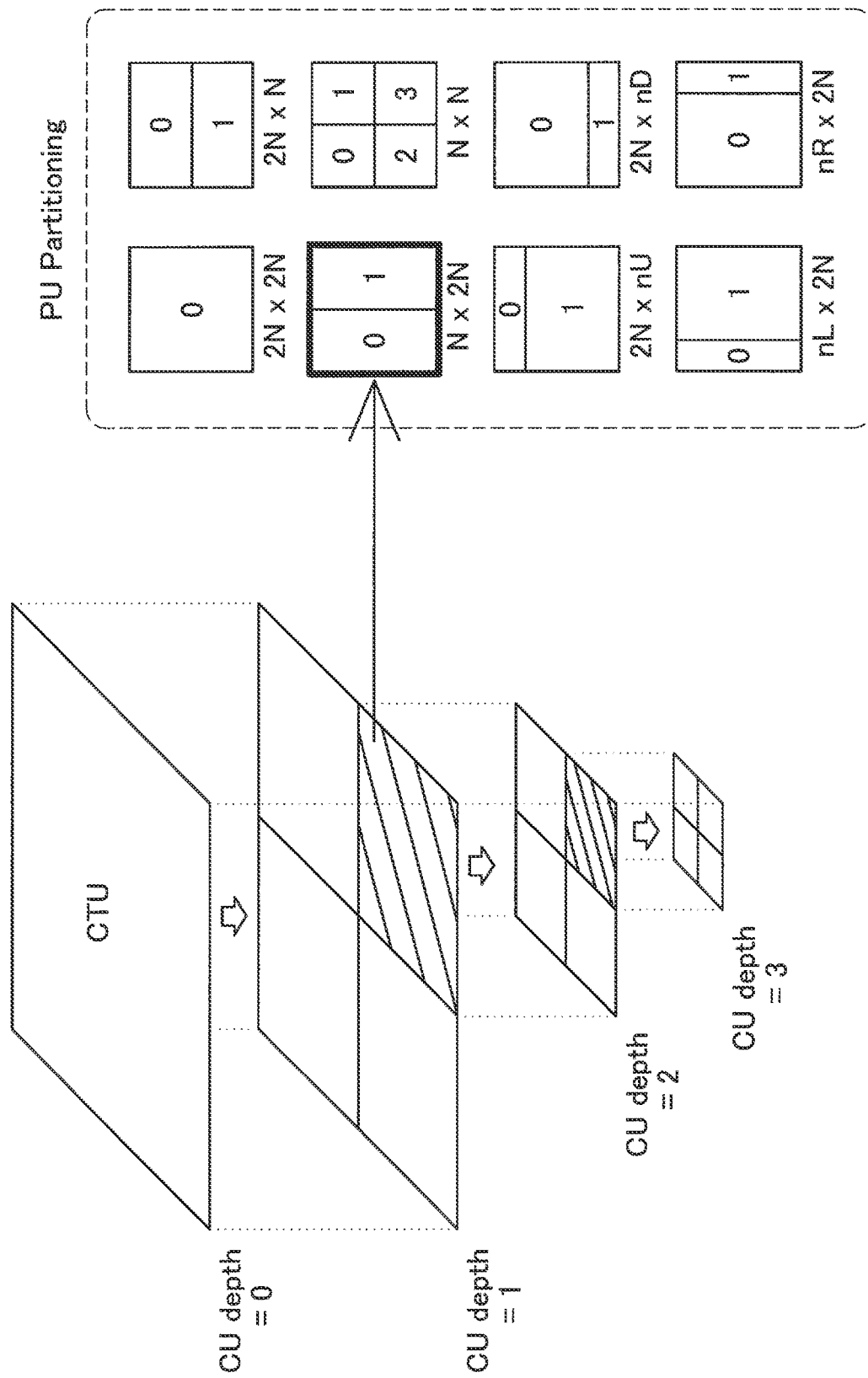
FIG. 2 is an explanatory diagram for explaining the setting of PUs in the CUs.

PUs are the processing units of a prediction process that includes intra-prediction and inter-prediction. PUs are formed by partitioning a CU according to one of several partitioning patterns. FIG. 2 is an explanatory diagram for explaining the setting of PUs in the CUs illustrated in FIG. 1. The right side of FIG. 2 illustrates eight varieties of partitioning patterns, called 2N×2N, 2N×N, N×2N, N×N, 2N×nU, 2N×nD, nL×2N, and nR×2N. Among these partitioning patterns, in intra-prediction, the two varieties of 2N×2N and N×N are selectable (N×N is selectable only for the SCU). On the other hand, in inter-prediction, in the case in which asymmetric motion partitioning is enabled, all eight varieties of partitioning patterns are selectable.

Figure 3:
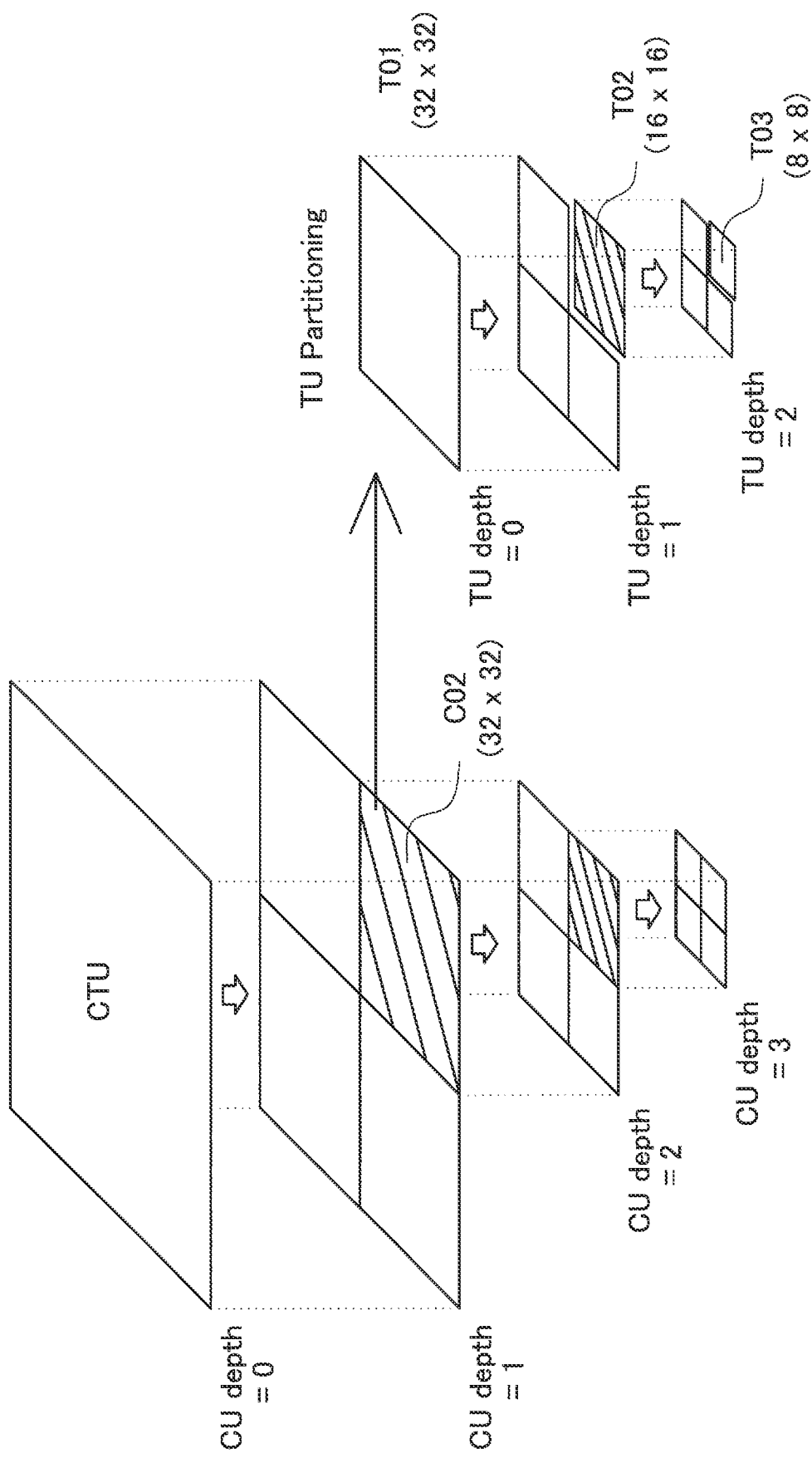
FIG. 3 is an explanatory diagram for explaining the setting of TUs in the CUs.

TUs are the processing units of the orthogonal transform process. TUs are formed by partitioning CUs (for intra CUs, each PU inside a CU) down to a certain depth. FIG. 3 is an explanatory diagram for explaining the setting of TUs in the CUs illustrated in FIG. 1. The right side of FIG. 3 illustrates the one or more TUs that may be set in the CU C02. For example, a TU T01 has a size of 32×32 pixels, and the depth of the TU partitioning is equal to zero. A TU T02 has a size of 16×16 pixels, and the depth of the TU partitioning is equal to 1. A TU T03 has a size of 8×8 pixels, and the depth of the TU partitioning is equal to 2.

What kind of block partitioning is to be performed to set blocks such as the CUs, PUs, and TUs described above in an image typically is decided on the basis of a comparison of the costs governing coding efficiency. The encoder compares the costs between one 2M×2M pixel CU and four M×M pixel CUs for example, and if the coding efficiency is higher by setting the four M×M pixel CUs, the encoder decides to partition the 2M×2M pixel CU into four M×M pixel CUs.

Figure 4:
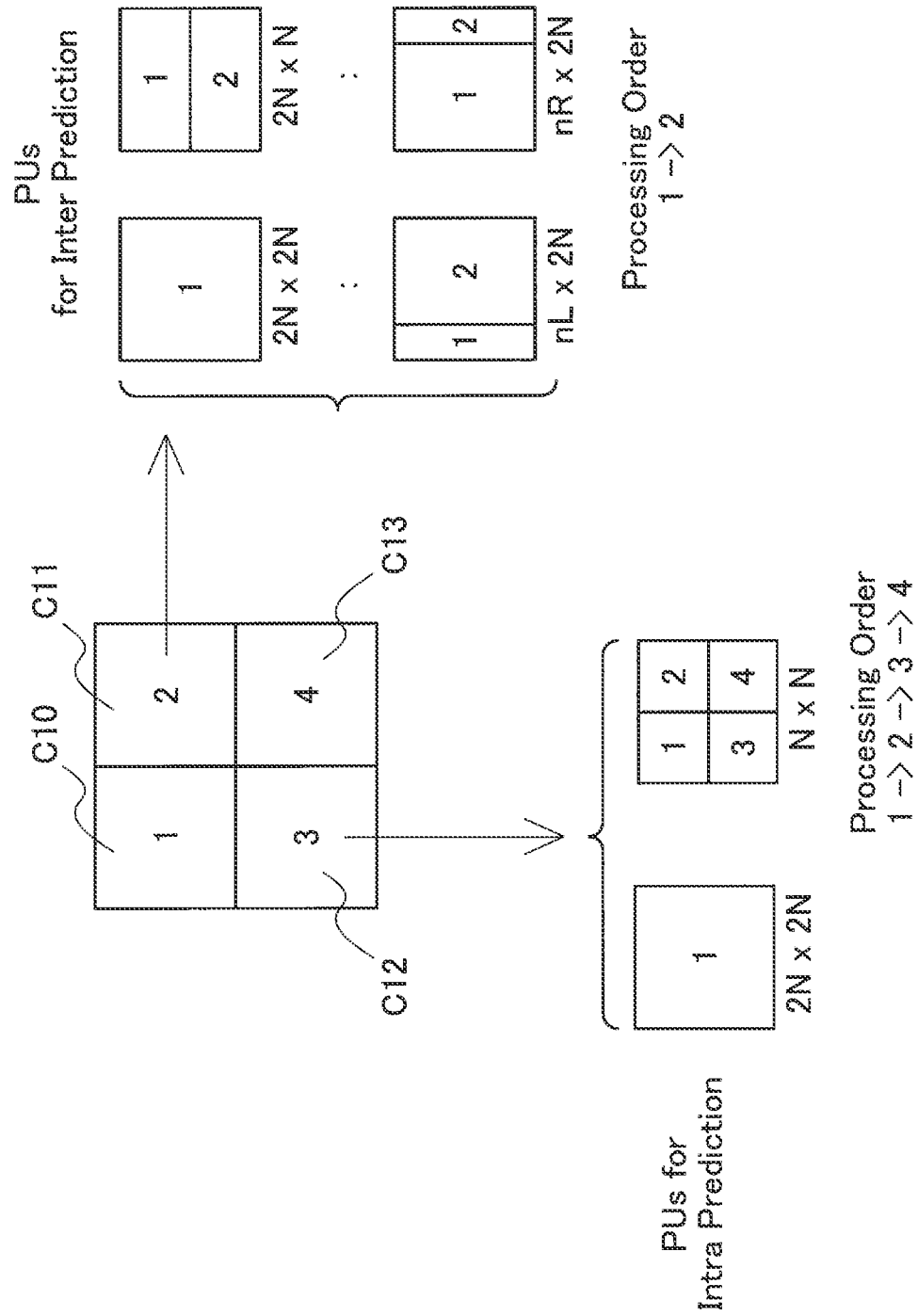
FIG. 4 is an explanatory diagram for explaining the scan order of CUs/PUs.

When encoding an image, the CTB (or LCU) set in a grid inside the image (or slice, tile) is scanned in raster scan order. Inside a single CTB, the CUs are scanned by following the quadtree from left to right and from top to bottom. When processing the current block, information about the blocks adjacent above and to the left is used as input information. FIG. 4 is an explanatory diagram for explaining the scan order of CUs/PUs. The upper left part of FIG. 4 illustrates four CUs C10, C11, C12, and C13 that may be included in a single CTB. The numeral inside the box of each CU represents the processing order. The encoding process is executed in the order of the upper-left CU C10, the upper-right CU C11, the lower-left CU C12, and the lower-right CU C13. The right side of FIG. 4 illustrates one or more PUs for inter-prediction that may be set in the CU C11. The lower part of FIG. 4 illustrates one or more PUs for intra-prediction that may be set in the CU C12. As the numerals inside the boxes of these PUs indicate, PUs are also scanned by going from left to right and from top to bottom.

Figure 5:
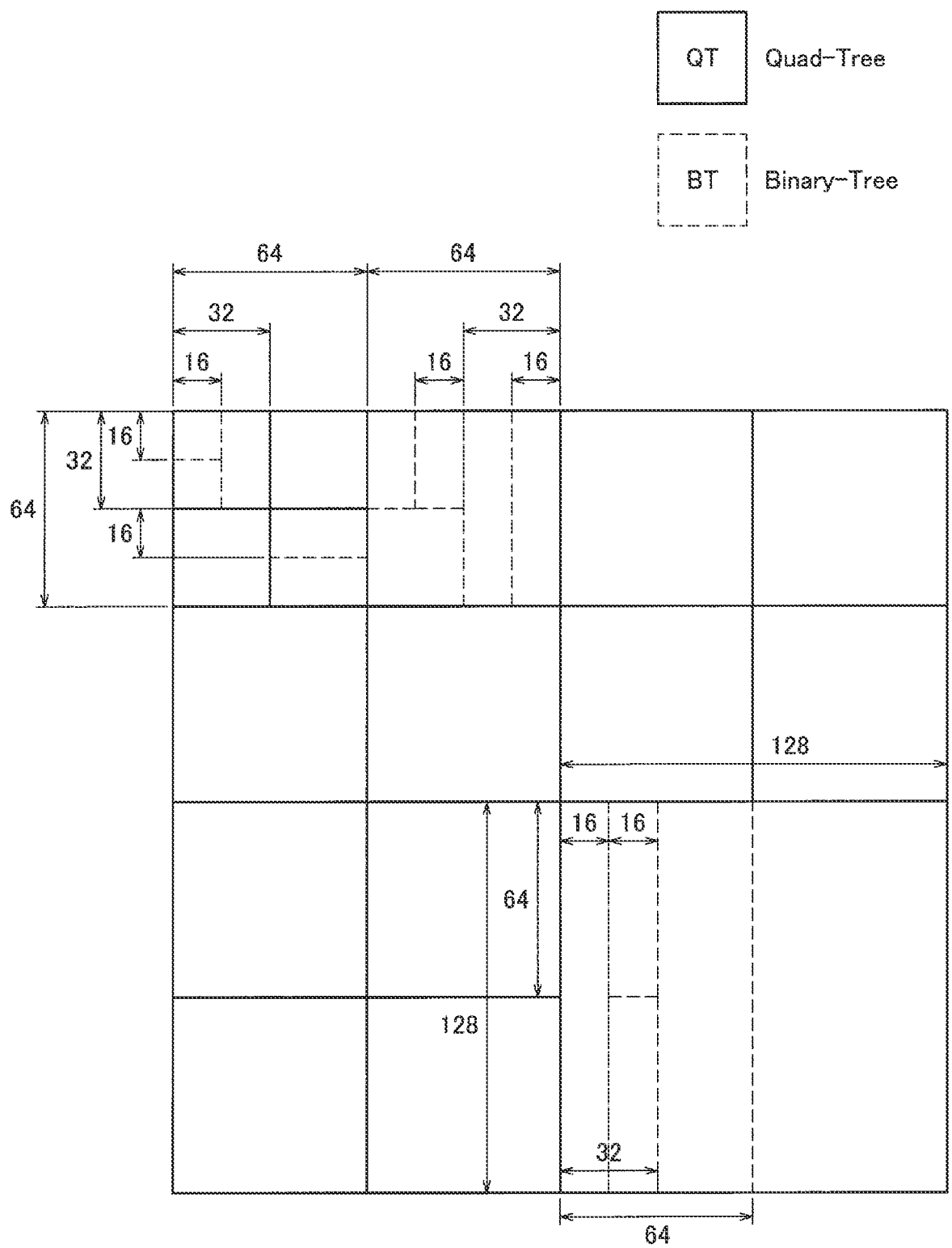
FIG. 5 is a diagram explaining the shapes of CUs, PUs, and TUs in QTBT.

The above describes block partitioning in HEVC. Next, the block structure called QTBT described in JVET-C0024, "EE2.1: Quadtree plus binary tree structure integration with JEM tools" will be described. FIG. 5 is a diagram explaining the shapes of CUs, PUs, and TUs in QTBT.

Specifically, in CU block partitioning, a single block may be partitioned not only into 4(=2×2) sub-blocks, but also into 2(=1×2, 2×1) sub-blocks. In other words, CU block partitioning is performed by recursively repeating the partitioning of a single block into 4 or 2 sub-blocks, and as a result, a tree structure having a quad tree shape or a binary tree shape in the horizontal or vertical direction is formed. As described above, blocks may be partitioned recursively in accordance with a combination of quadtrees and binary trees.

As a result, the possible CU shapes are not only square, but also rectangular. For example, in the case in which the coding tree unit (CTU) size is 128×128, as illustrated in FIG. 5, the possible CU sizes (horizontal size w×vertical size h) include not only square sizes such as 128×128, 64×64, 32×32, 16×16, 8×8, and 4×4, but also rectangular sizes such as 128×64, 128×32, 1.28×16, 128×8, 128×4, 64×128, 32×128, 16×128, 8×128, 4×128, 64×32, 64×16, 64×8, 64×4, 32×64, 16×64, 8×64, 4×64, 32×16, 32×8, 32×4, 16×32, 8×32, 4×32, 16×8, 16×4, 8×16, 4×16, 8×4, and 4×8. Note that in Non-Patent Literature 2, the PUs and TUs are the same as the CUs. However, a form in which the CU, PU, and TU block structures are independent of each other is also conceivable. The present technology is applicable not only to the case in which the CUs, PUs, and TUs have the same block structure, but also to the case in which the CUs, PUs, and TUs have independent block structures.

Note that in this specification, "block" is used in the description to refer to a partial region of an image (picture) or a unit of processing in some cases (not a block of a processing section). A "block" in this case denotes any partial region inside a picture, for which the size, shape, characteristics, and the like are not limited. In other words, a "block" in this case is assumed to include any partial region (unit of processing) such as a TU, PU, CU, CTU, CTB, file, or slice, for example.

Also, in this specification, a block boundary may be the boundary between any of the blocks described above, and includes for example a boundary between blocks partitioned by the block partitioning in HEVC and a boundary between blocks partitioned by the block partitioning in QTBT described above. Furthermore, the present technology is also applicable to the block structures and block boundaries described in JVET-D0117, "Multi-Type-Tree".

[1-2. Existing Deblocking Filter]

Next, an existing deblocking filter will be described. The processing by the deblocking filter in an existing image coding scheme such as HEVC includes a filtering need determination process, a filter strength determination process, and a filtering process. In the following, the filtering need determination process, the filter strength determination process, and the filtering process will be described by taking HEVC as an example.

(1) HEVC Filtering Need Determination Process

The filtering need determination process is a process that determines whether or not the deblocking filter should be applied for every four lines of a block boundary in an input image. In the case in which the block boundary is a vertical boundary, the above lines correspond to rows orthogonal to the vertical boundary. Also, in the case where the block boundary is a horizontal boundary, the above lines correspond to a column orthogonal to the horizontal boundary.

Figure 6:
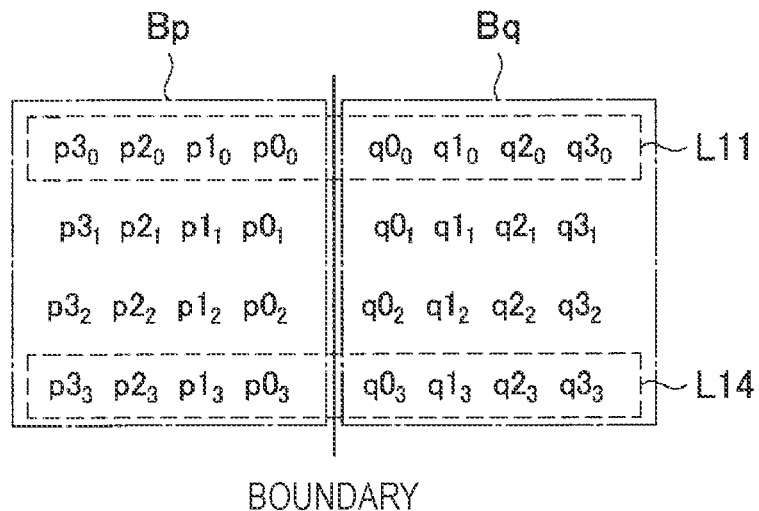
FIG. 6 is an explanatory diagram illustrating one example of pixels inside two blocks Bp and Bq containing 4×4 pixels each, which are adjacent across a vertical boundary.

FIG. 6 is an explanatory diagram illustrating one example of pixels inside two blocks Bp and Bq containing 4×4 pixels each, which are adjacent across a vertical boundary. Although a vertical boundary is described as an example herein, obviously the matter described here is equally applicable to a horizontal boundary. In the example of FIG. 6, pixels inside the block Bp are denoted with the sign pij, where i is a column index and j is a row index. The column index i is numbered 0, 1, 2, 3 in order from the column near the vertical boundary (from right to left). The row index j is numbered 0, 1, 2, 3 from top to bottom. On the other hand, pixels inside the block Bb are denoted with the sign qkj, where k is a column index and j is a row index. The column index k is numbered 0, 1, 2, 3 in order from the column near the vertical boundary (from left to right).

For the vertical boundary between the blocks Bq and Bq illustrated in FIG. 6, whether or not the deblocking filter should be applied may be determined according to conditions like the following:

Determination Condition . . . Apply if Both Condition M and Condition N are True Condition M:

(M1) Block Bp or Bq is in intra-prediction mode;

(M2) Block Bq or Bq has non-zero orthogonal transform coefficients, and the boundary between blocks Bp and Bq is a TU boundary;

(M3) The absolute value of the difference between the block motion vectors of blocks Bp and Bq is 1 pixel or greater; or (M4) Blocks Bp and Bq have different reference images for block motion compensation, or different numbers of motion vectors Condition N:

$|p2_0 - 2*p1_0| + |p0_0 + |p2_3 - 2*q1_3 + p0_3| + |p2_0 - 2*q1_0 + q0_0 + q2_3 - 2*q1_3 + q0_3| < \beta$ Note that $\beta$ in the condition N is an edge determination threshold. The initial value of $\beta$ is assigned according to the quantization parameters. Also, the value of $\beta$ may be user-designated in the parameters inside the slice header.

In other words, as indicated by the dashed-line frames L11 and L14 in FIG. 6, in the filtering need determination process (particularly the determination of the condition N), the pixels in the rows on the first line and the fourth line (taking the uppermost row as the first line) of each block are referenced. Similarly, in the filtering need determination process for a horizontal boundary, pixels in the first and fourth columns of each block (not illustrated in FIG. 6) are referenced. Subsequently, with respect to a boundary for which it is determined that the deblocking filter should be applied in accordance with the determination condition described above, the filtering strength determination process described above is executed.

(2) HEVC Filter Strength Determination Process

If it is determined that the deblocking filter should be applied to a certain boundary, a process of determining the strength of the filter to be applied is performed. In HEVC, an application determination process is performed for each of a strong filter and a weak filter.

The strong filter determination process is performed in units of four lines, similarly to the filtering need determination process. For example, in the example illustrated in FIG. 6, pixels in the rows of the first line and the fourth line of each block indicated by the dashed-line frames L11 and L14 are referenced to perform the strong filter determination process.

Note that in the following, the line index (the row index for a vertical boundary and the column index for a horizontal boundary) will be omitted where appropriate, but in the case of describing a determination process being performed in units of four lines, it is assumed that pixels in the rows of the first line and the fourth line of each block are referenced.

Figure 7:
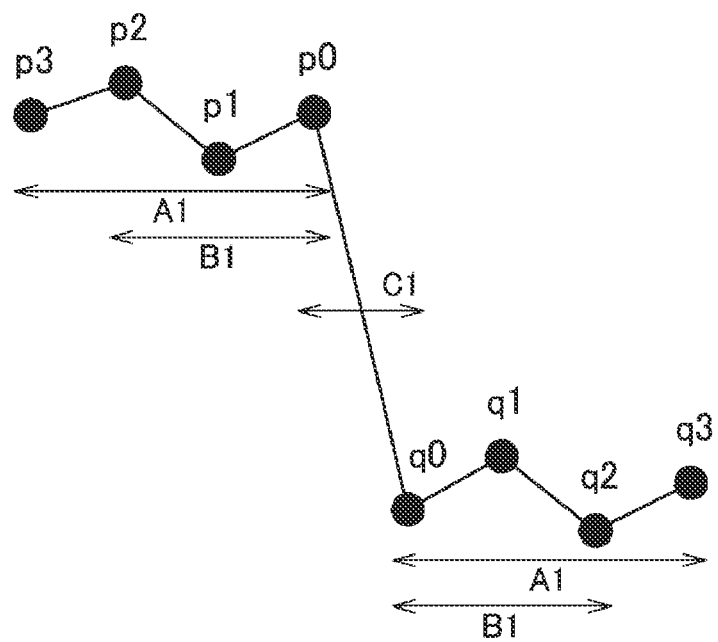
FIG. 7 is an explanatory diagram for explaining a strong filter determination process in HEVC.

FIG. 7 is an explanatory diagram for explaining the strong filter determination process in HEVC. p0 to p3 and q0 to q3 illustrated in FIG. 7 are columns of pixel values in the blocks Bq and Bq, respectively.

In the strong filter determination process in HEVC, the following conditions A1, B1, and C1 are used.

(A1) $|p3-p0| + |q3-q0| < (\beta >> 3)$ (B2) $|p2-2*p1+p0| + |q2-2*q1+q0| < (\beta >> 2)$ (C1) $|p0-q0| < ((tc*5+1) >> 1)$ The ranges of pixels referenced by the above conditions A1, B1, and C1 correspond to the ranges A1, B1, and C1 illustrated in FIG. 7, respectively. As illustrated in FIG. 7, the condition A1 and the condition B1 are determined using pixel values inside the blocks. More specifically, the condition A1 is a condition that determines the flatness inside the blocks. Also, the condition B1 is a condition that determines the continuity inside the blocks. Also, the condition C2 uses pixel values adjacent to the block boundary to determine the amount of change (gap) between the blocks.

In the case in which the above conditions A1, B1, and C1 are all satisfied on both the first line and the fourth line, the strong filter is applied to the block boundary in units of four lines, whereas in the case in which any one condition is not satisfied, the weak filter determination process is performed on every line.

The strong filter in HEVC is expressed as follows.

$p0'=\text{Clip3}(p0-2*tc, p0+2*tc, (p2+2*p1+2*p0+2*q0+q1+4)>>3)$ $q0'=\text{Clip3}(q0-2*tc, q0+2*tc, (p1+2p0+2q0+2q1+q2+4)>>3)$ $p1'=\text{Clip3}(p1-2*tc, p1+2*tc, (p2+p1+p0+q0+2)>>2)$ $q1'=\text{Clip3}(q1-2*tc, q1+2*tc, (p0+q0+q1+q2+2)>>2)$ $p2'=\text{Clip3}(p2-2*tc, p2+2*tc, (2*p3+3*p2+p1+p0+q0+4)>>3)$ $q2'=\text{Clip3}(q2-2*tc, q2+2*tc, (p0+q0+q1+3*q2+2*q3+4)>>3)$ Note that pi' and qk' are the pixel values after applying the deblocking filter. Also, Clip3(a,b,c) denotes a process of clipping the value c to the range of a≤c≤b.

However, blocking artifacts occur readily in the case of large-sized blocks in a flat region (a region with little change of pixel values inside the region), and even if the strong filter is applied as above, blocking artifacts cannot be reduced sufficiently in some cases. Also, as described above, in HEVC, blocks of larger size than the macroblocks in previous image coding schemes such as MPEG-2 or H.264/AVC may be selected. Furthermore, in QTBT described above, blocks of even larger size than the CTU in HEVC may be selected. In light of such circumstances, a stronger deblocking filter is demanded.

For example, in Non-Patent Literature 3, to further reduce blocking artifacts at block boundaries associated with large-sized blocks, the application of a filter having an even wider application range than the strong filter described above is proposed. With the technique proposed in Non-Patent Literature 3, the application range of the filter in each block is extended from 3 pixels to 7 pixels positioned near the block boundary, making it possible to apply a stronger filter.

The filter proposed in Non-Patent Literature 3 (hereinafter called the already-proposed filter in some cases) is expressed as follows. Note that what is expressed below are the pixel values after applying the filter on the block Bp side.

$p6'=\text{Clip3}(p6-2*tc, p6+2*tc, (3*p7+5*p6+2*p5+p4+p3+p2+p1+p0+q0+8)>>4)$ $p5'=\text{Clip3}(p5-2*tc, p5+2*tc, (p7+2*p6+5*p5+2*p4+p3+p2+p1+p0+q0+q1+8)>>4)$ $p4'=\text{Clip3}(p4-2*tc, p4+2*tc, (p6+3*p5+*p4+*p3+p2+p1+p0+q0+q1+q2+8)>>4)$ $p3'=\text{Clip3}(p3-2*tc, p3+2*tc, (p6+2*+p5+2*p4+2*p3+2*p2+2*p1+p0+q0+q1+q2+q3+8)>>4)$ $p2'=\text{Clip3}(p2-2*tc, p2+2*tc, (p5+2*p4+2*p3+2*p2+2*p1+2*p0+2*q0+q1+q2+q3+8)>>4)$ $p1'=\text{Clip3}(p1-2*tc, p1+2*tc, (p5+p4+2*p3+2*p2+2*p1+2*p0+2*q0+2*q1+q2+q3+8)>>4)$ $p0'=\text{Clip3}(p0-2*tc, p0+2*tc, (p4+2*p3+2*p2+2*p1+2*p0+2*q0+2*q1+2*q2+q3+8)>>4)$ As above, in the already-proposed filter, the filter application range is widened, while in addition, the tap range to reference during filtering is also wider than the strong filter in HEVC.

Also, according to Non-Patent Literature 3, the already-proposed filter is applied in the case in which all of the conditions R1 to R3 as follows are true.

(R1) The size in the direction perpendicular to the block boundary of the two blocks on either side of the block boundary is a predetermined threshold value (in Non-Patent Literature 3, 16) or greater (R2) The conditions for applying the HEVC strong filter are satisfied (R3) Of the two blocks on either side of the block boundary, at least one block is in the intra-prediction mode.

Among the above conditions R1 to R3, only R2 is a determination condition that references pixel values. Also, as described with reference to FIG. 7, the conditions for applying the strong filter in the condition R2 reference only the 4 pixels positioned near the block boundary in each block, and the reference range in the condition R2 is narrower than the application range of the filter proposed in Non-Patent Literature 3. For this reason, in the case of using the above determination conditions R1 to R3, there is risk that an inappropriate filter will be applied.

Figure 8:
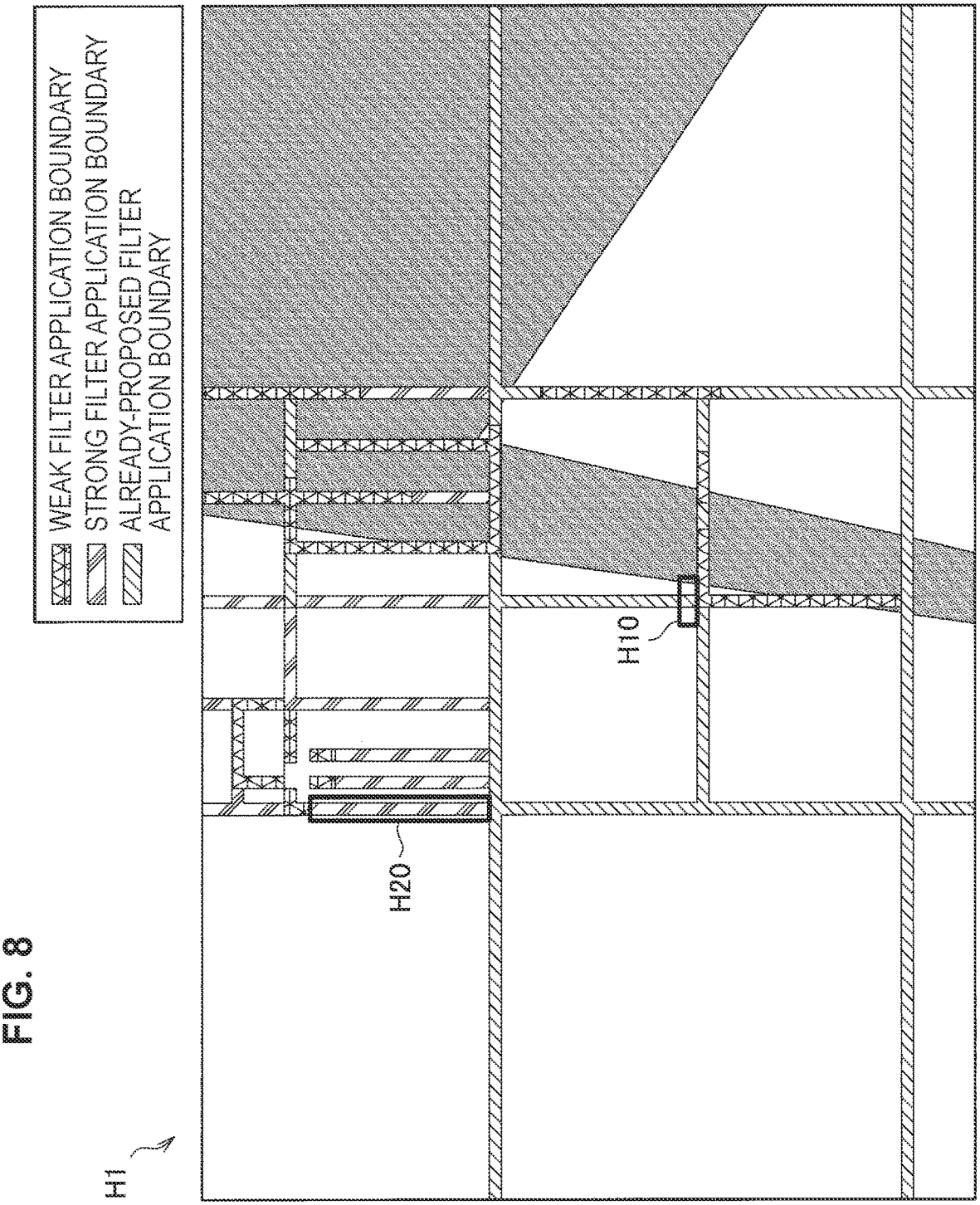
FIG. 8 is an explanatory diagram illustrating one example of block boundaries to which an already-proposed filter is applied.

FIG. 8 is an explanatory diagram illustrating one example of block boundaries to which the already-proposed filter is applied. FIG. 8 illustrates weak filter application boundaries where the weak filter is applied, strong filter application boundaries where the strong filter is applied, and already-proposed filter application boundaries where the already-proposed filter is applied with respect to an image H1.

Figure 9:
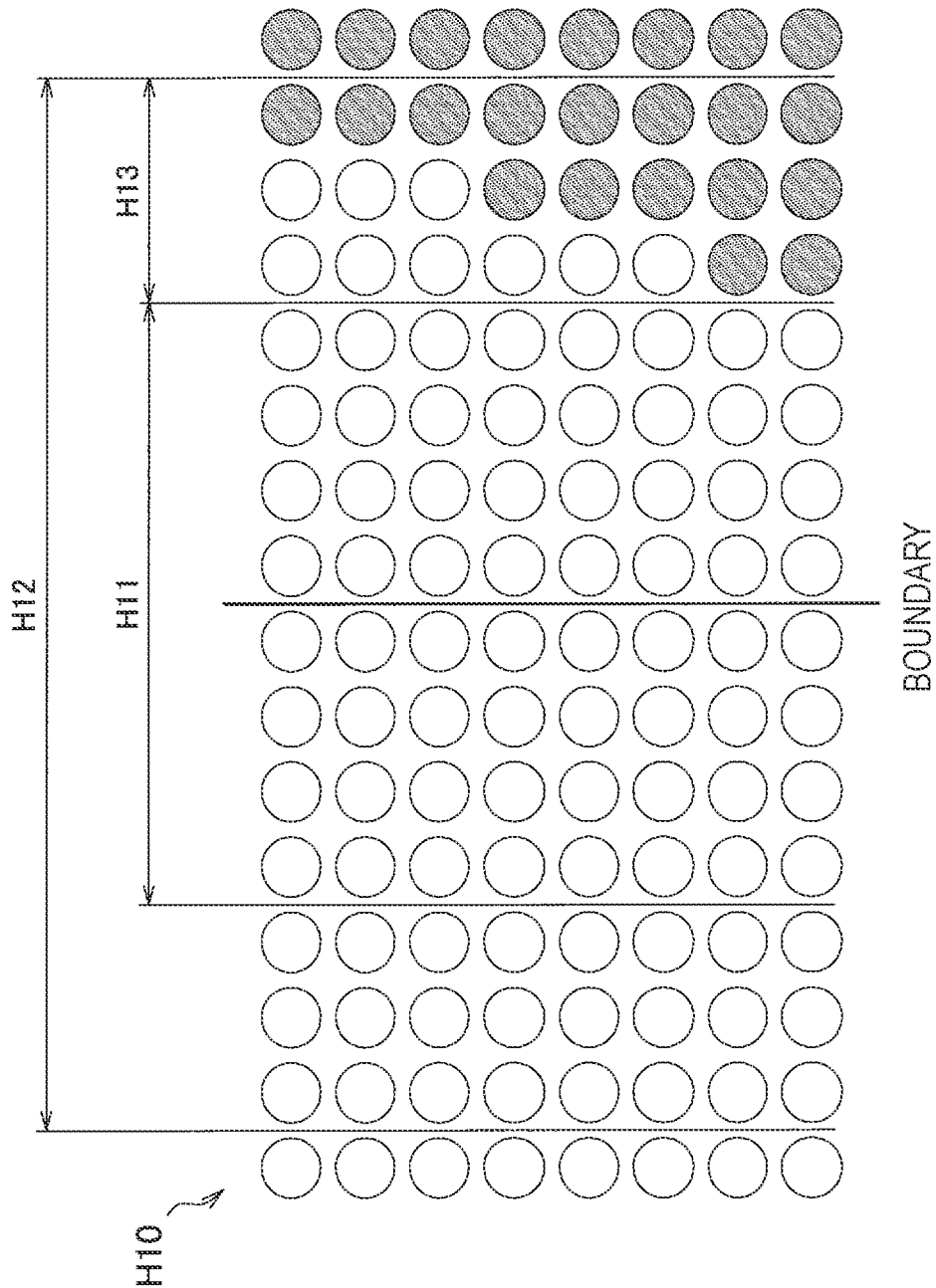
FIG. 9 is a schematic diagram illustrating an enlargement of the region H10 illustrated in FIG. 8.

FIG. 9 is a schematic diagram illustrating an enlargement of the region H10 illustrated in FIG. 8. As illustrated in FIG. 8, for the block boundary in the region H10 illustrated in FIG. 9, it is determined that the already-proposed filter will be applied. Note that the reference range used to determine the condition R2 is the range H11 illustrated in FIG. 9. As illustrated in FIG. 9, since the range H11 of the region H10 is a flat region with little change of pixel values, in the case of making the determination according to the condition R2, the strong filter is applied readily.

However, the application range of the already-proposed filter is the range H12 illustrated in FIG. 9. Here, as illustrated in FIG. 9, since the range H13 included in the range H12 includes a boundary between an object (the subject of the image) and the background, it is undesirable to apply the deblocking filter to the range H13. For example, if the deblocking filter (already-proposed filter) is applied to the range H12 including the range H13, the peak signal-to-noise ratio (PSNR) may drop greatly in some cases.

Accordingly, focusing on the above circumstances led to the creation of an embodiment according to the present disclosure. With the embodiment according to the present disclosure, it is possible to apply a more appropriate filter.

<2. Overview of Apparatus>

Figure 10:
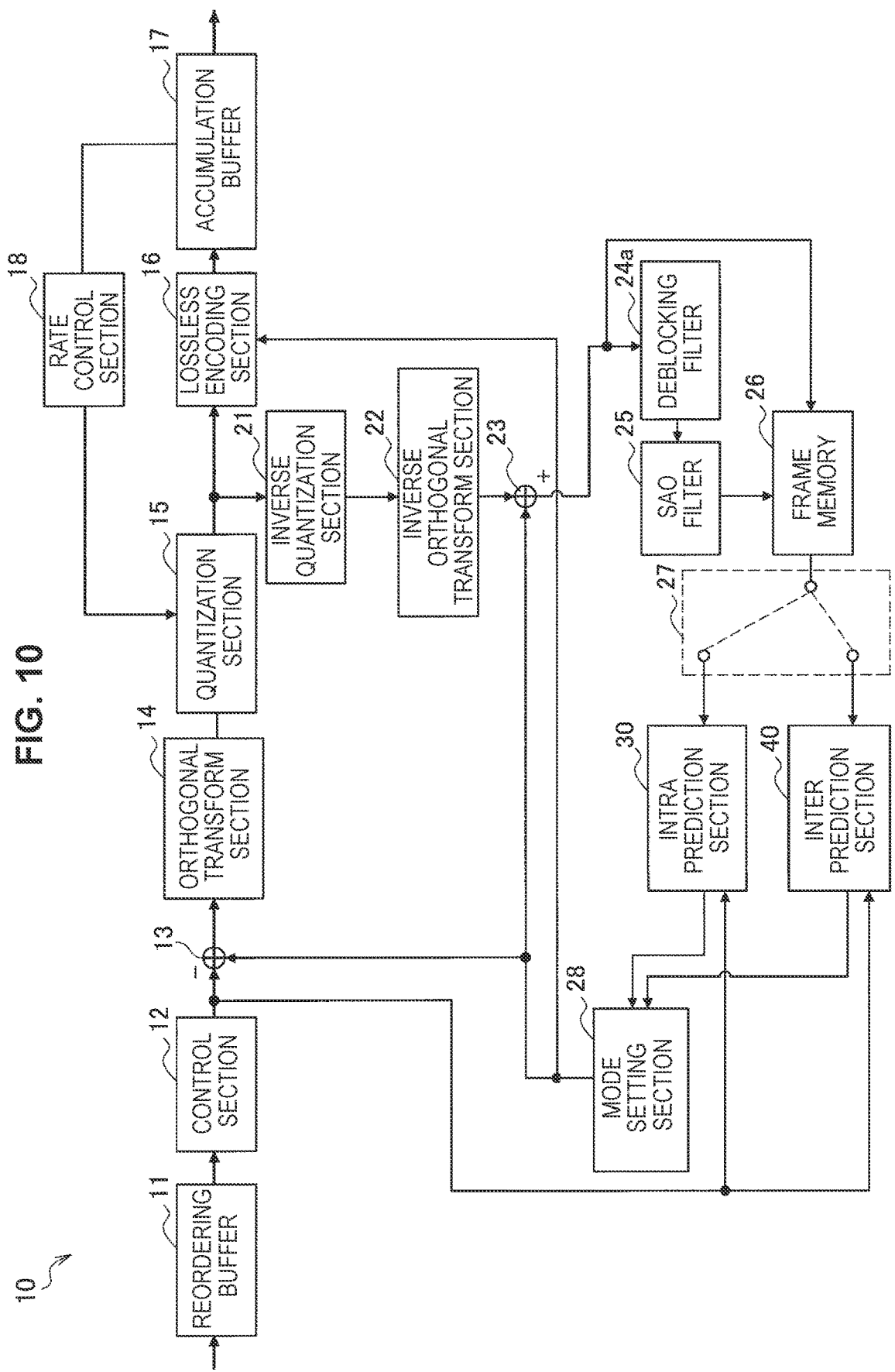
FIG. 10 is a block diagram illustrating one example of the configuration of an image encoding apparatus 10, which is one aspect of an image processing apparatus according to one embodiment of the present disclosure.
Figure 11:
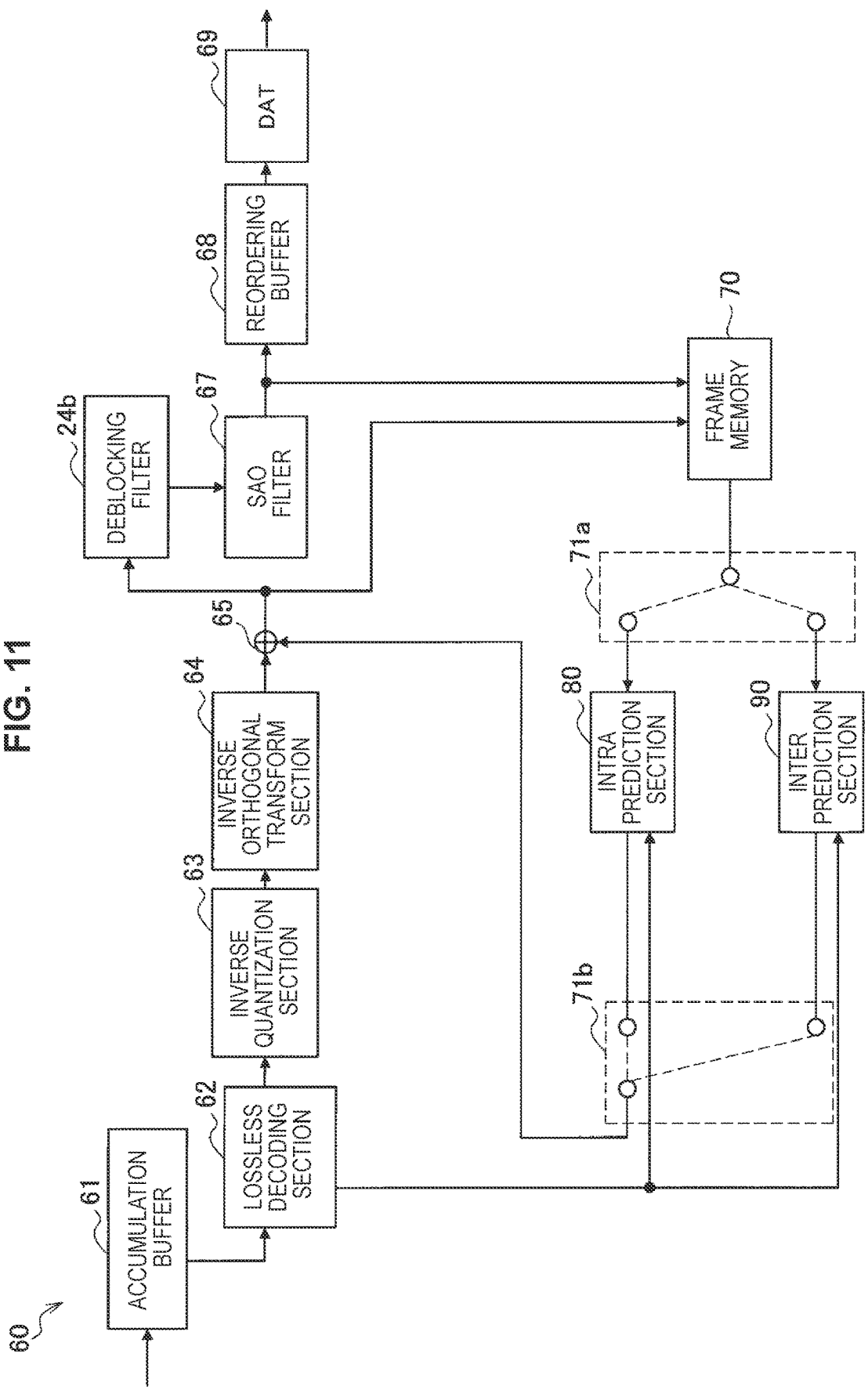
FIG. 11 is a block diagram illustrating one example of the configuration of an image decoding apparatus 60, which is one aspect of an image processing apparatus according to the embodiment.

FIGS. 10 and 11 will be used to describe an overview of apparatus that serve as one applicable example of the technology disclosed in this specification. For example, the technology disclosed in this specification is applicable to an image encoding apparatus and an image decoding apparatus.

[2-1. Image Encoding Apparatus]

FIG. 10 is a block diagram illustrating one example of the configuration of an image encoding apparatus 10, which is one aspect of an image processing apparatus according to one embodiment of the present disclosure.

Referring to FIG. 10, the image encoding apparatus 10 is provided with a re-ordering buffer 11, a control section 12, a subtraction section 13, an orthogonal transform section 14, a quantization section 15, a lossless encoding section 16, an accumulation buffer 17, an inverse quantization section 21, an inverse orthogonal transform section 22, an addition section 23, a deblocking filter 24a, an SAO filter 25, frame memory 26, a switch 27, a mode setting section 28, an intra-prediction section 30, and an inter-prediction section 40.

The re-ordering buffer 11 re-orders the image data of a series of images included in video to be encoded, in accordance with a Group of Pictures (GOP) structure according to the encoding process. The re-ordering buffer 11 outputs the re-ordered image data to the control section 12, the subtraction section 13, the intra-prediction section 30, and the inter-prediction section 40.

The control section 12 partitions the image data into blocks of the units of processing, on the basis of a block size of the units of processing designated externally or in advance. The QTBT block structure described above for example may also be formed by the block partitioning by the control section 12. Also, the control section 12 decides encoding parameters associated with the encoding process on the basis of rate-distortion optimization (RDO), for example. The decided encoding parameters are supplied to each section.

The subtraction section 13 calculates prediction error data, which is the difference between the image data input from the re-ordering buffer 11 and the predicted image data, and outputs the calculated prediction error data to the orthogonal transform section 14.

The orthogonal transform section 14 executes an orthogonal transform process for each of one or more transform blocks (TUs) set inside each region. The orthogonal transform at this point may be the discrete cosine transform, the discrete sine transform, or the like, for example. More specifically, the orthogonal transform section 14 transforms the prediction error data input from the subtraction section 13 from an image signal in the spatial domain to transform coefficients in the frequency domain for each transform block. Subsequently, the orthogonal transform section 14 outputs the transform coefficients to the quantization section 15.

The quantization section 15 is supplied with transform coefficient data input from the orthogonal transform section 14 and a rate control signal from a rate control section 18 described later. The quantization section 15 quantizes the transform coefficient data, and outputs the quantized transform coefficient data (hereinafter also called quantized data) to the lossless encoding section 16 and the inverse quantization section 21. The quantization section 15 also varies the bit rate of quantized data input into the lossless encoding section 16 by switching a quantization scale on the basis of the rate control signal from the rate control section 18.

The lossless encoding section 16 generates an encoded stream by encoding quantized data input from the quantization section 15. Also, the lossless encoding section 16 encodes various encoding parameters to be referenced by the decoder, and inserts the encoded encoding parameters into the encoded stream. The encoding parameters encoded by the lossless encoding section 16 may include the encoding parameters decided by the control section 12 described above. The lossless encoding section 16 outputs the generated encoded stream to the accumulation buffer 17.

The accumulation buffer 17 uses a storage medium such as semiconductor memory to temporarily buffer the encoded stream input from the lossless encoding section 16. Subsequently, the accumulation buffer 17 outputs the buffered encoded stream to a transmission section not illustrated (such as a communication interface or a connection interface that connects with peripheral equipment, for example), at a rate according to the bandwidth of the transmission channel.

The rate control section 18 monitors the amount of free space in the accumulation buffer 17. Subsequently, the rate control section 18 generates a rate control signal according to the amount of free space in the accumulation buffer 17, and outputs the generated rate control signal to the quantization section 15. For example, when there is not much free space in the accumulation buffer 17, the rate control section 18 generates a rate control signal for lowering the bit rate of the quantized data. Also, for example, when there is a sufficiently large amount of free space in the accumulation buffer 17, the rate control section 18 generates a rate control signal for raising the bit rate of the quantized data.

The inverse quantization section 21, the inverse orthogonal transform section 22, and the addition section 23 form a local decoder. The local decoder has a role of locally decoding decoded image data from encoded data.

The inverse quantization section 21 inversely quantizes the quantized data with the same quantization parameter as that used by the quantization section 15, and restores the transform coefficient data. Subsequently, the inverse quantization section 21 outputs the restored transform coefficient data to the inverse orthogonal transform section 22.

The inverse orthogonal transform section 22 reconstructs the prediction error data by executing an inverse orthogonal transform process on the transform coefficient data input from the inverse quantization section 21. Subsequently, the inverse orthogonal transform section 22 outputs the reconstructed prediction error data to the addition section 23.

The addition section 23 adds the restored prediction error data input from the inverse orthogonal transform section 22 to the predicted image data input from the intra-prediction section 30 or the inter-prediction section 40 to thereby generate decoded image data (reconstructed image). Then, the addition section 23 outputs the generated decoded image data to the deblocking filter 24*a* and the frame memory 26.

The deblocking filter 24*a* and the SAO filter 25 are both in-loop filters for improving image quality of reconstructed images.

The deblocking filter 24*a* reduces blocking artifacts by filtering the decoded image data input from the addition section 23, and outputs the filtered decoded image data to the SAO filter 25. Note that the processing by the deblocking filter 24*a* will be described in detail later.

The SAO filter 25 removes noises by applying an edge offset process or a band offset process to the decoded image data input from the deblocking filter 24*a* and outputs the processed decoded image data to the frame memory 26.

The frame memory 26 stores the un-filtered decoded image data input from the addition section 23 and the decoded image data to which in-loop filtering has been applied input from the SAO filter 25 in a storage medium.

The switch 27 reads the un-filtered decoded image data to be used for the intra-prediction out from the frame memory 26 and supplies the read decoded image data as reference image data to the intra-prediction section 30. Further, the switch 27 reads the filtered decoded image data to be used for the inter-prediction out from the frame memory 26 and supplies the read decoded image data as reference image data to the inter-prediction section 40.

The mode setting section 28 sets a predictive coding mode for each block on the basis of a comparison of costs input from the intra-prediction section 30 and the inter-prediction section 40. For a block in which an intra-prediction mode is set, the mode setting section 28 outputs the predicted image data generated by the intra-prediction section 30 to the subtraction section 13 and the addition section 23, and also outputs information related to intra-prediction to the lossless encoding section 16. Also, for a block in which an inter-prediction mode is set, the mode setting section 28 outputs the predicted image data generated by the inter-prediction section 40 to the subtraction section 13 and the addition section 23, and also outputs information related to inter-prediction to the lossless encoding section 16.

The intra-prediction section 30 performs an intra-prediction process on the basis of original image data and decoded image data. For example, the intra-prediction section 30 evaluates a cost based on a prediction error and an amount of code to be generated for each of prediction mode candidates within a search range. Then, the intra-prediction section 30 selects a prediction mode which minimizes the cost as an optimum prediction mode. In addition, the intra-prediction section 30 generates a predicted image data in accordance with the selected optimum prediction mode. Then, the intra-prediction section 30 outputs information regarding intra-prediction including prediction mode information indicating the optimum prediction mode, a corresponding cost, and the predicted image data to the mode setting section 28.

The inter-prediction section 40 executes an inter-prediction process (motion compensation), on the basis of original image data and decoded image data. For example, the inter-prediction section 40 evaluates a cost based on a prediction error and a generate code rate for each prediction mode candidate included in a search range specified by HEVC. Next, the inter-prediction section 40 selects the prediction mode yielding the minimum cost, or in other words the prediction mode yielding the highest compression ratio, as an optimal prediction mode. In addition, the inter-prediction section 40 generates predicted image data in accordance with the selected optimal prediction mode. Subsequently, the inter-prediction section 40 outputs information related to inter-prediction, the corresponding cost, and the predicted image data to the mode setting section 28.

[2-2. Image Decoding Apparatus]

Next, the decoding of encoded data encoded as above will be described. FIG. 11 is a block diagram illustrating one example of the configuration of an image decoding apparatus 60, which is one aspect of an image processing apparatus according to the present embodiment. Referring to FIG. 11, an accumulation buffer 61, a lossless decoding section 62, an inverse quantization section 63, and an inverse orthogonal transform section 64, an addition section 65, a deblocking filter 24b, an SAO filter 67, a re-ordering buffer 68, a digital to analog (D/A) conversion section 69, frame memory 70, selectors 71a and 71b, an intra-prediction section 80, and an inter-prediction section 90 are provided.

The accumulation buffer 61 uses a storage medium to temporarily buffer an encoded stream received from the image encoding apparatus 10 via a transmission section not illustrated (such as a communication interface or a connection interface that connects with peripheral equipment, for example).

The lossless decoding section 62 decodes quantized data from the encoded stream input from the accumulation buffer 61, in accordance with the coding scheme used during encoding. The lossless decoding section 62 outputs the decoded quantized data to the inverse quantization section 63.

Also, the lossless decoding section 62 decodes various encoding parameters inserted into the header area of the encoded stream. The parameters decoded by the lossless decoding section 62 may include information related to intra-prediction and information related to inter-prediction, for example. The lossless decoding section 62 outputs information related to intra-prediction to the intra-prediction section 80, Also, the lossless decoding section 62 outputs information related to inter-prediction to the inter-prediction section 90.

The inverse quantization section 63 inversely quantizes the quantized data input from the lossless decoding section 62 with the same quantization step as the one used during encoding, and reconstructs transform coefficient data. The inverse quantization section 63 outputs the reconstructed transform coefficient data to the inverse orthogonal transform section 64.

The inverse orthogonal transform section 64 generates prediction error data by performing an inverse orthogonal transform on the transform coefficient data input from the inverse quantization section 63, in accordance with the orthogonal transform scheme used during encoding. The inverse orthogonal transform section 64 outputs the generated prediction error data to the addition section 65.

The addition section 65 generates decoded image data by adding the prediction error data input from the inverse orthogonal transform section 64 to predicted image data input from the selector 71b. Then, the addition section 65 outputs the generated decoded image data to the deblocking filter 24b and the frame memory 70.

The deblocking filter 24b reduces blocking artifacts by filtering the decoded image data input from the addition section 65, and outputs the filtered decoded image data to the SAO filter 67. Note that the processing by the deblocking filter 24b will be described in detail later.

The SAO filter 67 removes noises by applying an edge offset process or a band offset process to the decoded image data input from the deblocking filter 24b and outputs the processed decoded image data to the re-ordering buffer 68 and the frame memory 70.

The re-ordering buffer 68 re-orders images input from the SAO filter 67, thereby generating a sequence of time-series image data. Then, the re-ordering buffer 68 outputs the generated image data to the D/A conversion section 69.

The D/A conversion section 69 converts image data in a digital format input from the re-ordering buffer 68 into an image signal in an analog format. Subsequently, for example, the D/A conversion section 69 outputs the analog image signal to a display (not illustrated) connected to the image decoding apparatus 60, and thereby causes decoded video to be displayed.

The frame memory 70 stores the unfiltered decoded image data input from the addition section 65 and the filtered decoded image data input from the SAO filter 67 in a storage medium.

The selector 71a switches an output destination of the image data from the frame memory 70 between the intra-prediction section 80 and the inter-prediction section 90 for each block in the image in accordance with prediction mode information acquired by the lossless decoding section 62. In the case where an intra-prediction mode has been designated, for example, the selector 71a outputs the decoded image data that has not been filtered supplied from the frame memory 70 to the intra-prediction section 80 as reference image data. In addition, in the case where an inter-prediction mode has been designated, the selector 71a outputs the filtered decoded image data to the inter-prediction section 90 as reference image data.

The selector 71b switches an output source of the predicted image data to be supplied to the addition section 65 between the intra-prediction section 80 and the inter-prediction section 90 in accordance with prediction mode information acquired by the lossless decoding section 62. In the case where the intra-prediction mode has been designated, for example, the selector 71b supplies the predicted image data output from the intra-prediction section 80 to the addition section 65. In addition, in the case where the inter-prediction mode has been designated, the selector 71b supplies the predicted image data output from the inter-prediction section 90 to the addition section 65.

The intra-prediction section 80 performs an intra-prediction process on the basis of information regarding intra-prediction input from the lossless decoding section 62 and the reference image data from the frame memory 70, thereby generating the predicted image data. Then, the intra-prediction section 80 outputs the generated predicted image data to the selector 71b.

The inter-prediction section 90 performs an inter-prediction process on the basis of information regarding inter-prediction input from the lossless decoding section 62 and the reference image data from the frame memory 70, thereby generating the predicted image data. Then, the inter-prediction section 90 outputs the generated predicted image data to the selector 71b.

3. First Example

[3-1. Exemplary Configuration of Deblocking Filter]

This section describes one example of a configuration related to a first example of the deblocking filter 24a in the image encoding apparatus 10 illustrated in FIG. 10 and the deblocking filter 24b in the image decoding apparatus 60 illustrated in FIG. 11. Note that the deblocking filter 24a and the deblocking filter 24b may share a common configuration. Consequently, in the following description, the deblocking filter 24a and the deblocking filter 24b will be collectively designated the deblocking filter 24 in cases in which it is not necessary to distinguish the two.

The deblocking filter 24 according to the present example applies an extended strong filter in which the application range of the deblocking filter has been extended beyond the HEVC strong filter described above to pixels in the application range that has been extended (extended application range). Also, the deblocking filter 24 according to the present embodiment determines whether or not to apply the extended strong filter in accordance with the extended application range. In the following, an example of an extended strong filter whose application range is extended from 3 pixels to 7 pixels positioned near the block boundary is described, but the present example is not limited to such an example, and other examples of be extended strong filter will be described later.

Figure 12:
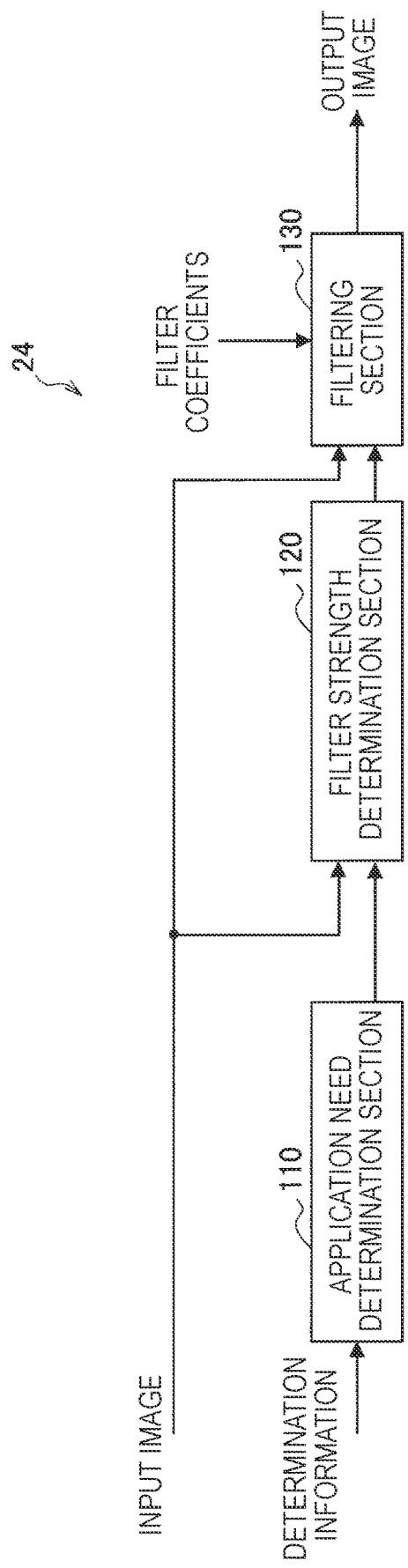
FIG. 12 is a block diagram illustrating one example of a detailed configuration of a deblocking filter 24 according to a first example.

FIG. 12 is a block diagram illustrating one example of a detailed configuration of the deblocking filter 24 according to the first example. Referring to FIG. 12, the deblocking filter 24 includes an application need determination section 110, a filter strength determination section 120, and a filtering section 130.

(1) Application Need Determination Section

The application need determination section 110 determines whether or not the deblocking filter should be applied to a block boundary. For example, the application need determination section 110 may determine that the deblocking filter should be applied in the case in which the condition M and the condition N in the existing technique described above are both true.

To make the above determination, the application need determination section 110 is supplied with determination information about adjacent blocks that are adjacent across each block boundary. The determination information supplied at this point includes mode information, transform coefficient information, and motion vector information, for example. Subsequently, the application need determination section 110 determines whether or not the following condition is satisfied as a determination in units of four lines for each block boundary.

Determination Condition . . . Apply if Both Condition M and Condition N are True Condition M:

(M1) Block Bp or Bq is in intra-prediction mode;

(M2) Block Bq or Bq has non-zero orthogonal transform coefficients, and the boundary between blocks Bp and Bq is a TU boundary;

(M3) The absolute value of the difference between the block motion vectors of blocks Bp and Bq is 1 pixel or greater; or (M4) Blocks Bp and Bq have different reference images for block motion compensation, or different numbers of motion vectors Condition N:

$|p2_0-2*p1_0+p0_0|+|p2_3-2*q1_3+p0_3|+|p2_0-2*q1_0+q0_0|+|q2_3-2*q1_3+q0_3|<\beta$ Additionally, for a block boundary satisfying the above determination condition, the application need determination section 110 causes the filter strength determination section 120 to make a determination related to filter application for each strength. On the other hand, for a block boundary not satisfying the above determination condition, the application need determination section 110 causes the filter strength determination section 120 to skip the determination related to filter application for each strength.

Note that the determination by the application need determination section 110 described herein is merely one example. In other words, a determination condition that is different from the determination condition described above may also be used. For example, any of the determination conditions M1 to M4 and N may be omitted, and other conditions may also be added.

(2) Filter Strength Determination Section

The filter strength determination section 120 determines whether or not to apply each strength of the filter to pixels positioned near the block boundary of an input image (decoded image) for which the application need determination section 110 has determined that the deblocking filter should be applied. For example, the filter strength determination section 120 makes a determination related to the application of the weak filter, the strong filter, and the extended strong filter whose application range is extended beyond the strong filter.

For example, first, the filter strength determination section 120 may determine, in units of four lines, whether or not to apply the extended strong filter to the block boundary. Also, for a block boundary for which it is determined not to apply the extended strong filter, the filter strength determination section 120 may determine, in units of four lines, whether or not to apply the strong filter. Additionally, for a block boundary for which it is determined not to apply the strong filter, the filter strength determination section 120 may determine, in units of one line, whether or not to apply the weak filter.

According to such a configuration, a stronger filter is applied more readily to a block boundary to which a stronger filter is applicable.

In the case of determining to apply any of the extended strong filter, the strong filter, and the weak filter, the filter strength determination section 120 outputs information indicating the filter strength (for example, a flag indicating one of the extended strong filter, the strong filter, and the weak filter) to the filtering section 130 for every determined unit.

Also, for lines for which it is determined not to apply any of the extended strong filter, the strong filter, and the weak filter, the filter strength determination section 120 causes the filtering section 130 to skip application of the deblocking filter.

The determination related to the application of the strong filter the filter strength determination section 120 may be performed using the determination conditions A1, B1, and C1 related to the application of the strong filter in HEVC described above for example. Also, the determination related to the application of the weak filter by the filter strength determination section 120 may be performed similarly to the determination related to the application of the weak filter in HEVC for example.

Figure 13:
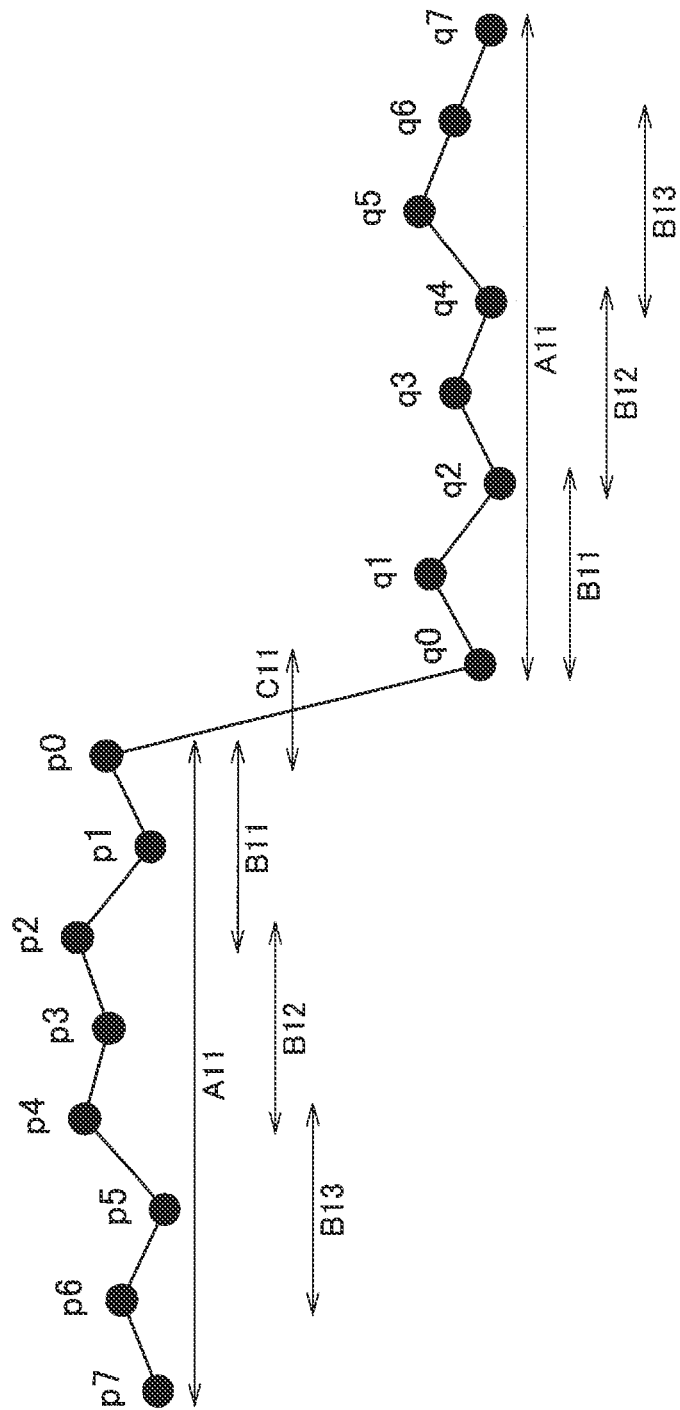
FIG. 13 is an explanatory diagram for explaining a determination process for determining whether or not to apply an extended strong filter.

In the following, a determination process related to the application of the extended strong filter by the filter strength determination section 120 will be described. FIG. 13 is an explanatory diagram for explaining the determination process for determining whether or not to apply the extended strong filter. The application range of the extended strong filter (extended application range) according to the present example is 7 pixels positioned near the block boundary, corresponding to p0 to p6 and q0 to q6 among the pixels illustrated in FIG. 13.

The filter strength determination section 120 according to the present example determines whether or not to apply the extended strong filter in accordance with the application range of the extended strong filter (extended application range). For example, the filter strength determination section 120 may perform the determination process by referencing pixels over a wider range than the extended application range.

According to such a configuration, in the case in which a boundary between an object and the background or the like exists in the range where the extended strong filter is to be applied for example, it is possible to make a determination such that the extended strong filter is less likely to be applied and a more appropriate deblocking filter is more likely to be applied.

For example, the filter strength determination section 120 may determine to apply the extended strong filter in the case in which the following condition V11 is satisfied.

Condition V11: True if All of the Following Conditions A110, B111 to B113, and C110 are True
(A110) $|p7-p0|+|q7-q0|<(beta\gg 3)$
(B111) $|p2-2*p1+p0|+|q2-2*q1+q0|<(beta\gg 2)$
(B112) $|p4-2*p3+p2|+|q4-2*q3+q2|<(beta\gg 2)$
(B113) $|p6-2*p5-p4|+|q6-2*q5+q4|<(beta\gg 2)$
(C110) $|p0-q0|<((tc*5+1)\gg 1)$ Also, as another example of the determination condition, the filter strength determination section 120 may determine to apply the extended strong filter in the case in which the following condition V12 is satisfied.

Determination condition V12: true if all of the following conditions A110, B110, and C110 are true
(A110) $|p7-p0|+|q7-q0|<((beta\gg 3)$
(B110) $|p2-2*p1+p0|+|q2-2*q1+q0|+|p4-2*p3+p2|+|q4-2*q3+q2|+|p6-2*p5+p4|+|q6-2*q5+q4|<(3*beta\gg 2)$
(C110) $|p0-q0|<((tc*5+1)\gg 1)$ Also, as another example of the determination condition, the filter strength determination section 120 may determine to apply the extended strong filter in the case in which the following condition V13 is satisfied.

Condition V13: true if all of the following conditions A110, B115, and C110 are true
(A110) $|p7-p0|+|q7-q0|<((beta\gg 3)$
(B115) $|p6-2*p3+p0|+|q6-2*q3+q0|<(beta\gg 2)$
(C110) $|p0-q0|<((tc*5+1)\gg 1)$ In the above conditions V11 to V13, the range of pixels referenced by the condition A110 corresponds to the range A11 illustrated in FIG. 13. Also, in the above condition V11, the range of pixels referenced by the conditions B111 to B113 correspond to the ranges B11 to B13 illustrated in FIG. 13, respectively. Also, in the above conditions V12 and V13, the range of pixels referenced by the conditions B110 and B115 correspond to the ranges B11 to B13 illustrated in FIG. 13.

Note that in the above conditions V11 to V13, the condition A110 is a condition that determines the flatness inside the blocks. Also, the conditions B110, B111 to B113, and B115 are conditions that determine the continuity inside the blocks. Also, the condition C110 uses pixel values adjacent to the block boundary to determine the amount of change (gap) between the blocks.

Herein, in the conditions B110, B111 to B113, and B115 that determine the continuity, the pixels used are extended continuously compared to the existing condition B1 that determines the continuity described above. In other words, the filter strength determination section 120 performs a continuity determination process that determines the continuity of pixel values included in the extended application range in accordance with a condition in which the pixels to use when determining the continuity of the pixel values included in the extended application range are extended continuously.

Also, in this specification, the states of the flatness of the pixel values, the continuity of the pixel values, and the amount of change (gap) of the pixel values targeting the pixels included in the application range or the extended application range of the deblocking filter are collectively designated the state of the pixels included in the application range or the state of the pixels included in the extended application range. By using one of the conditions V11 to V13, the filter strength determination section 120 according to the present example determines whether to apply the extended strong filter in accordance with the state of the pixels included in the extended application range.

In addition, the filter strength determination section 120 may also determine whether or not to apply the extended strong filter in units of tour lines, and may also determine to apply the extended strong filter in the case in which both the first line and fourth line satisfy one of the above conditions V11 to V13.

In addition, the filter strength determination section 120 may also determine whether or not to apply the extended strong filter by combining one of the above conditions V11 to V13 with the condition R1 or the condition R2 in the existing technique described above. Note that in the present example, the threshold value of the condition R1 is not limited to 16, and another value may also be used as the threshold value.

(3) Filtering Section

The filtering section 130 applies the deblocking filter to pixels positioned near a block boundary of the input image (decoded image) according to the results of the determinations by the application need determination section 110 and the filter strength determination section 120. In the case in which the filter strength determination section 120 determines to apply the strong filter or the weak filter, the strong filter or the weak filter of HEVC for example may be applied.

Also, the filtering section 130 applies the extended strong filter to pixels for which the filter strength determination section 120 determines to apply the extended strong filter.

Hereinafter, one example of the extended strong filter applied by the filtering section 130 will be described.

Figure 14:
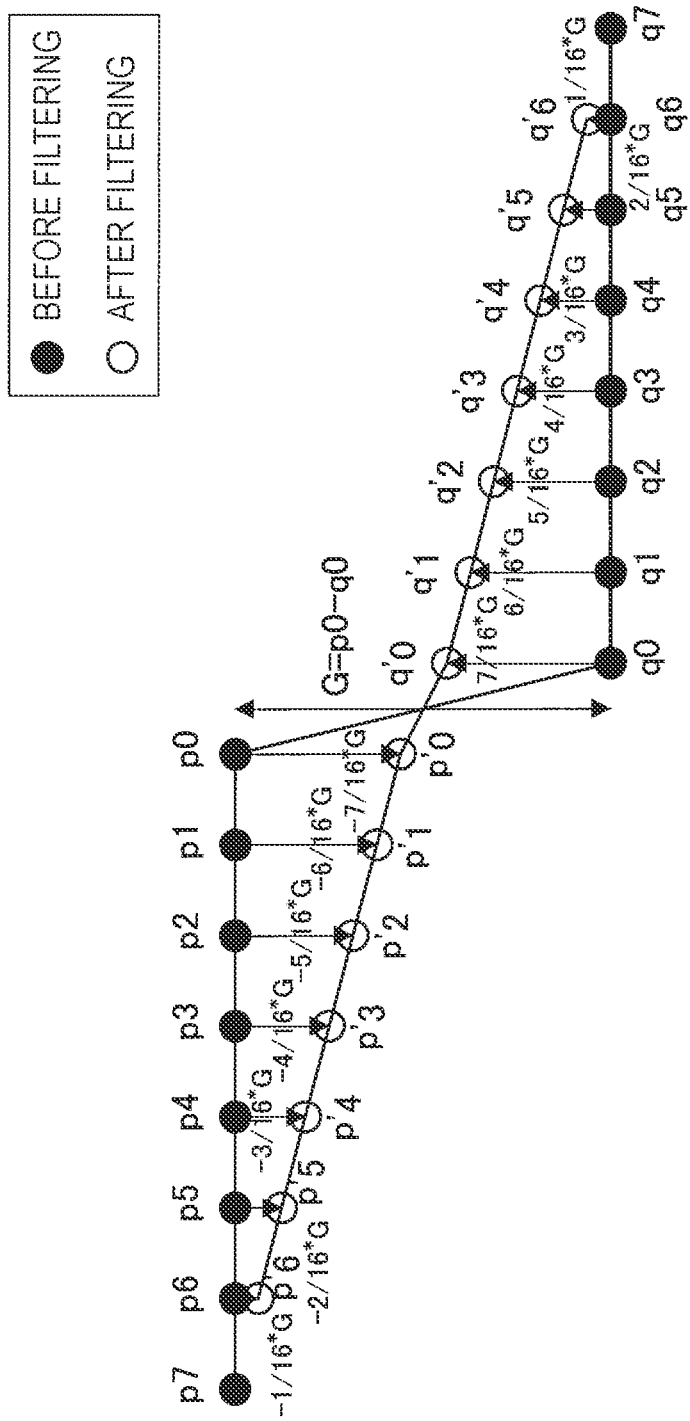
FIG. 14 is an explanatory diagram for explaining one example of an extended strong filter applied by a filtering section 130.

FIG. 14 is an explanatory diagram for explaining one example of the extended strong filter applied by the filtering section 130. As illustrated in FIG. 14, suppose a case in which a gap G that causes blocking artifacts exists at the block boundary (between p0 and q0) to which the extended strong filter is applied, and there is no difference between the pixel values (the pixel values are flat) in the extended application range inside the blocks (p0 to p6 and q0 to q6). In such a case, by applying a filter with strong low-frequency characteristics such that the amount of shift G=p0−q0 changes depending on the position from the block boundary, blocking artifacts as illustrated in FIG. 14 may be reduced.

For example, the filtering section 130 may apply the extended strong filter with first filter coefficients like the following to pixels for which the filter strength determination section 120 determines to apply the extended strong filter.

First Filter Coefficients p6'=Clip3(p6−2*tc,p6+2*tc,(4*p7+8*p6+4*p5−p0+q0+8)>>4)

p5'=Clip3(p5−2*tc,p5+2*tc,(4*p6+8*p5+4*p4−2*p0+2*q0+8)>>4)

p4'=Clip3(p4−2*tc,p4+2*tc,(4*p5+8*p4+4*p3−3*p0+3*q0+8)>>4)

p3'=Clip3(p3−2*tc,p3+2*tc,(4*p4+8*p3+4*p2−4*p0+4*q0+8)>>4)

p2'=Clip3(p2−2*tc,p2+2*tc,(4*p3+8*p2+4*p1−5*p0+5*q0+8)>>4)

p1'=Clip3(p1−2*tc,p1+2*tc,(4*p2+8*p1+4*p0−6*q0+6*q0+8)>>4)

p0'=Clip3(p0−2*tc,p0+2*tc,(4*p1+5*p0+7*q0+8)>>4)

q0'=Clip3(q0−2*tc,q0+2*tc,(7*p0+5*q0+4*q1+8)>>4)

q1'=Clip3(q1−2*tc,q1+2*tc,(6*p0−6*q0+4*q0+8*q1+4*q2+8)>>4)

q2'=Clip3(q2−2*tc,q2+2*tc,(5*p0−5*q0+4*q1+8*q2+4*q3+8)>>4)

q3'=Clip3(q3−2*tc,q3+2*tc,(4*p0−4*q0+4*q2+8*q3+4*q4+8)>>4)

q4'=Clip3(q4−2*tc,q4+2*tc,(3*p0−3*q0+4*q3+8*q4+4*q5+8)>>4)

q5'=Clip3(q5−2*tc,q5+2*tc,(2*p0−2*q0+4*q4+8*q5+4*q6+8)>>4)

q6'=Clip3(q6−2*tc,q6+2*tc,(p0−q0+4*q5+8*q6+4*q7+8)>>4)

Also, the filtering section 130 may apply the extended strong filter with second filter coefficients like the following to pixels for which the filter strength determination section 120 determines to apply the extended strong filter.

Second Filter Coefficients p6'=Clip3(p6−2*tc,p6+2*tc,(6*p7+4*p6+4*p5+2*p4−p0−q0+8)>>4)

p5'=Clip3(p5−2*tc,p5+2*tc,(2*p7+4*p6+4*p5+4*p4+2*p3−2*p0+2*q0+8)>>4)

p4'=Clip3(p4−2*tc,p4+2*tc,(2*p6+4*p5+4*p4+4*p3+2*p2−3*p0+3*q0+8)>>4)

p3'=Clip3(p3−2*tc,p3+2*tc,(2*p5+4*p4+4*p3+4*p2+2*p1−4*p0+4*q0+8)>>4)

p2'=Clip3(p2−2*tc,p2+2*tc,(2*p4+4*p3+4*p2+4*p1+2*p0−5*q0+5*q0+8)>>4)

p1'=Clip3(p1−2*tc,p1+2*tc,(2*p3+4*p2+4*p1+6*q0+8)>>4)

p0'=Clip3(p0−2*tc,p0+2*tc,(2*p2+4*p1+3*p0+5*q0+2*q1+8)>>4)

q0'=Clip3(q0−2*tc,q0+2*tc,(2*p1+5*p0+3*q0+4*q1+2*q2+8)>>4)

q1'=Clip3(q1−2*tc,q1+2*tc,(6*p0+4*q1+4*q2*q3+8)>>4)

q2'=Clip3(q2−2*tc,q2+2*tc,(5*p0−5*q9+2*q0+4*q1+4*q2−4*q3+2*q4+8)>>4)

q3'=Clip3(q3−2*tc,q3+2*tc,(4*p0−4*q0+2*q1+4*q2+4*q3+4*q4+2*q5+8)>>4)

q4'=Clip3(q4−2*tc,q4+2*tc,(3*p0−3*q0+2*q2+4*q3+4*q4+4*q5+2*q6+8)>>4)

q5'=Clip3(q5−2*tc,q5+2*tc,(2*p0−2*q0+2*q3+4*q4+4*q5+4*q6+2*q7+8)>>4)

q6'=Clip3(q6−2*tc,q6+2*tc,(p0−q0+2*q4+4*q5+4*q6+6*q7+8)>>4)

Figure 15:
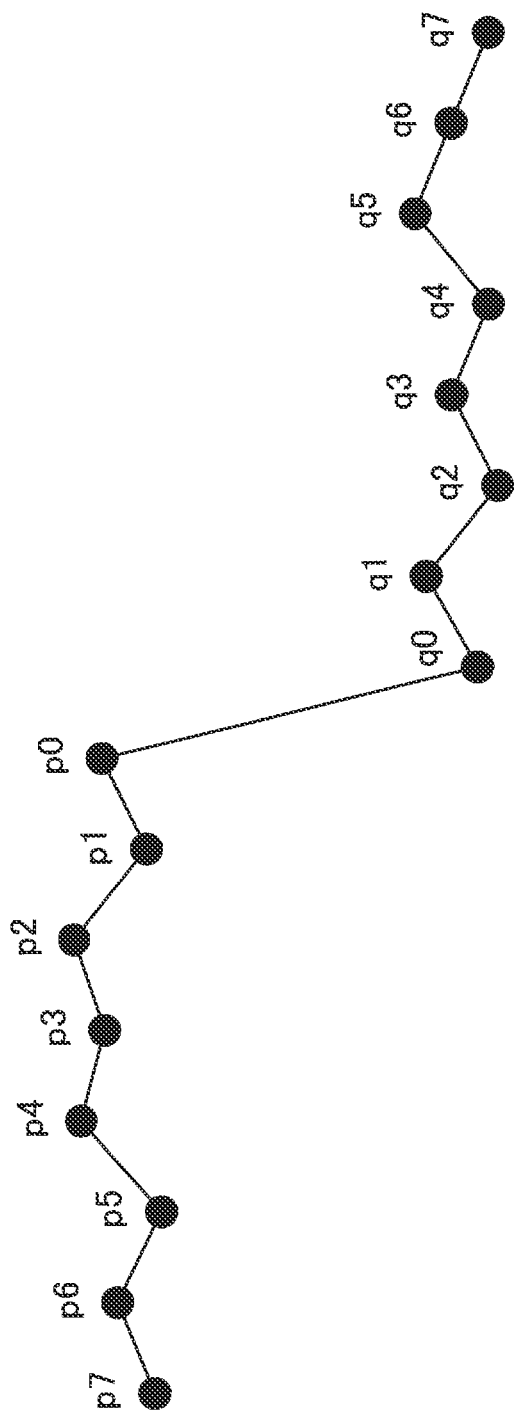
FIG. 15 is an explanatory diagram for explaining the line of thinking in the derivation of the filter coefficients of the extended strong filter applied by the filtering section 130 according to the first example.
Figure 16:
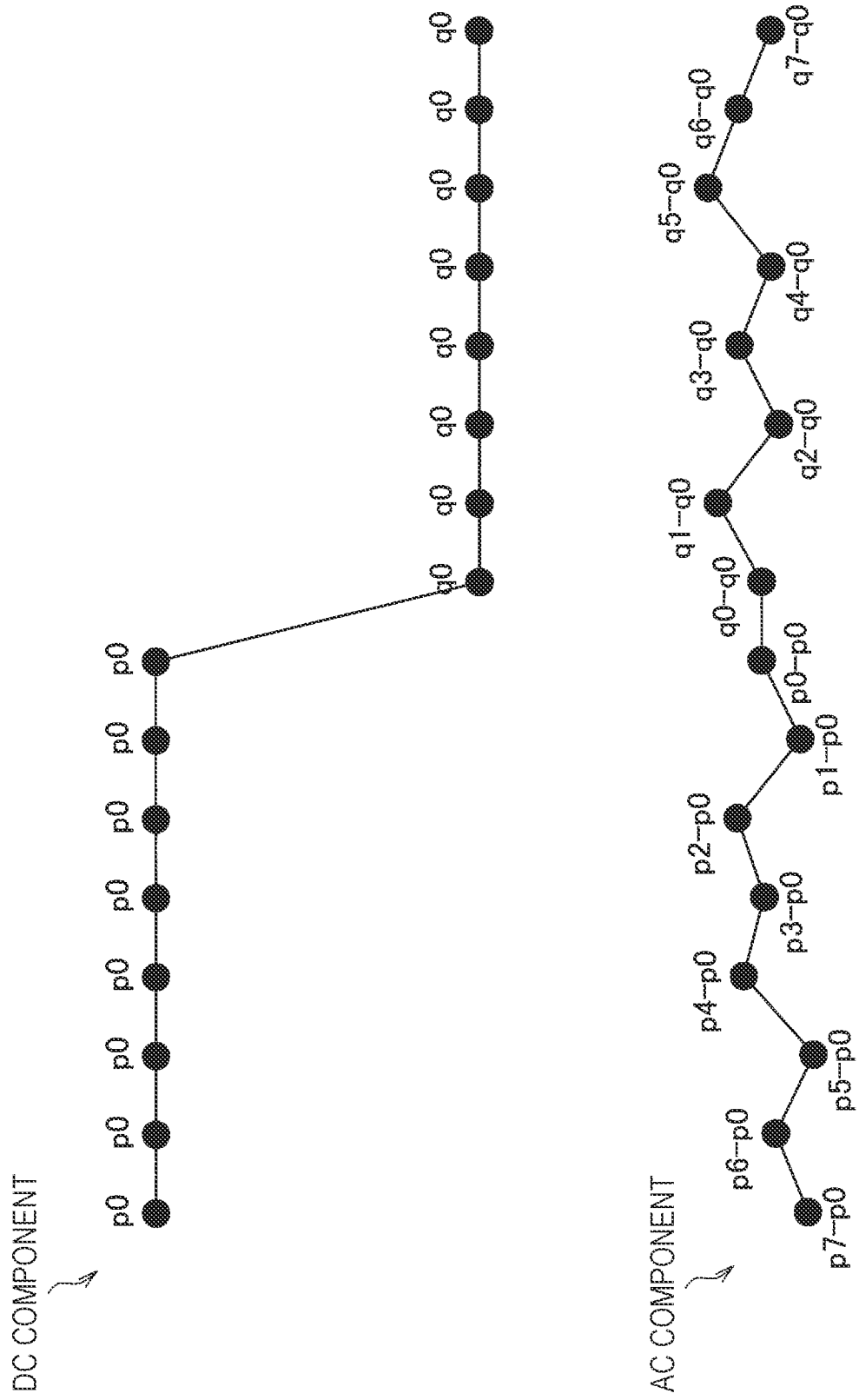
FIG. 16 is an explanatory diagram for explaining the line of thinking in the derivation of the filter coefficients of the extended strong filter applied by the filtering section 130 according to the first example.

FIGS. 15 and 16 are explanatory diagrams for explaining the line of thinking in the derivation of the filter coefficients of the extended strong filter applied by the filtering section 130 according to the present example.

The first filter coefficients and the second filter coefficients described above have strong low-frequency characteristics and are capable of strong smoothing. For this reason, in cases in which pixels near the block boundary exhibit little change in pixel values inside the blocks as illustrated in FIG. 14, the extended strong filter according to the first filter coefficients and the second filter coefficients functions effectively. However, in cases in which the pixel values change inside the blocks as illustrated in FIG. 15 for example, applying the extended strong filter according to the first filter coefficients and the second filter coefficients causes over-smoothing, and there is a risk of the picture becoming blurred, for example.

At this point, breaking down the pixel values near the block boundary illustrated in FIG. 15 into a DC component (low-frequency component) and an AC component (high-frequency component) as illustrated in FIG. 16 will be considered.

The DC component is the signal values that serve as a base for each of the blocks (pi and qi) on either side of the block boundary for example. For example, in the example illustrated in FIG. 15, the values closest to the block boundary, namely p0 and q0, are used as the DC component. Note that the DC component is not limited to such an example, and may also be the average value in each block (mean(p0:pn) and mean(q0:qn)) or the minimum value in each block (min(p0:pn) and min(q0:qn)). Note that n is decided according to the reference range (tap range) of the extended strong filter.

Also, the AC component is the residual signal values obtained by subtracting the above DC component in each of the blocks (pi and qi) on either side of the block boundary. In the example illustrated in FIG. 15, the values obtained by subtracting p0 in the p-side block and the values obtained by subtracting q0 in the q-side block are the AC component.

Subsequently, a blocking artifact removal filter with strong low-frequency characteristics (for example, a filter according to the first filter characteristics or the second filter characteristics) is applied to the DC component. On the other hand, a filter different from the above, such as a filter different front a blocking artifact removal filter for example, may also be applied to the AC component. For example, an FIR filter or a bilateral filter with weak low-frequency characteristics may be applied to the AC component. Also, a filter does not have to be applied to the AC component.

For example, a filter with third filter coefficients like the following may be applied to the DC component.

Third Filter Coefficients
p0 position: p0−7/16*(p0−q0)=p0−7*(p0−q0)>>4
p1 position: p0−6/16*(p0−q0)=p0−6*(p0−q0)>>4
p2 position: p0−5/16*(p0−q0)=p0−5*(p0−q0)>>4
p3 position: p0−4/16*(p0−q0)=p0−4*(p0−q0)>>4
p4 position: p0−3/16*(p0−q0)=p0−3*(p0−q0)>>4
p5 position: p0−2/16*(p0−q0)=p0−2*(p0−q0)>>4
p6 position: p0−1/16*(p0−q0)=p0−1*(p0−q0)>>4

Also, a filter with fourth filter coefficients having 121 coefficients centered on a target pixel as follows may be applied to the AC component.

Fourth Filter Coefficients
p0 position: {1*(p1−p0)+2*(p0−p0)+1*(q0−q0)}/4=1*(p1−p0)>>2
p1 position: {1*(p2−p0)+2*(p1−p0)+1*(p0−p0)}/4={1*(p2−p0)+2*(p1−p0)}>>2
p2 position: {1*(p3−p0)+2*(p2−p0)+1*(p1−q0)}/4={1*(p3−p0)+2*(p2−p0)+1*(p1−q0)}>>2
p3 position: {1*(p4−p0)+2*(p3−p0)+1*(p2−q0)}/4={1*(p4−p0)+2*(p3−p0)+1*(p2−q0)}>>2
p4 position: {1*(p5−p0)+2*(p4−p0)+1*(p3−q0)}/4={1*(p5−p0)+2*(p4−p0)+1*(p3−q0)}>>2
p5 position: {1*(p6−p0)+2*(p5−p0)+1*(p4−q0)}/4={1*(p6−p0)+2*(p5−p0)+1*(p4−q0)}>>2
p6 position: {1*(p7−p0)+2*(p6−p0)+1*(p5−q0)}/4={1*(p7−p0)+2*(p6−p0)+1*(p5−q0)}>>2

The filtering section 130 may apply the extended strong filter with fifth filter coefficients like the following, which are obtained by combining the third filter coefficients and the fourth filter coefficients described above, to pixels for which the filter strength determination section 120 determines to apply the extended strong filter.

Fifth Filter Coefficients $$p0' = Clip3(p0 - 2*tc, p0 + 2*tc, 1*(p1 - p0) >> \\ 2 + p0 - 7*(p0 - q0) >> 4 + \textit{offset}0) \\ = Clip3(p0 - 2*tc, p0 + 2*tc, (4*p1 + 5*p0 + 7* \\ q0 + \textit{offset}0) >> 4)$$

$$p1' = Clip3(p1 - 2*tc, p1 + 2*tc, \{1*(p2 - p0) + \\ 2*(p1 - p0)\} >> 2 + p0 - 6*(p0 - q0) >> 4 + \textit{offset}1) \\ = Clip3(p1 - 2*tc, p1 + 2*tc, (4*p2 + 8*p1 + 4*p0 - 6* \\ p0 + 6*q0 + \textit{offset}1) >> 4)$$

$$p2' = Clip3(p2 - 2*tc, p2 + 2*tc, \{1*(p3 - p0) + 2* \\ (p2 - p0) + 1*(p1 - p0)\} >> 2 + p0 - 5*(p0 - q0) >> \\ 4 + \textit{offset}2) \\ = Clip3(p2 - 2*tc, p2 + 2*tc, (4*p3 + 8*p2 + 4*p1 - 5* \\ p0 + 5*q0 + \textit{offset}2) >> 4)$$

$$p3' = Clip3(p3 - 2*tc, p3 + 2*tc, \{1*(p4 - p0) + 2* \\ (p3 - p0) + 1*(p2 - p0)\} >> 2 + p0 - 4*(p0 - q0) >> \\ 4 + \textit{offset}3) \\ = Clip3(p3 - 2*tc, p3 + 2*tc, (4*p4 + 8*p3 + 4*p2 - \\ 4*p0 + 4*q0 + \textit{offset}3) >> 4)$$

$$p4' = Clip3(p4 - 2*tc, p4 + 2*tc, \{1*(p5 - p0) + 2* \\ (p4 - p0) + 1*(p3 - p0)\} >> 2 + p0 - 3*(p0 - q0) >> \\ 4 + \textit{offset}4) \\ = Clip3(p4 - 2*tc, p4 + 2*tc, (4*p5 + 8*p4 + 4*p3 - \\ 3*p0 + 3*q0 + \textit{offset}4) >> 4)$$

$$p5' = Clip3(p5 - 2*tc, p5 + 2*tc, 1*(p6 - p0) + 2* \\ (p5 - p0) + 1*(p4 - p0)\} >> 2 + p0 - 2*(p0 - q0) >> \\ 4 + \textit{offset}5) \\ = Clip3(p5 - 2*tc, p5 + 2*tc, (4*p6 + 8*p5 + 4*p4 - \\ 2*p0 + 2*q0 + \textit{offset}5) >> 4)$$

$$p6' = Clip3(p6 - 2*tc, p6 + 2*tc, \{1*(p7 - p0) + 2* \\ (p6 - p0) + 1*(p5 - p0)\} >> 2 + p0 - 1*(p0 - q0) >> \\ 4 + \textit{offset}6) \\ = Clip3(p6 - 2*tc, p6 + 2*tc, (4*p7 + 8*p6 + 4*p5 - \\ p0 + q0 + \textit{offset}6) >> 4)$$

Also, a filter with sixth filter coefficients having 12221 coefficients centered on a target pixel as follows may be applied to the AC component.

Sixth Filter Coefficients
p0 position: {1*(p2−p0)+2*(p1−p0)+2*(p0−p0)+2*(q0−q0)+1*(q1−q0)}/8={1*(p2−p0)+2*(p1−p0)+1*(q1−q0)}>>3
p1 position: {1*(p3−p0)+2*(p2−p0)+2*(p1−p0)+2*(p0−p0)+1*(q0−q0)}/8={1*(p3−p0)+2*(p2−p0)+2*(p1−p0)}>>3
p2 position: {1*(p4−p0)+2*(p3−p0)+2*(p2−p0)+2*(p1−p0)+1*(p0−p0)}/8={1*(p4−p0)+2*(p3−p01+*(p2−p0)+2*(p1−p0)}>>3
p3 position: {1*(p5−p0)+2*(p4−p0)+2*(p3−p0)+2*(p2−p0)+1*(p1−p0)}/8={1*(p5−p0)+2*(p4−p0)+2*(p3−p0)+2*(p2−p0)+1*(p1−p0)}>>3
p4 position: {1*(p6−p0)+2*(p5−p0)+2*(p4−p0)+2*(p3−p0)+1*(p2−p0)}/8={1*(p6−p0)+2*(p5−p0)+2*(p4−p0)+2*(p3−p0)+2*(p2−p0)}>>3
p5 position: {1*(p7−p0)+2*(p6−p0)+2*(p5−p0)+2*(p4−p0)+1*(p3−p0)}/8={1*(p7−p0)+2*(p6−p0)+2*(p5−p0)+2*(p4−p0)+1*(p3−p0)}>>3
p6 position: {1*(p7−p0)+2*(p7−p0)+2*(p6−p0)+2*(p5−p0)+1*(p4−p0)}/8={3*(p7−p0)+2*(p6−p0)+2*(p5−p0)+1*(p4−p0)}>>3

Note that in the p6 position of the sixth filter coefficients above, the leftmost reference pixel is p8, but since the pixels referenced in the determination by the filter strength determination section 120 only go up to p7, p7 is used instead of p8.

The filtering section 130 may apply the extended strong filter with seventh filter coefficients like the following, which are obtained by combining the third filter coefficients and the sixth filter coefficients described above, to pixels for which the filter strength determination section 120 determines to apply the extended strong filter.

Seventh Filter Coefficients $$p0' = Clip3(p0 - 2*tc, p0 + 2*tc, \{1*(p2 - p0) + 2* \\ (p1 - p0) + 1*(q1 - q0)\} >> 3 + p0 - 7*(p0 - q0) >> \\ 4 + \textit{offset}0) \\ = Clip3(p0 - 2*tc, p0 + 2*tc, (2*p2 + 4*p1 + 3* \\ p0 + 5*q0 + 2*q1 + \textit{offset}0) >> 4)$$

-continued $$p1' = Clip3(p1 - 2*tc, p1 + 2*tc, \{1*(p3 - p0) + 2* \\ (p2 - p0) + 2*(p1 - p0)\} >> 3 + p0 - 6*(p0 - q0) >> \\ 4 + \textit{offset}1) \\ = Clip3(p1 - 2*tc, p1 + 2*tc, (2*p3 + 4*p2 + 4*p1 + \\ 6*q0 + \textit{offset}1) >> 4)$$

$$p2' = Clip3(p2 - 2*tc, p2 + 2*tc, \{1*(p4 - p0) + 2*(p3 - p0) + \\ 2*(p2 - p0) + 2*(p1 - p0)\} >> 3 + p0 - 5*(p0 - q0) >> \\ 4 + \textit{offset}2) \\ = Clip3(p2 - 2*tc, p2 + 2*tc, (2*p4 + 4*p3 + 4*p2 + 4* \\ p1 - 3*p0 + 5*q0 + \textit{offset}2) >> 4)$$

$$p3' = Clip3(p3 - 2*tc, p3 + 2*tc, \{1*(p5 - p0) + 2* \\ (p4 - p0) + 2*(p3 - p0) + 2*(p2 - p0) + 1*(p1 - p0)\} >> \\ 3 + p0 - 4*(p0 - q0) >> 4 + \textit{offset}3) \\ = Clip3(p3 - 2*tc, p3 + 2*tc, (2*p5 + 4*p4 + 4*p3 + 4* \\ p2 + 2*p1 - 4*p0 + 4*q0 + \textit{offset}3) >> 4)$$

$$p4' = Clip3(p4 - 2*tc, p4 + 2*tc, \{1*(p6 - p0) + 2* \\ (p5 - p0) + 2*(p4 - p0) + 2*(p3 - p0) + 1*(p2 - p0)\} >> \\ 3 + p0 - 3*(p0 - q0) >> 4 + \textit{offset}4) \\ = Clip3(p4 - 2*tc, p4 + 2*tc, (2*p6 + 4*p5 + 4*p4 + 4* \\ p3 + 2*p2 - 3*p0 + 3*q0 + \textit{offset}4) >> 4)$$

$$p5' = Clip3(p5 - 2*tc, p5 + 2*tc, \{1*(p7 - p0) + 2* \\ (p6 - p0) + 2*(p5 - p0) + 2*(p4 - p0) + 1*(p3 - p0)\} >> \\ 3 + p0 - 2*(p0 - q0) >> 4 + \textit{offset}5) \\ = Clip3(p5 - 2*tc, p5 + 2*tc, (2*p7 + 4*p6 + 4*p5 + \\ 4*p4 + 2*p3 - 2*p0 + 2*q0 + \textit{offset}5) >> 4)$$

$$p6' = Clip3(p6 - 2*tc, p6 + 2*tc, \{3*(p7 - p0) + 2* \\ (p6 - p0) + 2*(p5 - p0) + 1*(p4 - p0)\} >> 3 + \\ p0 - 1*(p0 - q0) >> 4 + \textit{offset}6) \\ = Clip3(p6 - 2*tc, p6 + 2*tc, (6*p7 + 4*p6 + 4*p5 + \\ 2*p4 - p0 + q0 + \textit{offset}6) >> 4)$$

Also, a filter does not have to be applied to the AC component. In such a case, the filtering section 130 may apply the extended strong filter with eighth filter coefficients like the following, which are obtained by combining the third filter coefficients described above and the AC component, to pixels for which the filter strength determination section 120 determines to apply the extended strong filter.

Eighth Filter Coefficients $$p0' = Clip3(p0 - 2*tc, p0 + 2*tc, 0 + p0 - 7*(p0 - q0) >> \\ 4 + \textit{offset}0) \\ = Clip3(p0 - 2*tc, p0 + 2*tc, (9*p0 + 7*q0 + \\ \textit{offset}0) >> 4)$$

$$p1' = Clip3(p1 - 2*tc, p1 + 2*tc, p1 - p0 + p0 - 6* \\ (p0 - q0) >> 4 + \textit{offset}1) \\ = Clip3(p1 - 2*tc, p1 + 2*tc, (16*p1 - 6*p0 + 6* \\ q0 + \textit{offset}1) >> 4)$$

$$p2' = Clip3(p2 - 2*tc, p2 + 2*tc, p2 - p0 + p0 - 5* \\ (p0 - q0) >> 4 + \textit{offset}2) \\ = Clip3(p2 - 2*tc, p2 + 2*tc, (16*p2 - 5*p0 + 5* \\ q0 + \textit{offset}2) >> 4)$$

$$p3' = Clip3(p3 - 2*tc, p3 + 2*tc, p3 - p0 + p0 - 4* \\ (p0 - q0) >> 4 + \textit{offset}3) \\ = Clip3(p3 - 2*tc, p3 + 2*tc, (16*p3 - 4*p0 + 4* \\ q0 + \textit{offset}3) >> 4)$$

$$p4' = Clip3(p4 - 2*tc, p4 + 2*tc, p4 - p0 + p0 - 3* \\ (p0 - q0) >> 4 + \textit{offset}4) \\ = Clip3(p4 - 2*tc, p4 + 2*tc, (16*p4 - 3*p0 + 3* \\ q0 + \textit{offset}4) >> 4)$$

$$p5' = Clip3(p5 - 2*tc, p5 + 2*tc, p5 - p0 + p0 - 2* \\ (p0 - q0) >> 4 + \textit{offset}5) \\ = Clip3(p5 - 2*tc, p5 + 2*tc, (16*p5 - 2*p0 + 2* \\ q0 + \textit{offset}5) >> 4)$$

$$p6' = Clip3(p6 - 2*tc, p6 + 2*tc, p6 - p0 + p0 - 1* \\ (p0 - q0) >> 4 + \textit{offset}6) \\ = Clip3(p6 - 2*tc, p6 + 2*tc, (16*p6 - p0 + \\ q0 + \textit{offset}6) >> 4)$$

[3-2. Process Flow]

Figure 17:
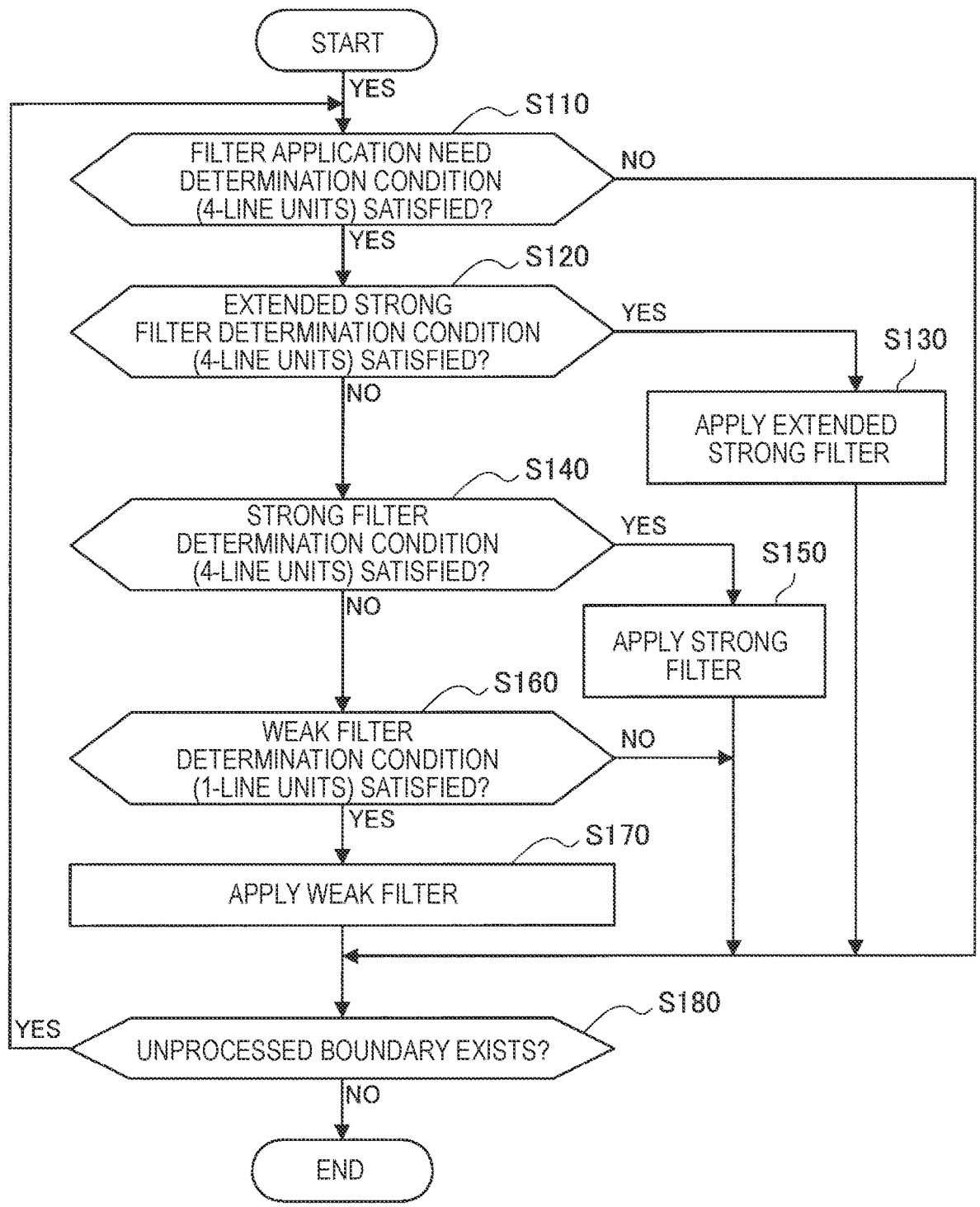
FIG. 17 is a flowchart illustrating one example of the flow of a process by a deblocking filter 24 according to the first embodiment.

FIG. 17 is a flowchart illustrating one example of the flow of a process by the deblocking filter 24 according to the present example. The process from step S110 to step S180 in FIG. 17 is repeated for each block boundary in units of four lines in an input image.

First, for a single boundary to process (hereinafter designated the target boundary), the application need determination section 110 determines, in units of four lines, whether or not the application need determination condition of the deblocking filter is satisfied (S110). At this point, in the case in which the filter application need determination condition is not satisfied, the subsequent process from step S120 to step S170 is skipped. On the other hand, in the case in which the determination condition in units of boundaries is satisfied, the process proceeds to step S120.

In step S120, the filter strength determination section 120 determines, in units of four lines, whether or not the extended strong filter determination condition is satisfied in accordance with the state of the pixels included in the extended application range. In the case in which the extended strong filter determination condition is satisfied (YES in S120), the process proceeds to step S130, and the filtering section 130 applies the extended strong filter.

On the other hand, in the case in Which the extended strong filter determination condition is not satisfied (NO in S120), the process proceeds to step S140, and the filter strength determination section 120 determines, in units of four lines, whether or not the strong filter determination condition is satisfied. In the case in which the strong filter determination condition is satisfied (YES in S140), the process proceeds to step S150, and the filtering section 130 applies the strong filter.

On the other hand, in the case in which the strong filter determination condition is not satisfied (NO in S140), the process proceeds to step S160, and the filter strength determination section 120 determines, in units of one line, whether or not the weak filter determination condition is satisfied. In the case in which the weak filter determination condition is satisfied (YES in S160), the process proceeds to step S170, and the filtering section 130 applies the weak filter to the line.

In step S180, in the case in which an unprocessed boundary remains in the input image (YES in step S180), a new target boundary is set, and the process returns to step S110. In the case in which no unprocessed boundaries remain, the process ends for the input image (decoded image).

[3-3. Modifications]

The above describes a first example, but the extended strong filter applied in the present example is not limited to the example described above. For example, an extended strong filter whose application range is extended from 3 pixels to 5 pixels positioned near the block boundary may also be applied. In the following, as a modification of the present example, the application determination and filter coefficients of such an extended strong filter will be described with reference to FIGS. 18 and 19.

Figure 18:
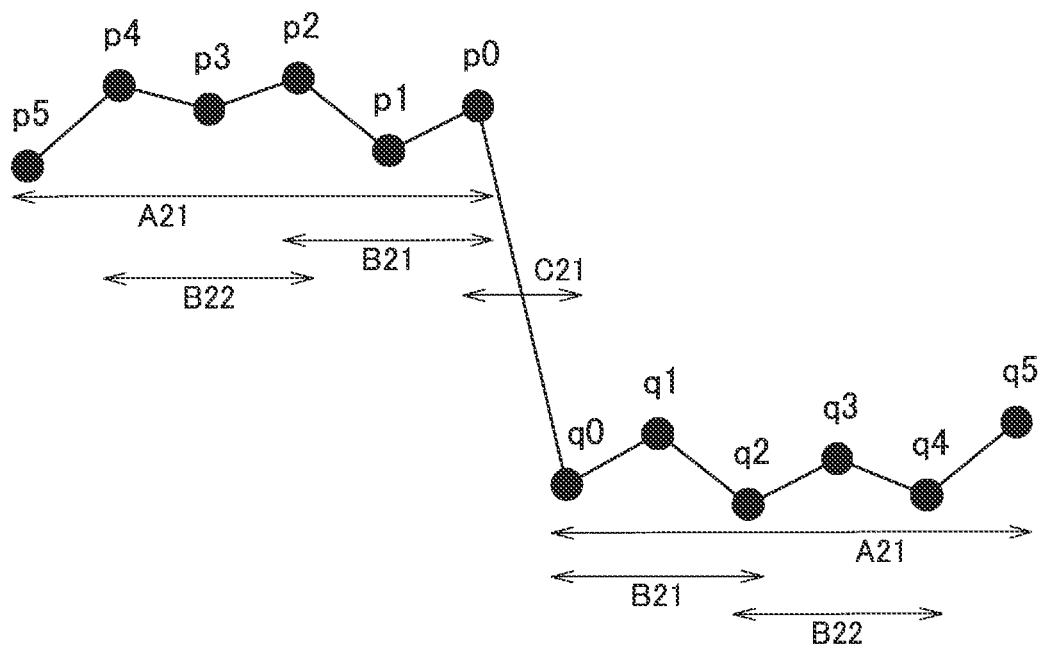
FIG. 18 is an explanatory diagram according to a modification.

FIG. 18 is an explanatory diagram for explaining the determination process for determining whether or not to apply the extended strong filter according to the present modification. The application range of the extended strong filter (extended application range) according to the present modification is 5 pixels positioned near the block boundary, corresponding to p0 to p4 and q0 to q4 among the pixels illustrated in FIG. 18.

The filter strength determination section 120 according to the present modification determines whether or not to apply the extended strong filter in accordance with the extended application range. For example, the filter strength determination section 120 may perform the determination process by referencing pixels included in the extended application range, or may perform the determination process by referencing pixels included in a wider range than the extended application range.

For example, the filter strength determination section 120 may determine to apply the extended strong filter in the case in which the following condition V21 is satisfied.

Condition V21: true if all of the following conditions A210, B211, B212, and C210 are true
(A210) |p5−p0|+|q5−q0|<(beta>>3)
(B211) |p2−2*p1+p0|+|q2−2*q1+q0|<(beta>>2)
(B212) |p4−2*p3+p2|+|q4−2*q4+q2|<(beta>>2)
(C210) |p0−q0|<((tc*5+1)>>1)

Also, as another example of the determination condition, the filter strength determination section 120 may determine to apply the extended strong filter in the case in which the following condition V22 is satisfied.

Determination condition V22: true if all of the following conditions A210, B210, and C210 are true
(A210) |p5−p0|+|q5−q0|<(beta>>3)
(B210) |p2−2*p1+p0|+|q2−2*q1+q0|+|p4−2*p3+p2|+|q4−2*q3+q2|<(2*beta>>2)
(C210) |p0−q0|<((tc*5+1)>>1)

Also, as another example of the determination condition, the filter strength determination section 120 may determine to apply the extended strong filter in the case in which the following condition V13 is satisfied.

Determination condition V23: true if all of the following conditions A210, B215, and C210 are true
(A210) |p5−p0|+|q5−q0|<(beta>>3)
(B215) |p4−2*p2+p0|+|q4−2*q2+q0|<(beta>>2)
(C210) |p0−q0|<((tc*5+1)>>1)

In the above conditions V21 to V23, the range of pixels referenced by the condition A210 corresponds to the range A21 illustrated in FIG. 18. Also, in the above condition V21, the range of pixels referenced by the conditions B211 and B212 correspond to the ranges B21 and B22 illustrated in FIG. 18, respectively. Also, in the above conditions V22 and V23, the range of pixels referenced by the conditions B210 and B215 correspond to the ranges B21 and B22 illustrated in FIG. 18, respectively.

Note that in the above conditions V21 to V23, the condition A210 is a condition that determines the flatness inside the blocks. Also, the conditions B210, B211, B212, and B215 are conditions that determine the continuity inside the blocks. Also, the condition C210 uses pixel values adjacent to the block boundary to determine the amount of change (gap) between the blocks.

Figure 19:
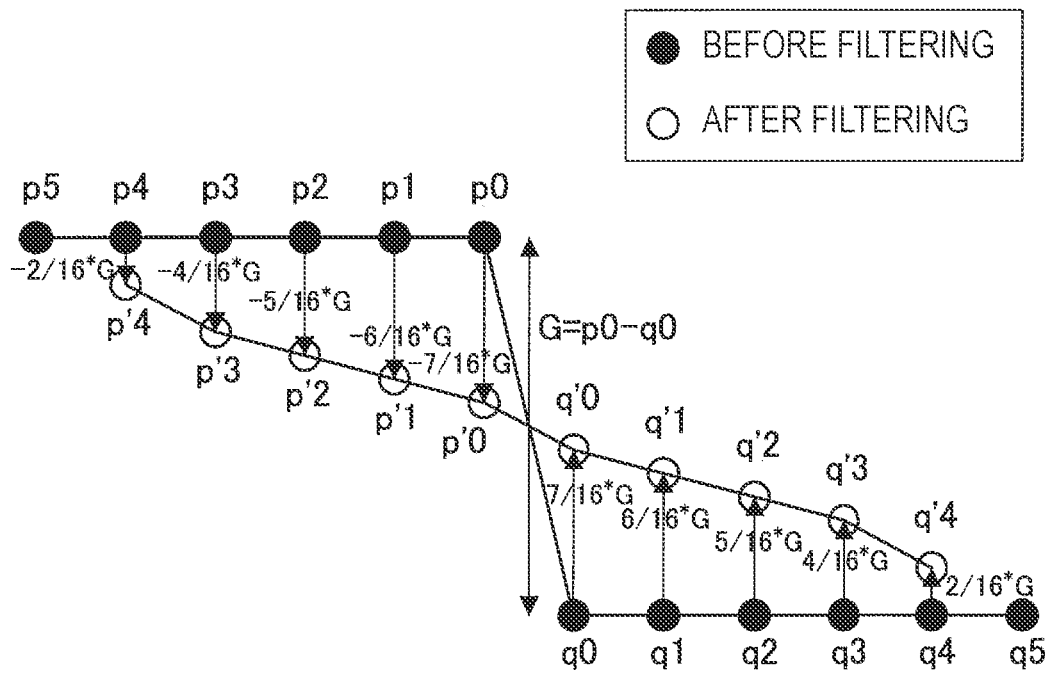
FIG. 19 is an explanatory diagram according to a modification.

Next, an example of the filter coefficients according to the present modification will be described. FIG. 19 is an explanatory diagram for explaining one example of the extended strong filter applied by the filtering section 130 in the present modification. As illustrated in FIG. 19, suppose a case in which a gap G that causes blocking artifacts exists at the block boundary (between p0 and q0) to which the extended strong filter is applied, and there is no difference between the pixel values (the pixel values are flat) in the extended application range inside the blocks (p0 to p4 and q0 to q4). In such a case, by applying a filter with strong low-frequency characteristics such that the amount of shift G=p0−q0 changes depending on the position from the block boundary, blocking artifacts as illustrated in FIG. 19 may be reduced.

For example, the filtering section 130 may apply the extended strong filter with ninth filter coefficients like the following to pixels for which the filter strength determination section 120 determines to apply the extended strong filter.

Ninth Filter Coefficients
p4'=Clip3(p4−2*tc,p4+2*tc,(4*p5+8*p4+4*p3−2*p0+2*q0+8)>>4)
p3'=Clip3(p3−2*tc,p3+2*tc,(4*p4+8*p3+4*p2−4*p0+4*q0+8)>>4)
p2'=Clip3(p2−2*tc,p2+2*tc,(4*p3+8*p2+4*p1−5*p0+5*q0+8)>>4)
p1'=Clip3(p1−2*tc,p1+2*tc,(4*p2+8*p1+4*p0−6*q0+6*q0+8)>>4)
p0'=Clip3(p0−2*tc,p0+2*tc,(4*p1+5*p0+7*q0+8)>>4)
q0'=Clip3(q0−2*tc,q0+2*tc,(7*p0+5*q0+4*q1+8)>>4)
q1'=Clip3(q1−2*tc,q1+2*tc,(6*p0−6*q0+4*q0+8*q1+4*q2+8)>>4)
q2'=Clip3(q2−2*tc,q2+2*tc,(5*p0−5*q0+4*q1+8*q2 4*q3+8)>>4)
q3'=Clip3(q3−2*tc,q3+2*tc,(4*p0−4*q0+4*q2+8*q3+4*(q4+8)>>4)
q4'=Clip3(q4−2*tc,q4+2*tc,(2*p0−2*q0+4*q3+8*q4+4*q5+8)>>4)

Also, the filtering section 130 may apply the extended strong filter with tenth filter coefficients like the following to pixels for which the filter strength determination section 120 determines to apply the extended strong filter.

Tenth Filter Coefficients
p4'=Clip3(p4−2*tc,p4+2*tc,(2*p6+4*p5+4*p4+4*p3+2*p2−2*p0+2*q0+8)>>4)
p3'=Clip3(p3−2*tc,p3+2*tc,(2*p5+4*p4+4*p3+4*p2+2*p1−4*p0+4*q0+8)>>4)
p2'=Clip3(p2−2*tc,p2+2*tc,(2*p4+4*p3+4*p2+4*p1+2*p0−5*q0+5*q0+8)>>4)
p1'=Clip3(p1−2*tc,p1+2*tc,(2*p3+4*p2+4*p1+6*q0+8)>>4)

p0'=Clip3(p0−2*tc,p0+2*tc,(2*p2+4*p1+3*p0+5*q0+2*q1+8)>=>4)

q0'=Clip3(q0−2*tc,q0+2*tc,(2*p1+5*p0+3*q0+4*q1+2*q2+8)>>4)

q1'=Clip3(q1−2*tc,q1+2*tc,(6*p0+4*q1+4*q2+2*q3+8)>>4)

q2'=Clip3(q2−2*tc,q2+2*tc,(5*p0−5*q0+2*q0+4*q1+4*q2+4*q3+2*q4+8)>>4)

q3'=Clip3(q3−2*tc,q3+2*tc,(4*p0−4*q0+2*q1+4*q2+4*q3+4*q4+2*q5+8)>>4)

q4'=Clip3(q4−2*tc,q4+2*tc,(2*p0−2*q0+2*q2+4*q3+4*q4+4*q5+2*q6+8)>>4)

Note that the filter coefficients according to the present modification are not limited to the above example, and may also be filter coefficients obtained by combining the DC component and the AC component as described above for example.

The above describes a modification of the present example. As described above, the application range of the extended strong filter (extended application range) according to the present embodiment is not limited insofar as the range is wider than 3 pixels positioned near the block boundary, and may be a variety of ranges.

Also, the extended strong filter according to the present modification described above may be used in combination with an extended strong filter that is applied to 7 pixels positioned near the block boundary. In the case in which multiple extended strong filters are combined, first it may be determined whether or not to apply the extended strong filter having a wider application range for example, and in the case of not applying the extended strong filter, next it may be determined whether or not to apply the extended strong filter having a narrower application range.

4. Second Example

[4-1. Exemplary Configuration of Deblocking Filter]

Next, the deblocking filter 24 according to the second example will be described. The deblocking filter 24 according to the present example is able to apply a deblocking filter (an asymmetric deblocking filter) with different filter strengths (for example, application ranges) on one side and the other side based on the block boundary. Note that, in particular, the deblocking filter in the case in which the tap shape is asymmetric due to the extended strong filter being applied only on one side based on the block boundary is called an asymmetric extended strong filter in some cases.

The basic configuration of the deblocking filter 24 according to the present example may be similar to the deblocking filter 24 according to the first example illustrated in FIG. 12 for example. However, in the deblocking filter 24 according to the present example, the functions of the filter strength determination section 120 and the filtering section 130 are partially different from the first example. Hereinafter, the functions of the filter strength determination section 120 and the filtering section 130 according to the present example that are different from the first example will be described while appropriately omitting functions that are similar to the first example.

The filter strength determination section 120 according to the present example makes a determination related to the application of the weak filter, the strong filter, and the extended strong filter whose application range is extended beyond the strong filter, similarly to the filter strength determination section 120 according to the first example.

However, making the determination related to the extended strong filter, the filter strength determination section 120 according to the present example may determine, in units of four lines, whether or not the block boundary satisfies the strong filter determination condition. Subsequently, in the case of determining that the block boundary satisfies the strong filter determination condition, it may also be determined, in units of four lines, whether or not to apply the extended strong filter on each side based on the block boundary.

According to such a configuration, even if there is a boundary where a large block and a small block are adjacent, the extended strong filter is more likely to be applied only to the large block, for example. For example, even in cases in which applying a filter whose application range is extended beyond the strong filter is difficult with an existing determination method because a large block and a small block are adjacent to each other like in the region H20 illustrated in FIG. 8, according to the present example, the extended strong filter may be applied to the pixels on the large block side.

Also, even in cases in which it is not desirable to apply the extended strong filter described in the first example because a boundary between an object and the background exists only near one side based on the block boundary or the like, it is possible to determine to apply the extended strong filter to nearby pixels on the other side. For this reason, it becomes possible to reduce blocking artifacts further.

Additionally, the filter strength determination section 120 according to the present example may determine to apply the strong filter to the block on the side for which it is determined not to apply the extended strong filter (for which the extended strong filter determination condition is not satisfied).

Additionally, similarly to the filter strength determination section 120 according to the first example, the filter strength determination section 120 according to the present example may determine, in units of one line, whether or not to apply the weak filter to a block boundary determined not to satisfy the strong filter determination condition.

Figure 20:
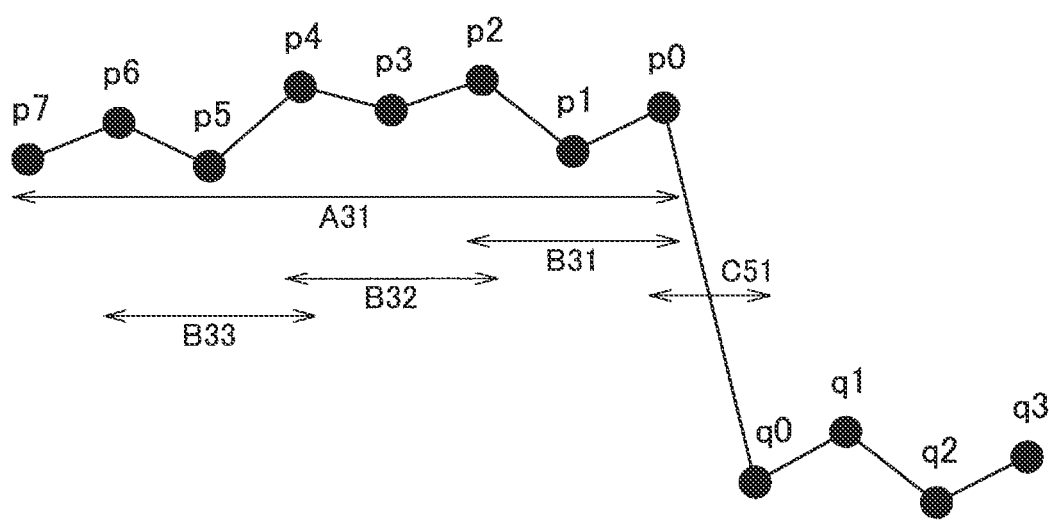
FIG. 20 is an explanatory diagram for explaining a determination process for determining whether or not to apply an extended strong filter.

In the following, a determination process related to the application of the extended strong filter by the filter strength determination section 120 according to the present example will be described. FIG. 20 is an explanatory diagram for explaining the determination process for determining whether or not to apply the extended strong filter.

The application range of the extended strong filter according to the present example is 7 pixels positioned near the block boundary on one side for example, corresponding to p0 to p6 among the pixels illustrated in FIG. 20.

The filter strength determination section 120 according to the present example determines whether or not to apply the extended strong filter on each side based on the block boundary, in accordance with the application range of the extended strong filter. For example, the filter strength determination section 120 may perform the determination process by referencing pixels over a wider range than the application range of the extended strong filter.

According to such a configuration, in the case in which a boundary between an object and the background or the like exists in the range where the extended strong filter is to be applied for example, it is possible to make a determination such that the extended strong filter is less likely to be applied and a more appropriate deblocking filter is more likely to be applied.

For example, the filter strength determination section 120 may determine to apply the extended strong filter in the case in which the following condition V31 is satisfied.

Condition V31: True if All of the Following Conditions A310, B311 to B313, and C310 are True
 (A310) |p7−p0|<(beta>>4)
 (B311) |p2−2*p1+p0|<(beta>>3)
 (B312) |p4−2*p3+p2|+|q4−2*q3+q2|<(beta>>3)
 (B313) |p6−2*p5+p4|+|q6−2*q5+q4|<(beta>>3)
 (C310) |p0−q0|<((tc*5+1)>>1)

Also, as another example of the determination condition, the filter strength determination section 120 may determine to apply the extended strong filter in the case in which the following condition V32 is satisfied.

Determination Condition V32: True if All of the Following Conditions A310, B310, and C310 are True
 (A310) |p7−p0|<(beta>>4)
 (B310) |p2−2*p2+p0|+p4−2*p3+p2|+p6−2*p5+p4|<(3*beta>>3)
 (C310) |p0−q0|<(tc*5+1)>>1)

Also, as another example of the determination condition, the filter strength determination section 120 may determine to apply the extended strong filter in the case in which the following condition V33 is satisfied.

Condition V33: True if All of the Following Conditions A310, B315, and C310 are True
 (A310) |p7−p0|<(beta>>4)
 (B315) |p6−2*p3+p0|<(beta>>3)
 (C310) |p0−q0|<((tc*5+1)>>1)

In the above conditions V31 to V33, the range of pixels referenced by the condition A310 corresponds to the range A31 illustrated in FIG. 20. Also, in the above condition V31, the range of pixels referenced by the conditions B311 to B313 correspond to the ranges B31 to B33 illustrated in FIG. 20, respectively. Also, in the above conditions V32 and V33, the range of pixels referenced by the conditions B310 and B315 correspond to the ranges B31 to B33 illustrated in FIG. 20.

Note that in the above conditions V31 to V33, the condition A310 is a condition that determines the flatness inside the block. Also, the conditions B310, B311 to B313, and B315 are conditions that determine the continuity of pixel Values included in the extended application range inside the block. Also, the condition C310 uses pixel values adjacent to the block boundary to determine the amount of change (gap) between the blocks.

Herein, the conditions B310, B311 to B313, and B315 that determine the continuity of pixel values are independent conditions in the block on one side based on the block boundary. In other words, the filter strength determination section 120 according to the present example independently performs the continuity determination process that determines the continuity of pixel values included in the extended application range. Note that the filter strength determination section 120 may also be configured to perform the continuity determination process independently according to the state of the block boundary.

In particular, in block partitioning by QTBT, the lengths of different block boundaries, the spacing of each block boundary, and the like readily change because of the sizes and shapes (square, rectangular) of the adjacent blocks, for example, and the circumstances of change in a block boundary associated with the above causes are called the state of the block boundary in this specification.

In addition, the filter strength determination section 120 may also determine whether or not to apply the extended strong filter in units of four lines, and may also determine to apply the extended strong filter in the case in which both the first line and fourth line satisfy one of the above conditions V31 to V33.

Similarly to the first example, the filtering section 130 according to the present example applies the deblocking filter to pixels positioned near a block boundary of the input image (decoded image) according to the results of the determinations by the application need determination section 110 and the filter strength determination section 120.

For example, the filtering section 130 according to the present example applies filters determined by the filter strength determination section 120. However, the filtering section 130 according to the present example is able to apply the extended strong filter and the strong filter on each side.

Figure 21:
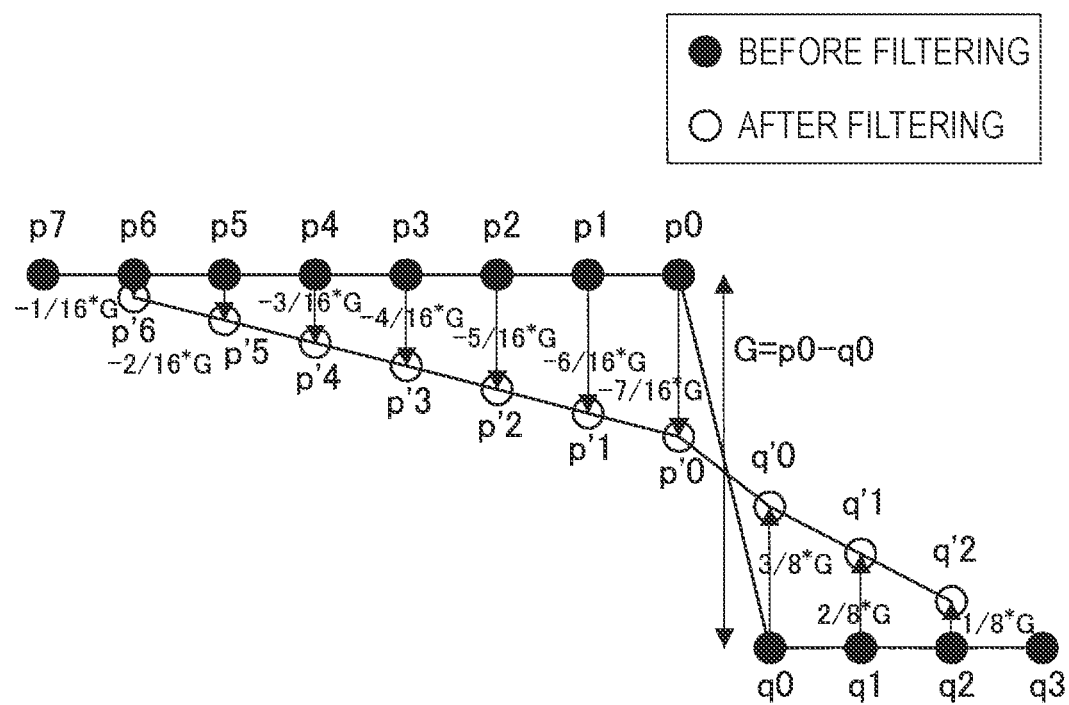
FIG. 21 is an explanatory diagram illustrating one example of an asymmetric deblocking filter applied by the filtering section 130 in the modification.

FIG. 21 is an explanatory diagram illustrating one example of the asymmetric extended strong filter applied by the filtering section 130 in the present modification. FIG. 21 illustrates an example of the filtering section 130 applying the extended strong filter to the p side and the strong filter to the q side. Note that the filter coefficients of the extended strong filter applied to the p side may be the filter coefficients described in the first example, for example. Also, the filter coefficients of the strong filter applied to the q side may be the filter coefficients of the HEVC strong filter.

[4-2. Process Flow]

Figure 22:
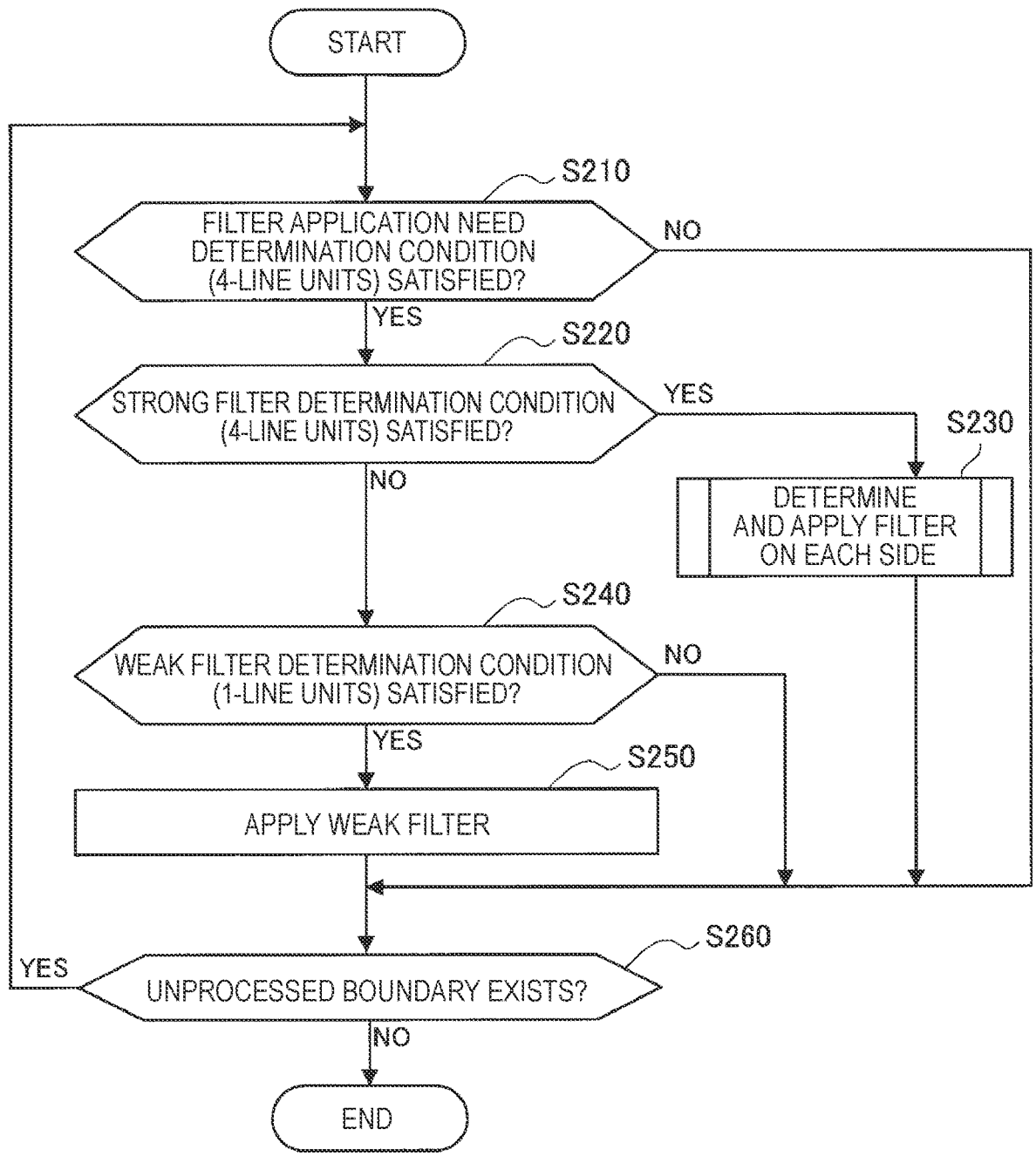
FIG. 22 is a flowchart illustrating one example of the flow of a process by a deblocking filter 24 according to a second example.

FIG. 22 is a flowchart illustrating one example of the flow of a process by the deblocking filter 24 according to the present example. The process from step S210 to step S260 in FIG. 22 is repeated for each block boundary in units of four lines in an input image.

First, for a single boundary to process (hereinafter designated the target boundary), the application need determination section 110 determines, in units of four lines, whether or not the application need determination condition of the deblocking filter is satisfied (S210). At this point, in the case in which the filter application need determination condition is not satisfied, the subsequent process from step S220 to step S250 is skipped. On the other hand, in the case in which the determination condition in units of boundaries is satisfied, the process proceeds to step S220.

In step S220, the filter strength determination section 120 determines, in units of four lines, whether or not the strong filter determination condition is satisfied. In the case in which the strong filter determination condition is satisfied (YES in S220), the process proceeds to step S230, and the determination and filter application is performed on each side based on the block boundary. Note that the process in step S230 will be described later with reference to FIG. 23.

On the other hand, in the case in which the strong filter determination condition is not satisfied (NO in S220), the process proceeds to step S2460, and the filter strength determination section 120 determines, in units of one line, whether or not the weak filter determination condition is satisfied. In the case in which the weak filter determination condition is satisfied (YES in S240), the process proceeds to step S250, and the filtering section 130 applies the weak filter to the line.

In step S260, in the case in which an unprocessed boundary remains in the input image (YES in step S260), a new target boundary is set, and the process returns to step S260. In the case in which no unprocessed boundaries remain, the process ends for the input image (decoded image).

Figure 23:
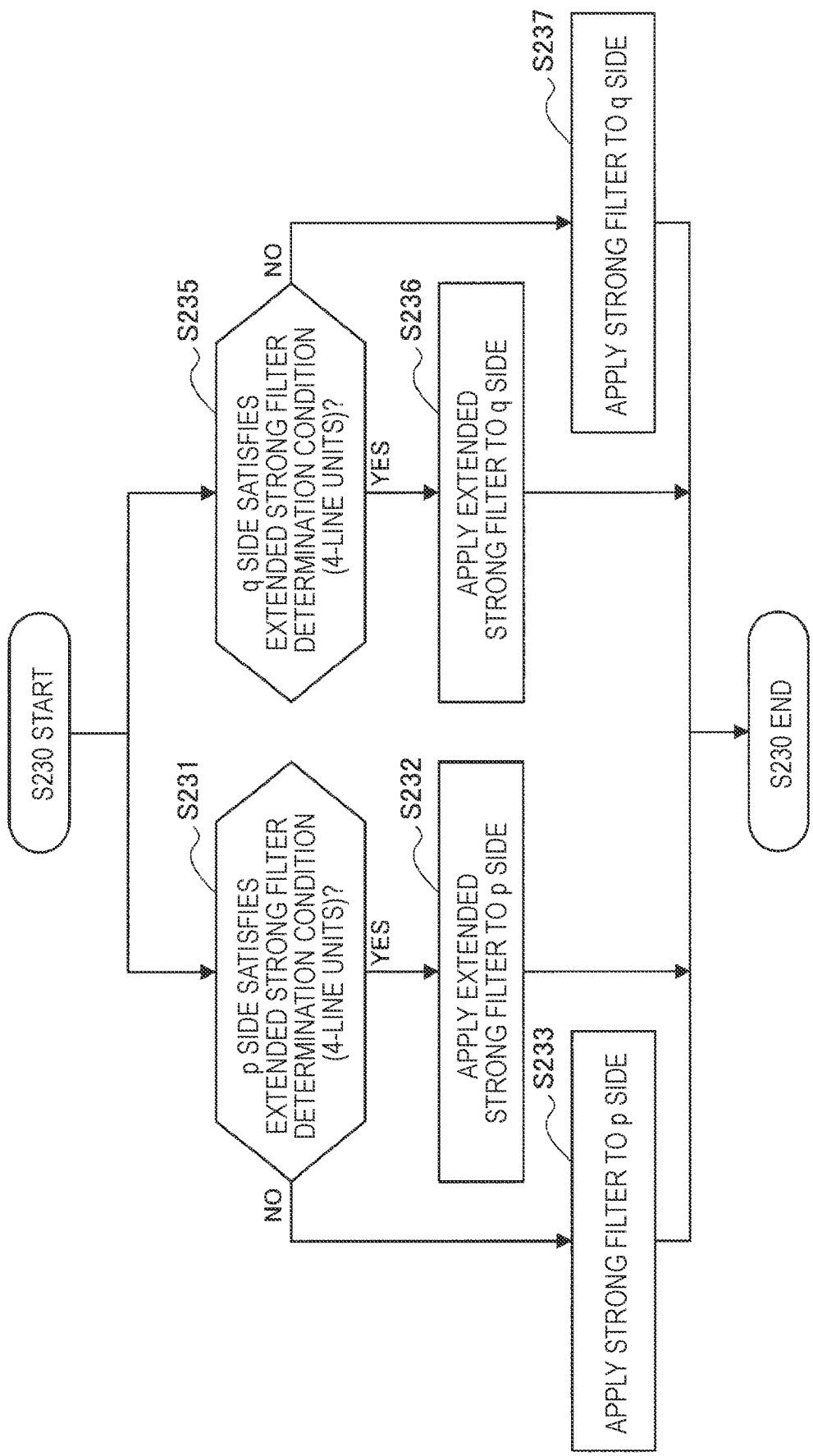
FIG. 23 is a flowchart for explaining the process in step S230.

FIG. 23 is a flowchart for explaining the process in step S230 of FIG. 22. As illustrated in FIG. 23, the process may be performed in parallel on each side (p side, q side) based on the block boundary. In step S231, the filter strength determination section 120 determines, in units of four lines, whether or not the extended strong filter determination condition is satisfied in accordance with the state of the pixels included in the extended application range on the p side. In the case in which the extended strong filter determination condition is satisfied (YES in S231), the process proceeds to step S232, and the filtering section 130 applies the extended strong filter to the p side. On the other hand, in the case in which the extended strong filter determination condition is not satisfied (NO in S231), the process proceeds to step S233, and the filtering section 130 applies the strong filter to the p side.

Similarly on the q side, in step S235, the filter strength determination section 120 determines, in units of four lines, whether or not the extended strong filter determination condition is satisfied in accordance with the state of the pixels included in the extended application range on the q side. In the case in which the extended strong filter determination condition is satisfied (YES in S235), the process proceeds to step S236, and the filtering section 130 applies the extended strong filter to the q side. On the other hand, in the case in which the extended strong filter determination condition is not satisfied (NO in S235), the process proceeds to step S237, and the filtering section 130 applies the strong filter to the q side.

[4-3. Modifications]

The above describes a second example, but the extended strong filter applied in the present example is not limited to the example described above. For example, also in the present example, an extended strong filter whose application range is extended from 3 pixels to 5 pixels positioned near the block boundary may also be applied. In the following, as a modification of the present example, the application determination and filter coefficients of such an extended strong filter will be described with reference to FIGS. 24 and 25.

Figure 24:
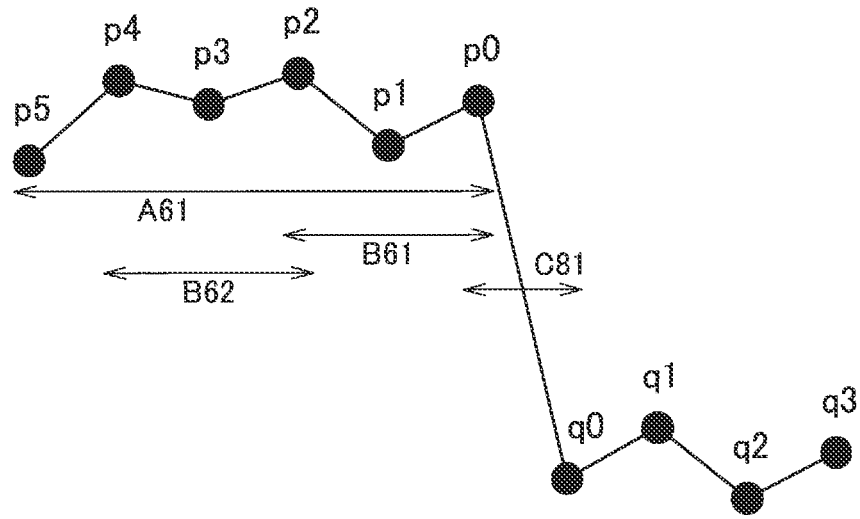
FIG. 24 is an explanatory diagram according to a modification.

FIG. 24 is an explanatory diagram for explaining the determination process for determining whether or not to apply the extended strong filter according to the present modification to pixels on one side (the p side) based on the block boundary. The application range of the extended strong filter according to the present modification is 5 pixels positioned near the block boundary, corresponding to p0 to p4 among the pixels illustrated in FIG. 24 for example.

The filter strength determination section 120 according to the present modification determines whether or not to apply the extended strong filter in accordance with the application range of the extended strong filter. For example, the filter strength determination section 120 may perform the determination process by referencing pixels over a wider range than the application range of the extended strong filter.

For example, the filter strength determination section 120 may determine to apply the extended strong filter to pixels on the p side in the case in which the following condition V61 is satisfied.

Condition V61: True if All of the Following Conditions A610, B611, B612, and C610 are True
- (A610) $|p5-p0|<(beta>>4)$
- (B611) $|p2-2*p1+p0|<(beta>>3)$
- (B612) $|p4-2*p3+p2|<(beta>>3)$
- (C610) $|p0-q0|<((tc*5+1)>>1)$ Also, as another example of the determination condition, the filter strength determination section 120 may determine to apply the extended strong filter to pixels on the p side in the case in which the following condition 4'62 is satisfied.

Determination Condition V62: True if All of the Following Conditions A610, B610, and C610 are True
- (A610) $|p5-p0|<(beta>>4)$
- (B610) $|p2-2*p1+p0|+|p4-2*p3+p2|<(2*beta>>3)$
- (C610) $|p0-q0|<((tc*5+1)>>1)$ Also, as another example of the determination condition, the filter strength determination section 120 may determine to apply the extended strong filter to pixels on the p side in the case in which the following condition V63 is satisfied.

Determination Condition V63: true if all of the following conditions A610, B615, and C610 are true
- (A610) $|p5-p0|<(beta>>4)$
- (B615) $|p4-2*p2+p0|<(beta>>3)$
- (C610) $|p0-q0|<((tc*5+1)>>1)$ In the above conditions V61 to V63, the range of pixels referenced by the condition A610 corresponds to the range A61 illustrated in FIG. 18. Also, in the above condition V61, the range of pixels referenced by the conditions B611 and B612 correspond to the ranges B61 and B62 illustrated in FIG. 24, respectively. Also, in the above conditions V62 and V63, the range of pixels referenced by the conditions B610 and B615 correspond to the ranges B61 and B62 illustrated in FIG. 24, respectively.

Note that in the above conditions V61 to V63, the condition A610 is a condition that determines the flatness inside the blocks. Also, the conditions B610, B611, B612, and B615 are conditions that determine the continuity inside the blocks. Also, the condition C610 uses pixel values adjacent to the block boundary to determine the amount of change (gap) between the blocks.

Figure 25:
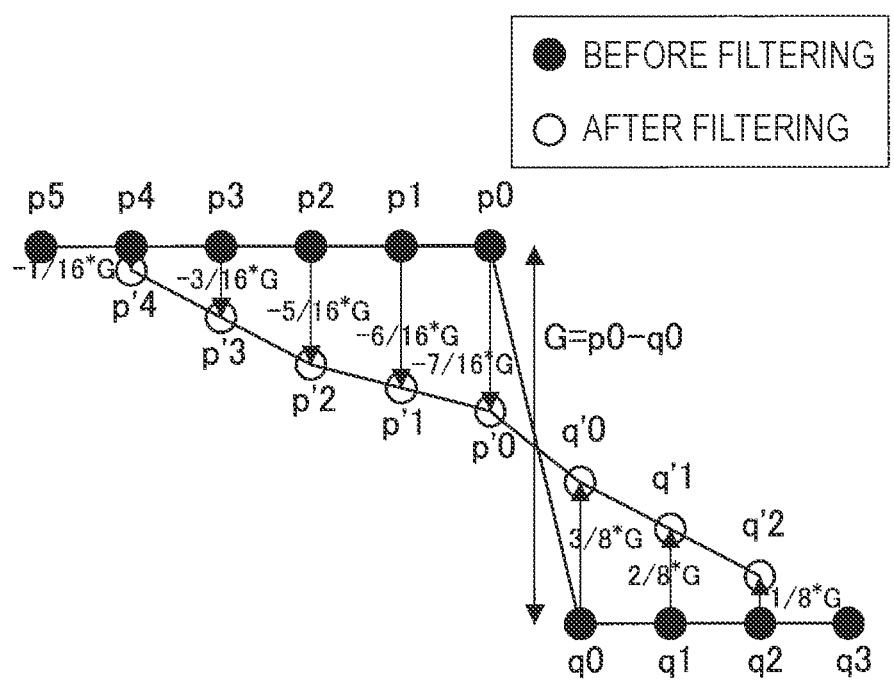
FIG. 25 is an explanatory diagram according to a modification.

Next, an example of the asymmetric deblocking filter according to the present modification will be described. FIG. 25 is an explanatory diagram for explaining one example of the asymmetric deblocking filter applied by the filtering section 130 in the present modification. FIG. 25 illustrates an example of the filtering section 130 applying the extended strong filter according to the present modification to the p side and the strong filter to the q side. Note that the filter coefficients of the extended strong filter according to the present modification applied to the p side may be the filter coefficients described in the modification of the first example, for example. Also, the filter coefficients of the strong filter applied to the q side may be the filter coefficients of the HEVC strong filter.

5. Exemplary Hardware Configuration

The series of processes described above can be executed by hardware, and can also be executed in software. In the case of executing the series of processes by software, a program forming the software is installed on a computer. Herein, the term computer includes a computer built into special-purpose hardware, a computer able to execute various functions by installing various programs thereon, such as a general-purpose personal computer, for example, and the like.

Figure 26:
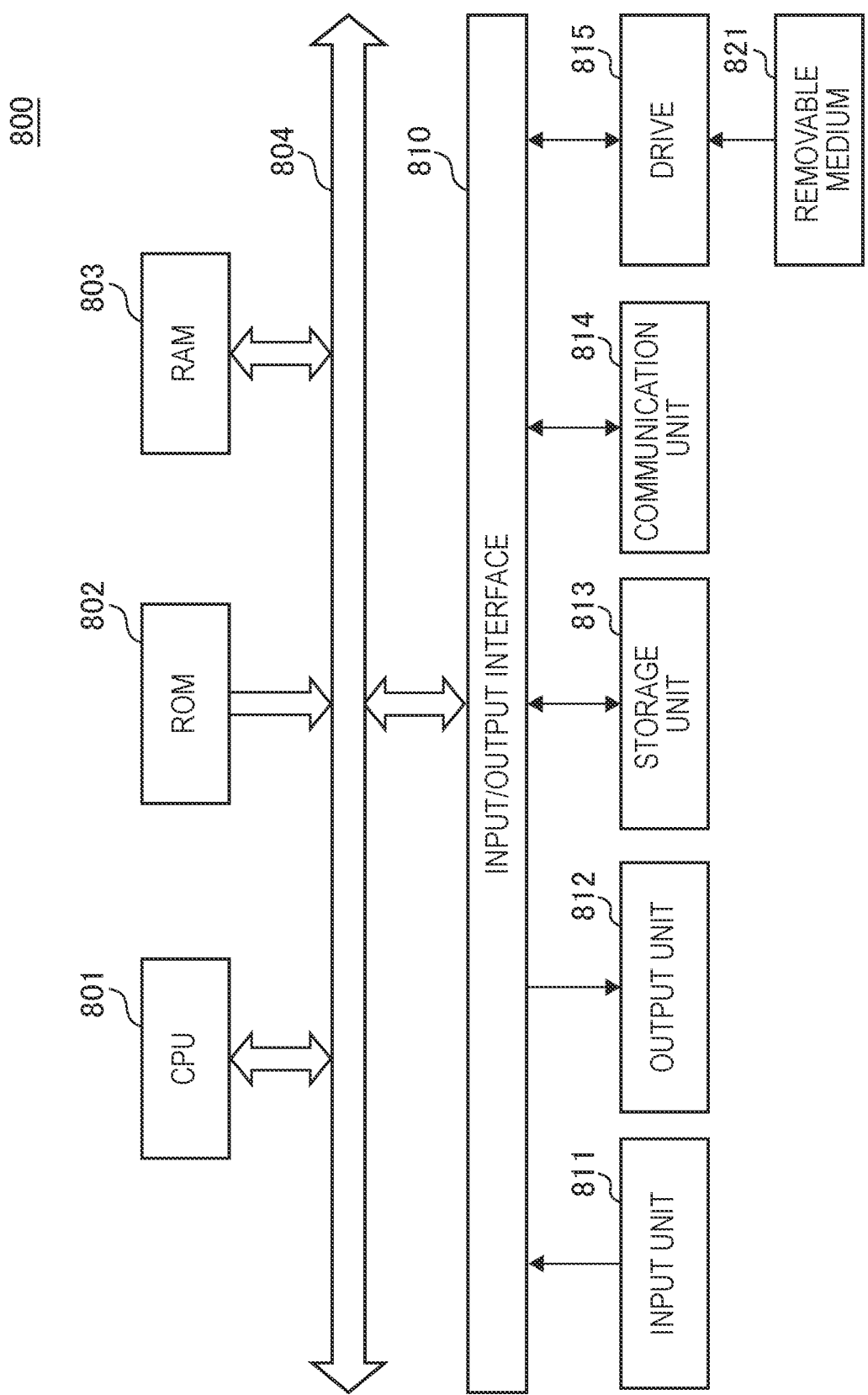
FIG. 26 is a block diagram illustrating a principal configuration example of a computer.

FIG. 26 is a block diagram illustrating an exemplary hardware configuration of a computer that executes the series of processes described above according to a program.

In the computer 800 illustrated in FIG. 26, a central processing unit (CPU) 801, read-only memory (ROM) 802, and random access memory (RAM) 803 are interconnected through a bus 804.

Additionally, an input/output interface 810 is also connected to the bus 804. An input unit 811, an output unit 812, a storage unit 813, a communication unit 814, and a drive 815 are connected to the input/output interface 810.

The input unit 811 includes a keyboard, a mouse, a microphone, a touch panel, an input terminal, and the like, for example. The output unit 812 includes a display, a speaker, an output terminal, and the like, for example. The storage unit 813 includes a hard disk, a RAM disk, non-volatile memory, and the like, for example. The communication unit 814 includes a network interface, for example.

The drive 815 drives a removable medium 821 such as a magnetic disk, an optical disc, a magneto-optical disc, or semiconductor memory.

In a computer configured as above, the series of processes described above are performed by having the CPU 801 load a program stored in the storage unit 813 into the RAM 803 via the input/output interface 810 and the bus 804, and execute the program, for example. Additionally, data required for the CPU 801 to execute various processes and the like is also stored in the RAM 803 as appropriate.

The program executed by the computer (CPU 801) may be applied by being recorded onto the removable medium 821 as an instance of packaged media or the like, for example. In this case, the program may be installed in the storage unit 813 via the input/output interface 810 by inserting the removable medium 821 into the drive 815.

In addition, the program may also be provided via a wired or wireless transmission medium such as a local area network, the Internet, or digital satellite broadcasting. In this case, the program may be received by the communication unit 814 and installed in the storage unit 813.

Otherwise, the program may also be preinstalled in the ROM 802 or the storage unit 813.

6. Application Examples

Figure 27:
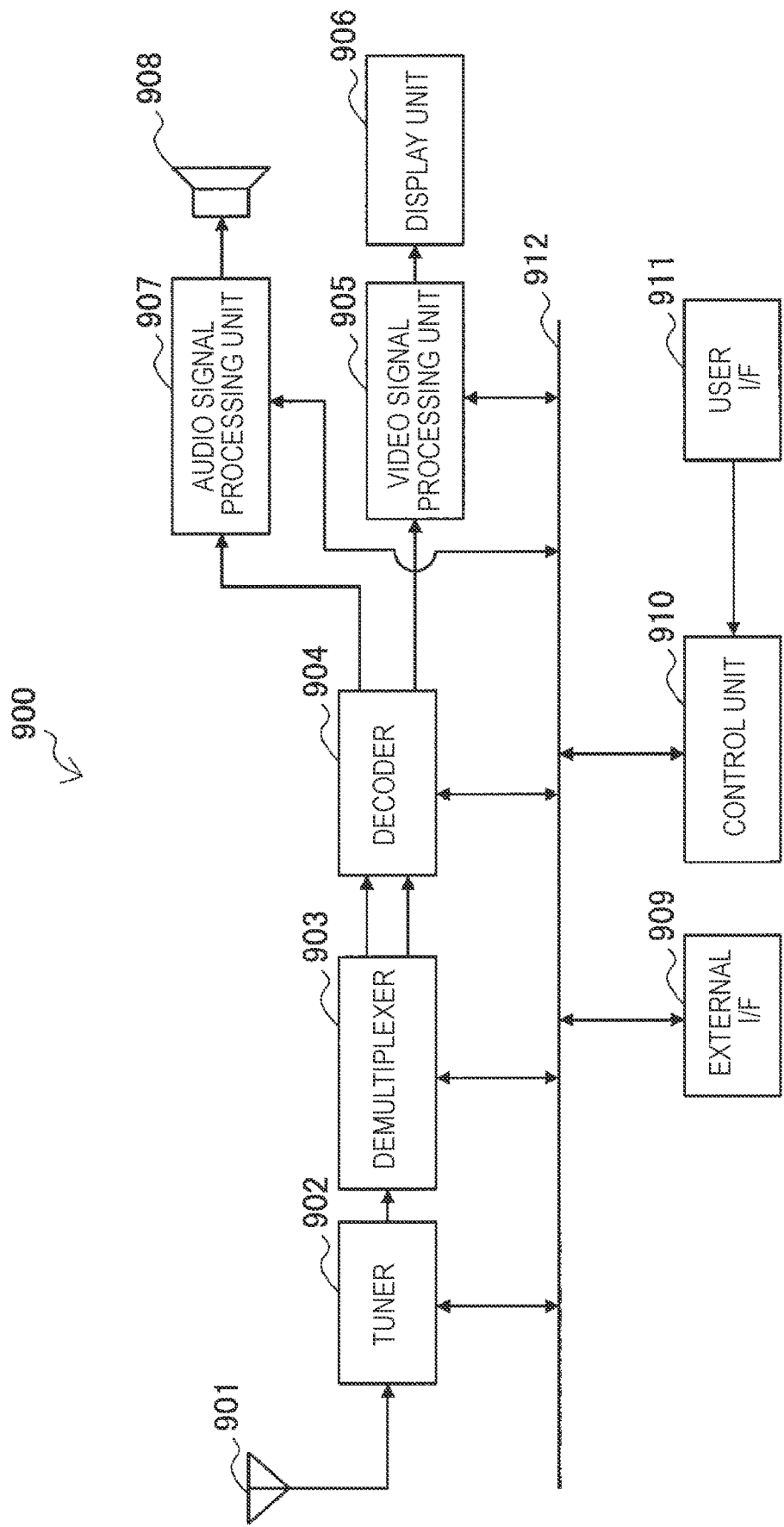
FIG. 27 is a block diagram illustrating an example of a schematic configuration of a television apparatus.

The image encoding apparatus 10 and the image decoding apparatus 60 according to the above-described embodiments can be applied to various electronic apparatuses such as: transmitters or receivers for satellite broadcasting, wired broadcasting such as cable TV, distribution on the Internet and distribution to terminals through cellular communication; recording devices which record images on media such as optical discs, magnetic disks, and flash memories; or reproduction devices which reproduce images from the foregoing storage media, (1) First Application Example: Television Receiver FIG. 27 illustrates an example of a schematic configuration of a television apparatus to which the above-described embodiment is applied. The television apparatus 900 has an antenna 901, a tuner 902, a demultiplexer 903, a decoder 904, a video signal processing unit 905, a display unit 906, an audio signal processing unit 907, a speaker 908, an external interface (I/F) 909, a control unit 910, a user interface (I/F) 911, and a bus 912.

The tuner 902 extracts a signal of a desired channel from a broadcasting signal received via the antenna 901 and demodulates the extracted signal. Then, the tuner 902 outputs an encoded bit stream obtained from the demodulation to the demultiplexer 903. That is, the tuner 902 plays a role as a transmission section of the television apparatus 900 which receives an encoded stream in which images are encoded.

The demultiplexer 903 demultiplexes a video stream and an audio stream of a program to be viewed from the encoded stream and outputs the demultiplexed streams to the decoder 904. In addition, the demultiplexer 903 extracts auxiliary data such as an electronic program guide (EPG) from the encoded bit stream and supplies the extracted data to the control unit 910. Note that, in the case where the encoded bit stream has been scrambled, the demultiplexer 903 may perform descrambling.

The decoder 904 decodes the video stream and the audio stream input from the demultiplexer 903. Then, the decoder 904 outputs video data generated from the decoding process to the video signal processing unit 905. In addition, the decoder 904 outputs audio data generated from the decoding process to the audio signal processing unit 907.

The video signal processing unit 905 reproduces the video data input from the decoder 904 to cause the display unit 906 to display a video. In addition, the video signal processing unit 905 may cause the display unit 906 to display an application screen supplied via a network. Furthermore, the video signal processing unit 905 may perform an additional process, for example, noise reduction, on the video data in accordance with a setting. Moreover, the video signal processing unit 905 may generate an image of a graphical user interface (GUI), for example, a menu, a button, or a cursor and superimpose the generated image on an output image.

The display unit 906 is driven with a driving signal supplied from the video signal processing unit 905 and displays a video or an image on a video plane of a display device (e.g., a liquid crystal display, a plasma display, an organic electroluminescence display (OLED), etc.).

The audio signal processing unit 907 performs a reproduction process including D/A conversion and amplification on the audio data input from the decoder 904 and causes the speaker 908 to output a sound. In addition, the audio signal processing unit 907 may perform an additional process such as noise removal on the audio data.

The external interface 909 is an interface for connecting the television apparatus 900 to an external apparatus or a network. For example, a video stream or an audio stream received via the external interface 909 may be decoded by the decoder 904. In other words, the external interface 909 also plays the role as a transmission sections of the television apparatus 900 which receives an encoded stream in which images are encoded.

The control unit 910 has a processor such as a CPU and a memory such as a RAM and a ROM. The memory stores a program executed by the CPU, program data, EPG data, and data acquired via a network. The program stored in the memory is read and executed by the CPU at the time of, for example, start-up of the television apparatus 900. The CPU controls operations of the television apparatus 900 by executing the program in response to, for example, operation signals input from the user interface section 911.

The user interface section 911 is connected to the control unit 910. The user interface section 911 includes, for example, buttons and switches with which a user operates the television apparatus 900, a reception unit for remote control signals, and the like. The user interface section 911 generates an operation signal by detecting an operation by a user via any aforementioned constituent element and outputs the generated operation signal to the control unit 910.

The bus 912 connects the tuner 902, the demultiplexer 903, the decoder 904, the video signal processing unit 905, the audio signal processing unit 907, the external interface 909, and the control unit 910 to one another.

In the television apparatus 900 configured in this way, the decoder 904 may also include the functions of the image decoding apparatus 60 described above. In other words, the decoder 904 may be configured to decode encoded data according to the method described in each of the above embodiments. With this arrangement, the television apparatus 900 becomes able to apply a more appropriate filter in the deblocking filter process.

Also, in the television apparatus 900 configured in this way, the video signal processing unit 905 may be able to encode image data provided from the decoder 904, and cause the obtained encoded data to be output externally to the television apparatus 900 through external interface 909. Additionally, the video signal processing unit 905 may also include the functions of the image encoding apparatus 10 described above. In other words, the video signal processing unit 905 may be configured to encode image data provided from the decoder 904 according to the method described in each of the above embodiments. With this arrangement, the television apparatus 900 becomes able to apply a more appropriate filter in the deblocking filter process.

(2) Second Application Example: Mobile Telephone

Figure 28:
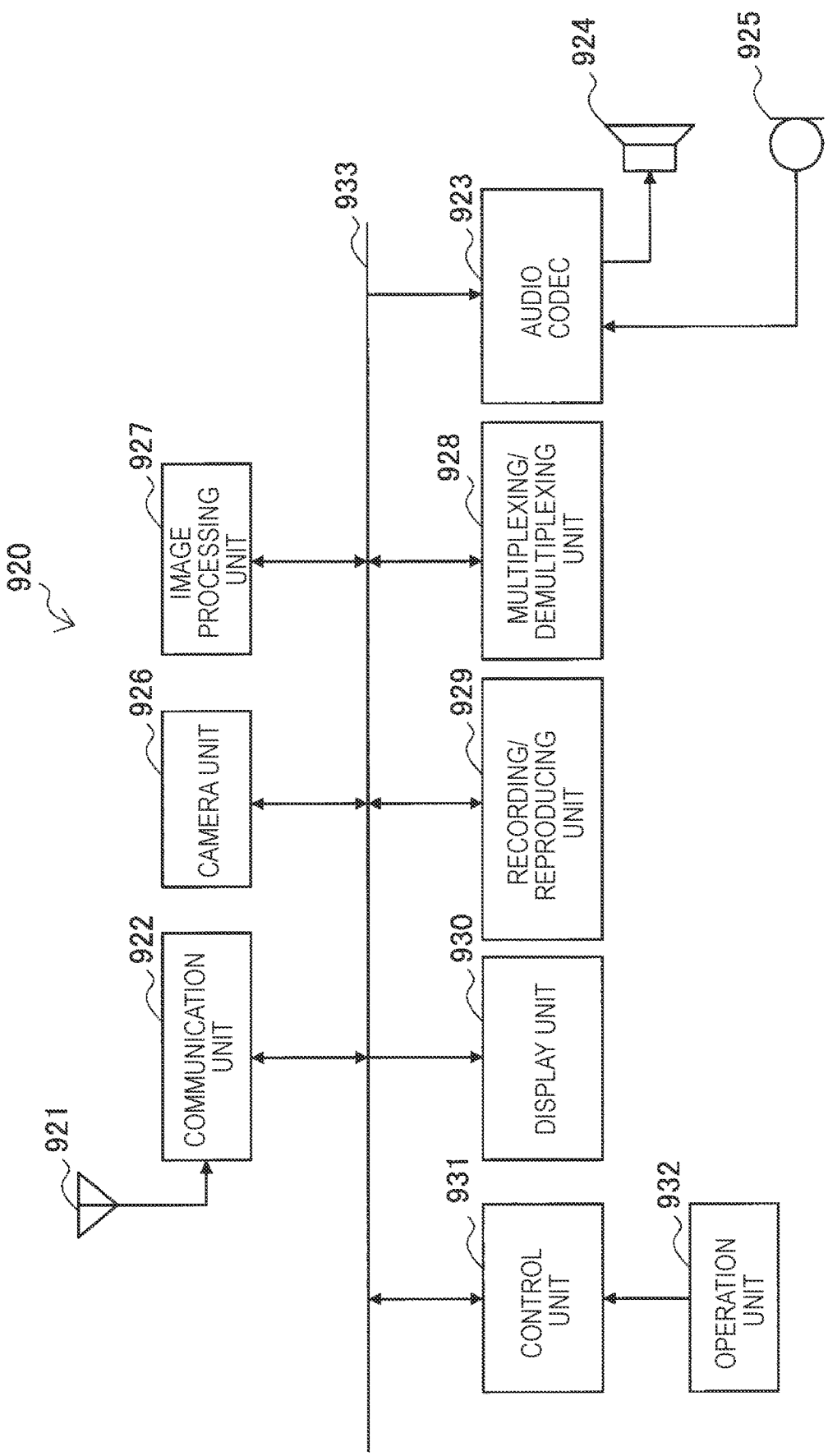
FIG. 28 is a block diagram illustrating an example of a schematic configuration of a mobile telephone.

FIG. 28 illustrates an example of a schematic configuration of a mobile telephone to which the above-described embodiments are applied. A mobile telephone 920 includes an antenna 921, a communication unit 922, an audio codec 923, a speaker 924, a microphone 925, a camera unit 926, an image processing unit 927, a multiplexing/demultiplexing unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 mutually connects the communication unit 922, the audio codec 923, the camera unit 9'26, the image processing unit 927, the multiplexing/demultiplexing unit 928, the recording/reproducing unit 929, the display unit 930, and the control unit 931.

The mobile telephone 920 performs actions such as transmitting/receiving an audio signal, transmitting/receiving an electronic mail or image data, capturing an image, and recording data in various operation modes including an audio call mode, a data communication mode, a photography mode, and a videophone mode.

In the audio call mode, an analog audio signal generated by the microphone 925 is supplied to the audio codec 923. The audio codec 923 then converts the analog audio signal into audio data, performs A/D conversion on the converted audio data, and compresses the data. The audio codec 923 thereafter outputs the compressed audio data to the communication unit 922. The communication unit 922 encodes and modulates the audio data to generate a transmission signal. The communication unit 922 then transmits the generated transmission signal to a base station (not shown) through the antenna 921. Furthermore, the communication unit 922 amplifies a radio signal received through the antenna 921, performs frequency conversion, and acquires a reception signal. The communication unit 922 thereafter demodulates and decodes the reception signal to generate the audio data and output the generated audio data to the audio codec 923. The audio codec 923 expands the audio data, performs D/A conversion on the data, and generates the analog audio signal. The audio codec 923 then supplies the generated audio signal to the speaker 924 to cause it to output the audio.

In the data communication mode, for example, the control unit 931 generates character data configuring an electronic mail, in accordance with a user operation detected through the operation unit 932. The control unit 931 further displays characters on the display unit 930. Moreover, the control unit 931 generates electronic mail data in accordance with an instruction to send it obtained from a user through the operation unit 932 and outputs the generated electronic mail data to the communication unit 922. The communication unit 922 encodes and modulates the electronic mail data to generate a transmission signal. Then, the communication unit 922 transmits the generated transmission signal to the base station (not shown) through the antenna 921. The communication unit 922 further amplifies a radio signal received through the antenna 921, performs frequency conversion, and acquires a reception signal. The communication unit 922 thereafter demodulates and decodes the reception signal, restores the electronic mail data, and outputs the restored electronic mail data to the control unit 931. The control unit 931 displays the content of the electronic mail on the display unit 930 as well as supplies the electronic mail data to a storage medium of the recording/reproducing unit 929 to cause the data to be recorded in the medium.

The recording/reproducing unit 929 includes an arbitrary storage medium that is readable and writable. For example, the storage medium may be a built-in storage medium such as a RAM or a flash memory, or may be an externally-mounted storage medium such as a hard disk, a magnetic disk, a magneto-optical disk, an optical disk, a USB memory, or a memory card.

In the photography mode, for example, the camera unit 926 images an object to generate image data and outputs the generated image data to the image processing unit 927. The image processing unit 927 encodes the image data input from the camera unit 926 and supplies an encoded stream to the storage medium of the recording/reproducing unit 929 to cause the encoded stream to be recorded in the medium.

Furthermore, in the image display mode, the recording/reproducing unit 929 reads out an encoded stream recorded on a storage medium, and outputs to the image processing unit 927. The image processing unit 927 decodes the encoded stream input from the recording/reproducing unit 929, supplies image data to the display unit 930, and causes the image to be displayed.

In the videophone mode, for example, the multiplexing/demultiplexing unit 928 multiplexes a video stream encoded by the image processing unit 927 and an audio stream input from the audio codec 923, and outputs the multiplexed stream to the communication unit 922. The communication unit 922 encodes and modulates the stream to generate a transmission signal. The communication unit 922 then transmits the generated transmission signal to the base station (not shown) through the antenna 921. Moreover, the communication unit 922 amplifies a radio signal received through the antenna 921, performs frequency conversion, and acquires a reception signal. The transmission signal and the reception signal can include an encoded bit stream. The communication unit 922 thus demodulates and decodes the reception signal to restore the stream, and outputs the restored stream to the multiplexing/demultiplexing unit 928. The multiplexing/demultiplexing unit 928 demultiplexes the video stream and the audio stream from the input stream and outputs the video stream and the audio stream to the image processing unit 927 and the audio codec 923, respectively. The image processing unit 927 decodes the video stream to generate video data. The video data is then supplied to the display unit 930, which displays a series of images. The audio codec 923 expands and performs D/A conversion on the audio stream to generate an analog audio signal. The audio codec 923 then supplies the generated audio signal to the speaker 924 to cause it to output the audio.

In the mobile telephone 920 configured in this way, the image processing unit 927 may include the functions of the image encoding apparatus 10 described above, for example. In other words, the image processing unit 927 may be configured to encode image data according to the method described in each of the above embodiments. With this arrangement, the mobile telephone 920 becomes able to apply a more appropriate filter in the deblocking filter process.

In addition, in the mobile telephone 920 configured in this way, the image processing unit 927 may include the functions of the image decoding apparatus 60 described above, for example. In other words, the image processing unit 927 may be configured to decode encoded data according to the method described in each of the above embodiments. With this arrangement, the mobile telephone 920 becomes able to apply a more appropriate filter in the deblocking filter process.

(3) Third Application Example: Recording/Reproducing Apparatus

Figure 29:
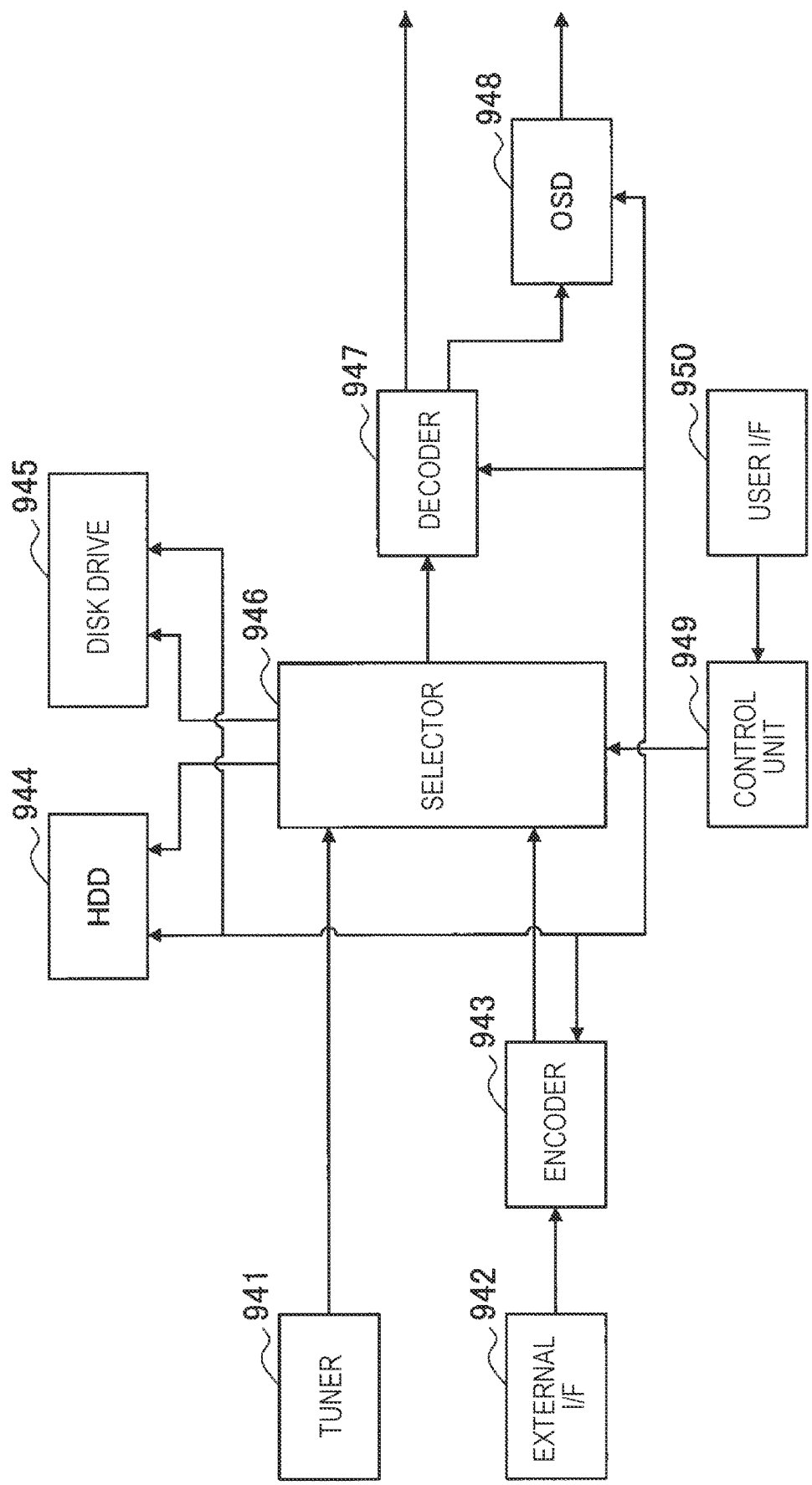
FIG. 29 is a block diagram illustrating an example of a schematic configuration of a recording/reproducing apparatus.

FIG. 29 illustrates an example of a schematic configuration of a recording/reproducing apparatus to which the above-described embodiments are applied. The recording/reproducing apparatus 940 encodes audio data and video data of a received broadcast program and records the data into a recording medium, for example. The recording/reproducing apparatus 940 may also encode audio data and video data acquired from another apparatus and record the data into the recording medium, for example. The recording/reproducing apparatus 940 reproduces the data recorded in the recording medium on a monitor and a speaker, for example, in response to a user instruction. In this case, recording/reproducing apparatus 940 decodes the audio data and the video data.

The recording/reproducing apparatus 940 includes a tuner 941, an external interface 942, an encoder 943, a hard disk drive (HDD) 944, a disk drive 945, a selector 946, a decoder 947, an on-screen display (OSD) 948, a control unit 949, and a user interface 950.

The tuner 941 extracts a signal of a desired channel from a broadcast signal received through an antenna (not shown) and demodulates the extracted signal. The tuner 941 then outputs an encoded bit stream obtained by the demodulation to the selector 946. That is, the tuner 941 has a role as transmission means in the recording/reproducing apparatus 940.

The external interface 942 is an interface which connects the recording/reproducing apparatus 940 with an external device or a network. The external interface 942 may be, for example, an IEEE 1394 interface, a network interface, a USB interface, or a flash memory interface. The video data and the audio data received through the external interface 942 are input to the encoder 943, for example. That is, the external interface 942 has a role as transmission means in the recording/reproducing apparatus 940.

The encoder 943 encodes the video data and the audio data in the case where the video data and the audio data input from the external interface 942 are not encoded. The encoder 943 thereafter outputs an encoded bit stream to the selector 946.

The HDD 944 records, into an internal hard disk, the encoded bit stream in which content data such as video and audio is compressed, various programs, and other data. The HDD 944 reads these data from the hard disk when the video and the audio are reproduced.

The disk drive 945 records and reads data into/from a recording medium attached to the disk drive. The recording medium attached to the disk drive 945 may be, for example, a DVD disk (such as DVD-Video, DVD-RAM, DVD-R, DVD-RW, DA/D+R, or DVD+RW) or a Blu-ray (Registered Trademark) disk.

The selector 946 selects the encoded bit stream input from the tuner 941 or the encoder 943 when recording the video and audio, and outputs the selected encoded bit stream to the HDD 944 or the disk drive 945. When reproducing the video and audio, on the other hand, the selector 946 outputs the encoded bit stream input from the HDD 944 or the disk drive 945 to the decoder 947.

The decoder 947 decodes the encoded bit stream to generate the video data and the audio data. The decoder 904 then outputs the generated video data to the OSD 948 and the generated audio data to an external speaker.

The OSD 948 reproduces the video data input from the decoder 947 and displays the video. The OSD 948 may also superpose an image of a GUI such as a menu, buttons, or a cursor onto the displayed video.

The control unit 949 includes a processor such as a CPU and a memory such as a RAM and a ROM. The memory stores a program executed by the CPU as well as program data. The program stored in the memory is read by the CPU at the start-up of the recording/reproducing apparatus 940 and executed, for example. By executing the program, the CPU controls the operation of the recording/reproducing apparatus 940 in accordance with an operation signal that is input from the user interface 950, for example.

The user interface 950 is connected to the control unit 949. The user interface 950 includes a button and a switch for a user to operate the recording/reproducing apparatus 940 as well as a reception part which receives a remote control signal, for example. The user interface 950 detects a user operation through these components to generate an operation signal, and outputs the generated operation signal to the control unit 949.

In the recording/reproducing apparatus 940 configured in this way, the encoder 943 includes the functions of the image encoding apparatus 10 according to the embodiments described above. In addition, the decoder 947 includes the functions of the image decoding apparatus 60 according to the embodiments described above. With this arrangement, the recording/reproducing apparatus 940 becomes able to apply a more appropriate filter in the deblocking filter process.

(4) Fourth Application Example: Imaging Apparatus

Figure 30:
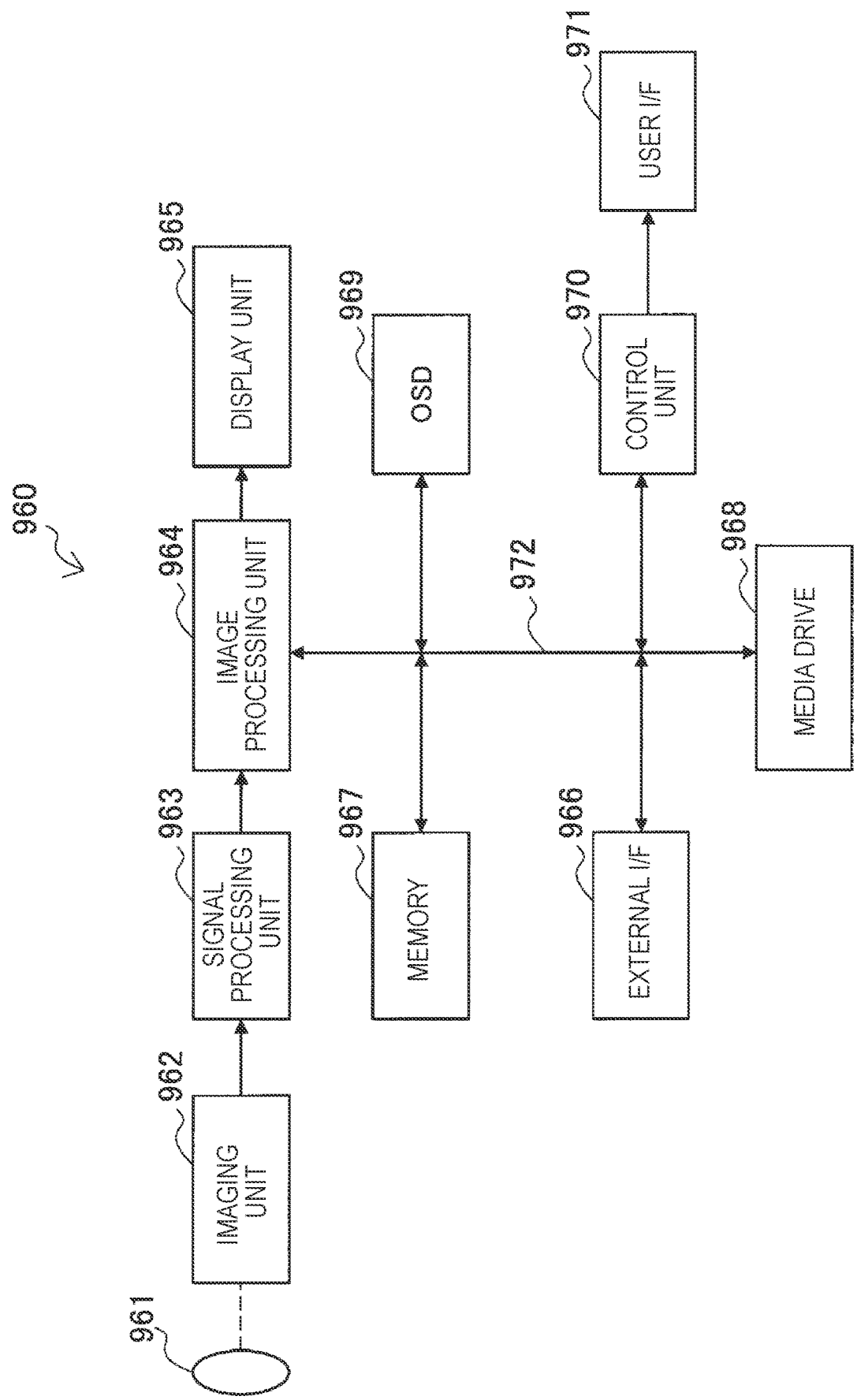
FIG. 30 is a block diagram illustrating an example of a schematic configuration of an imaging apparatus.

FIG. 30 illustrates an example of a schematic configuration of an imaging apparatus to which the above-described embodiments are applied. The imaging apparatus 960 images an object to generate an image, encodes image data, and records the data into a recording medium.

The imaging apparatus 960 includes an optical block 961, an imaging unit 962, a signal processing unit 963, an image processing unit 964, a display unit 965, an external interface 966, a memory 967, a media drive 968, an OSD 969, a control unit 970, a user interface 971, and a bus 972.

The optical block 961 is connected to the imaging unit 962. The imaging unit 962 is connected to the signal processing unit 963. The display unit 965 is connected to the image processing unit 964. The user interface 971 is connected to the control unit 970. The bus 972 mutually connects the image processing unit 964, the external interface 966, the memory 967, the media drive 968, the OSD 969, and the control unit 970.

The optical block 961 includes a focus lens and a diaphragm mechanism. The optical block 961 forms an optical image of an object on an imaging plane of the imaging unit 962. The imaging unit 962 includes an image sensor such as a CCD (Charge Coupled Device) or a CMOS (Complementary Metal Oxide Semiconductor) and performs photoelectric conversion to convert the optical image formed on the imaging plane into an image signal as an electric signal. Then, the imaging unit 962 outputs the image signal to the signal processing unit 963.

The signal processing unit 963 performs various camera signal processes such as a knee correction, a gamma correction and a color correction on the image signal input from the imaging unit 962. The signal processing unit 963 outputs the image data, on which the camera signal processes have been performed, to the image processing unit 964.

The image processing unit 964 encodes the image data input from the signal processing unit 963 and generates the encoded data. The image processing unit 964 then outputs the generated encoded data to the external interface 966 or the media drive 968. The image processing unit 964 also decodes the encoded data input from the external interface 966 or the media drive 968 to generate image data. The image processing unit 964 then outputs the generated image data to the display unit 965. Moreover, the image processing unit 964 may output to the display unit 965 the image data input from the signal processing unit 963 to cause the display unit 965 to display the image. Furthermore, the image processing unit 964 may superpose display data acquired from the OSD 969 onto the image that is output on the display unit 965.

The OSD 969 generates an image of a GUI such as a menu, buttons, or a cursor and outputs the generated image to the image processing unit 964.

The external interface 966 is configured as a USB input/output terminal, for example. The external interface 966 connects the imaging apparatus 960 with a printer when printing an image, for example. Moreover, a drive is connected to the external interface 966 as needed. A removable medium such as a magnetic disk or an optical disk is attached to the drive, for example, so that a program read from the removable medium can be installed to the imaging apparatus 960. The external interface 966 may also be configured as a network interface that is connected to a network such as a LAN or the Internet. That is, the external interface 966 has a role as transmission means in the imaging apparatus 960.

The recording medium attached to the media drive 968 may be an arbitrary removable medium that is readable and writable such as a magnetic disk, a magneto-optical disk, an optical disk, or a semiconductor memory. Furthermore, the recording medium may be attached to the media drive 968 in a fixed manner so that a non-transportable storage unit such as a built-in hard disk drive or a solid state drive (SSD) is configured, for example.

The control unit 970 includes a processor such as a CPU and a memory such as a RAM and a ROM. The memory stores a program executed by the CPU as well as program data. The program stored in the memory is read by the CPU at the start-up of the imaging apparatus 960 and then executed. By executing the program, the CPU controls the operation of the imaging apparatus 960 in accordance with an operation signal that is input from the user interface 971, for example.

The user interface 971 is connected to the control unit 970. The user interface 971 includes buttons and switches for a user to operate the imaging apparatus 960, for example. The user interface 971 detects a user operation through these components to generate an operation signal, and outputs the generated operation signal to the control unit 970.

In the imaging apparatus 960 configured in this way, the image processing unit 964 includes the functions of the image encoding apparatus 10 and the image decoding apparatus 60 according to the embodiments described above. With this arrangement, the imaging apparatus 960 becomes able to apply a more appropriate filter in the deblocking filter process.

(5) Fifth Application Example: Video Set

Figure 31:
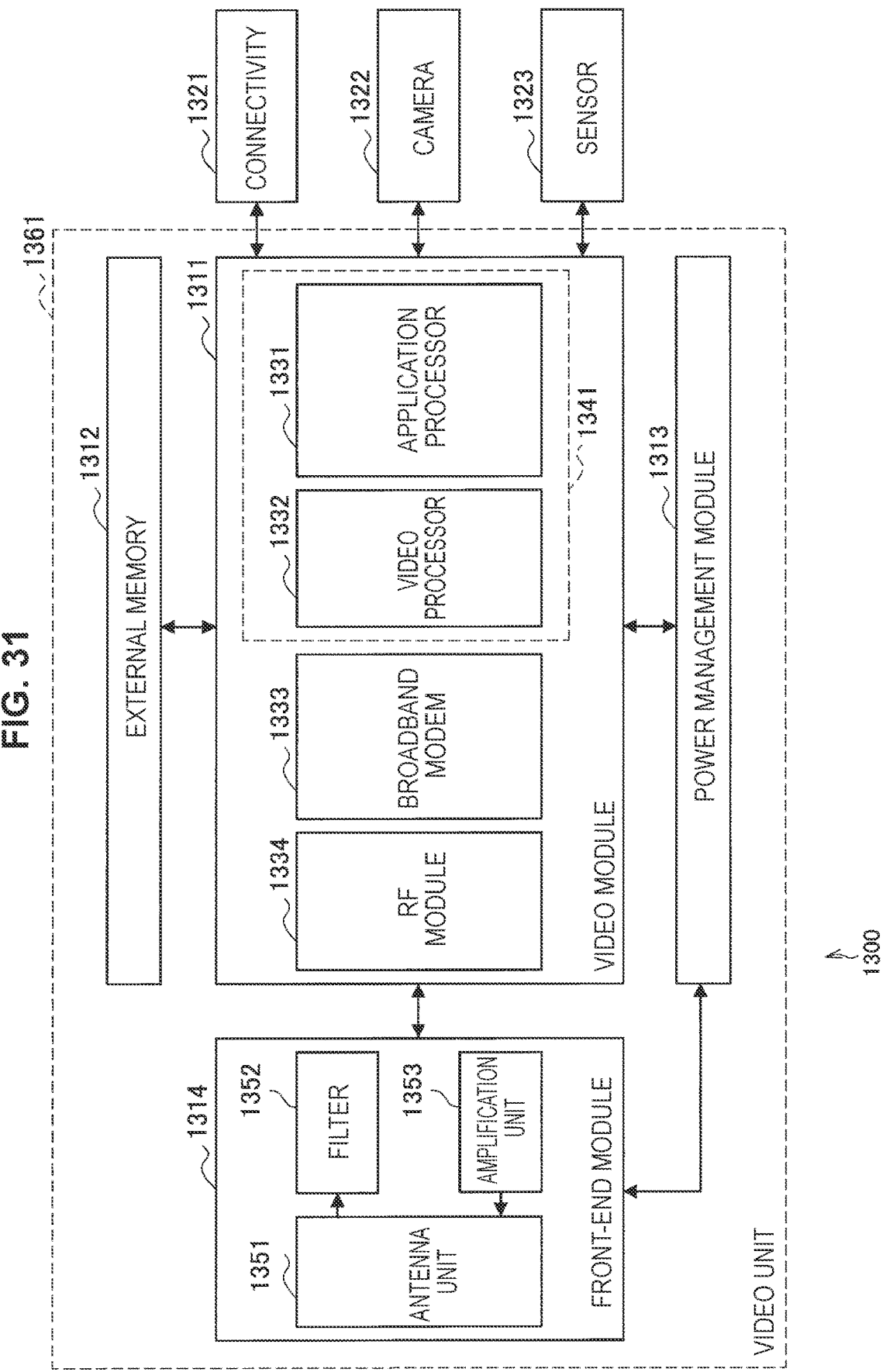
FIG. 31 is a block diagram illustrating one example of a schematic configuration of a video set.

Additionally, the present technology may also be implemented as any kind of configuration installed in any apparatus or an apparatus included in a system, such as a processor provided as a large-scale integration (LSI) chip or the like, a module that uses multiple processors or the like, a unit that uses multiple modules or the like, a set that further adds other functions to a unit (that is, a configuration of a part of an apparatus), or the like. FIG. 31 illustrates one example of a schematic configuration of a video set applying the present technology.

Recently, electronic devices are becoming more multifunctional, and in the development and manufacture of such electronic devices, in the case of implementing a partial configuration thereof for sale, offer, or the like, it has become commonplace not only to carry out the implementation as a configuration that includes a single function, but also to combine multiple configurations that include related functions and carry out the implementation as a single set including multiple functions.

The video set 1300 illustrated in FIG. 31 is such a multifunctional configuration, and is a combination of a device that includes functions related to image encoding and decoding (either one, or both) with a device that includes other functions related to such functions.

As illustrated in FIG. 31, the video set 1300 includes a module group such as a video module 1311, external memory 1312, a power management module 1313, and a front-end module 1314, and a device that includes related functions such as connectivity 1321, a camera 1322, and a sensor 1323.

A module is a part that collects several interrelated partial functions into a unified function. The specific physical configuration may be any configuration, but for example, it is conceivable to dispose and integrate multiple processors with respective functions, electronic circuit elements such as resistors and capacitors, other devices, and the like onto a circuit board or the like. It is also conceivable to combine a module with another module, processor, or the like to create a new module.

In the case of the example in FIG. 31, the video module 1311 is a combination of configurations that include functions related to image processing, and includes an application processor, a video processor, a broadband modem 1333, and an RF module 1334.

The processor is an integration of configurations having predetermined functions into a semiconductor chip as a system on a chip (SoC), and may also be designated a large-scale integration (LSI) chip or the like, for example. The configurations having predetermined functions may be logic circuits (hardware configurations), but may also be a CPU, ROM, RAM, and the like as well as a program executed using these (software configurations), and may also be a combination of both. For example, a processor may include logic circuits and CPU, ROM, RAM, and the like, and may be configured to realize a subset of the functions with the logic circuits (hardware configurations) while realizing other functions with programs (software configurations) executed on the CPU.

The application processor 1331 in FIG. 31 is a processor that executes an application related to image processing. To realize a predetermined function, the application executed in the application processor 1331 is able to not only execute computational processing, but is also able to control configurations inside and outside the video module 1311, such as the video processor 1332, for example, as necessary.

The video processor 1332 is a processor that includes functions related to image encoding/decoding (either one, or both).

The broadband modem 1333 performs digital modulation and the like to convert data (a digital signal) transmitted by wired or wireless (or both) broadband communication performed over a broadband connection such as the Internet or the public telephone network into an analog signal, and also performs demodulation to convert an analog signal received by such broadband communication into data (a digital signal). The broadband modem 1333 processes any kind of information, such as image data processed by the video processor 1332, a stream in which image data is encoded, application programs, and settings data, for example.

The RF module 1334 is a module that performs frequency conversion, modulation/demodulation, amplification, filter processing, and the like on radio frequency (RF) signals transmitted and received through an antenna. For example, the RF module 1334 generates an RF signal by performing frequency conversion and the like on a baseband signal generated by the broadband modem 1333. Also, for example, the RF module 1334 generates a baseband signal by performing frequency conversion and the like on an RF signal received via the front-end module 1314.

Note that as illustrated by the dashed line 1341 in FIG. 31, the application processor 1331 and the video processor 1332 may also be unified and configured as a single processor.

The external memory 1312 is a module provided externally to the video module 1311 that includes a storage device utilized by the video module 1311. The storage device of the external memory 1312 may be realized by any kind of physical configuration, but since the storage device typically is used to store large amounts of data such as image data in units of frames, it is desirable to realize the storage device with relatively inexpensive and high-capacity semiconductor memory such as dynamic random access memory (DRAM), for example.

The power management module 1313 manages and controls the supply of power to the video module 1311 (each configuration inside the video module 1311).

The front-end module 1314 is a module that provides a front-end function (a circuit on the antenna-side transmit/receive port) to the RF module 1334. As illustrated in FIG. 31, the front-end module 1314 includes an antenna unit 1351, a filter 1352, and an amplification unit 1353, for example.

The antenna unit 1351 includes an antenna that transmits and receives wireless signals, and a peripheral configuration thereof. The antenna unit 1351 transmits a signal supplied from the amplification unit 1353 as a wireless signal, and supplies a received wireless signal to the filter 1352 as an electric signal (RF signal). The filter 1352 performs filter processing and the like on the RF signal received through the antenna unit 1351, and supplies the processed RF signal to the RF module 1334. The amplification unit 1353 amplifies and supplies the RF signal supplied from the RF module 1334 to the antenna unit 1351.

The connectivity 1321 is a module that includes functions related to external connections. The physical configuration of the connectivity 1321 may be any configuration. For example, the connectivity 1321 includes a configuration having a communication function other than the communication standard supporting by the broadband modem 1333, an external input/output terminal, or the like.

For example, the connectivity 1321 may include a module having a communication function conforming to a wireless communication standard such as Bluetooth®, IEEE 802.11 (for example, Wireless Fidelity (Wi-Fi®, near field communication (NFC), or Infrared Data Association (IrDA), and an antenna or the like that transmits and receives signals conforming to the standard. Also, for example, the connectivity 1321 may include a module having a communication function conforming to a wired communication function such as Universal Serial Bus (USB) or High-Definition Multimedia Interface (HDMI)(registered trademark), and a port conforming to the standard. Furthermore, for example, the connectivity 1321 may include a function of transmitting another kind of data (signal), such as an analog input/output terminal.

Note that the connectivity 1321 may include the transmission destination device of the data (signal). For example, the connectivity 1321 may include a drive (not only a drive for removable media, hut also including a hard disk, a solid-state drive (SSD), network-attached storage (NAS), and the like) that reads and writes data with respect to a recording medium such as a magnetic disk, an optical disc, a magneto-optical disc, or semiconductor memory. Also, the connectivity 1321 may include devices (such as a monitor and a speaker) that output images and sound.

The camera 1322 is a module that has a function of imaging a subject and obtaining image data of the subject. The image data obtained by the imaging by the camera 1322 is supplied to the video processor 1332 and encoded, for example.

The sensor 1323 is a module having any type of sensor function, such as a sound sensor, an ultrasonic sensor, a light sensor, an illumination sensor, an infrared sensor, an image sensor, a rotation sensor, an angle sensor, an angular velocity sensor, a speed sensor, an acceleration sensor, an inclination sensor, a magnetic field sensor, a shock sensor, or a temperature sensor, for example. Data detected by the sensor 1323 is supplied to the application processor 1331 and utilized by an application and the like, for example.

The configurations described as a module above may also be realized as a processor, while conversely, the configurations described as a processor may also be realized as a module.

In the video set 1300 with a configuration like the above, the present technology can be applied to the video processor 1332 as described later. Consequently, the video set 1300 may be carried out as a set applying the present technology.
(Exemplary Configuration of Video Processor)

Figure 32:
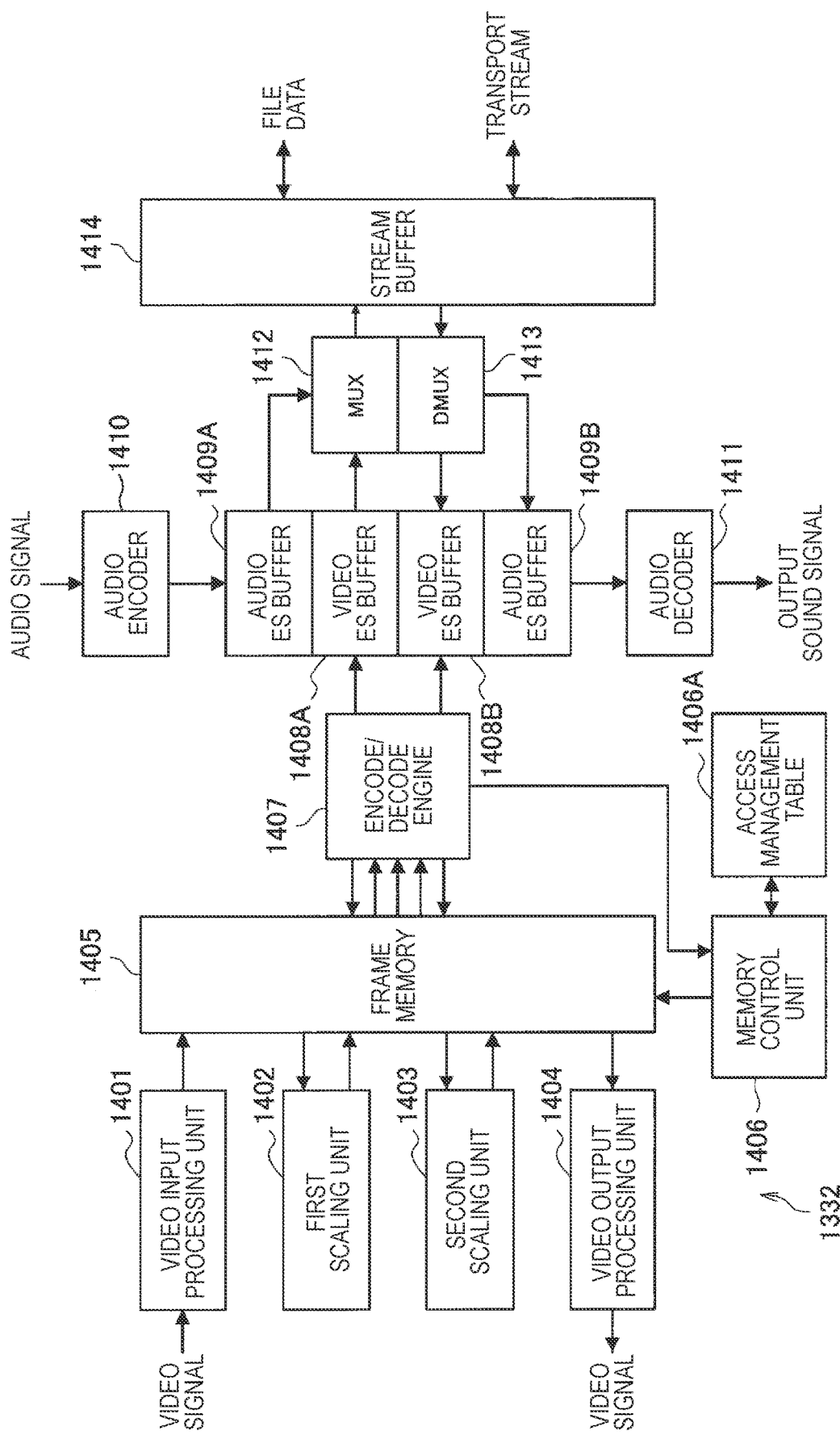
FIG. 32 is a block diagram illustrating one example of a schematic configuration of a video processor.

FIG. 32 illustrates one example of a schematic configuration of the video processor 1332 (FIG. 31) applying the present technology.

In the case of the example in FIG. 32, the video processor 1332 includes a function of receiving the input of a video signal and an audio signal and encoding these signals according to a predetermined method, and a function of decoding encoded video data and audio data, and reproducing and outputting a video signal and an audio signal.

As illustrated in FIG. 32, the video processor 1332 includes a video input processing unit 1401, a first image enlargement/reduction unit 1402, a second image enlargement/reduction unit 1403, a video output processing unit 1404, frame memory 1405, and a memory control unit 1406. Also, the video processor 1332 includes an encode/decode engine 1407, video elementary stream (ES) buffers 1408A and 1408B, and audio ES buffers 1409A and 1409B. Additionally, the video processor 1332 includes an audio encoder 1410, an audio decoder 1411, a multiplexer (MUX) 1412, a demultiplexer (DMUX) 1413, and a stream buffer 1414.

The video input processing unit 1401 acquires a video signal input from the connectivity 1321 (FIG. 31) or the like, for example, and converts the video signal into digital image data. The first image enlargement/reduction unit 1402 performs format conversion, image enlargement/reduction processing, and the like on the image data. The second image enlargement/reduction unit 1403 performs a process of enlarging or reducing the image according to the format at the destination to which to output through the video output processing unit 1404, format conversion and image enlargement/reduction processing similar to the first image enlargement/reduction unit 1402, and the like on the image data. The video output processing unit 1404 performs format conversion, conversion to an analog signal, and the like on the image data, and outputs the result to the connectivity 1321 for example as a reproduced video signal.

The frame memory 1405 is memory for image data shared by the video input processing unit 1401, the first image enlargement/reduction unit 1402, the second image enlargement/reduction unit 1403, the video output processing unit 1404, and the encode/decode engine 1407. The frame memory 1405 is realized as semiconductor memory such as DRAM, for example.

The memory control unit 1406 receives a synchronization signal from the encode/decode engine 1407, and controls the access and writes and reads to the frame memory 1405 in accordance with an access schedule of access to the frame memory 1405 written in an access management table 1406A. The access management table 1406A is updated by the memory control unit 1406 according to processes executed by the encode/decode engine 1407, the first image enlargement/reduction unit 1402, the second image enlargement/reduction unit 1403, and the like.

The encode/decode engine 1407 executes a process of encoding image data as well as a process of decoding a video stream, which is data in which image data is encoded. For example, the encode/decode engine 1407 encodes image data read from the frame memory 1405, and successively writes the encoded data to the video ES buffer 1408A as a video stream. Also, for example, the encode/decode engine 1407 successively reads and decodes a video stream from the video ES buffer 1408B, and writes the decoded data to the frame memory 1405 as image data. During this encoding and decoding, the encode/decode engine 1407 uses the frame memory 1405 as a work area. Also, the encode/decode engine 1407 outputs a synchronization signal to the memory control unit 1406 at the timing of starting the process for each macroblock, for example.

The video ES buffer 1408A buffers and supplies a video stream generated by the encode/decode engine 1407 to the multiplexer (MUX) 1412. The video ES buffer 1408B buffers and supplies a video stream supplied from the demultiplexer (DMUX) 1413 to the encode/decode engine 1407.

The audio ES buffer 1409A buffers and supplies an audio stream generated by the audio encoder 1410 to the multiplexer (MUX) 1412. The audio ES buffer 1409B buffers and supplies an audio stream supplied from the demultiplexer (DMUX) 1413 to the audio decoder 1411.

The audio encoder 1410 for example digitally converts an audio signal input from the connectivity 1321 or the like, for example, and encodes the audio signal according to a predetermined method such as the MPEG Audio method or the AudioCode number 3 (AC3) method, for example. The audio encoder 1410 successively writes an audio stream, which is data in which an audio signal is encoded, to the audio ES buffer 1409A. The audio decoder 1411 decodes an audio stream supplied from the audio ES buffer 1409B, performs conversion to an analog signal and the like, for example, and supplies the result to the connectivity 1321 and the like for example as a reproduced audio signal.

The multiplexer (MUX) 1412 multiplexes a video stream and an audio stream. The multiplexing method (that is, the format of the bit stream generated by multiplexing) may be any method. Additionally, during this multiplexing, the multiplexer (MUX) 1412 is also able to add predetermined header information or the like to the bit stream. In other words, the multiplexer (MUX) 1412 is able to convert the format of the streams by multiplexing. For example, by multiplexing a video stream and an audio stream, the multiplexer (MUX) 1412 converts the streams to a transport stream, which is a bit stream in a format for transmission. Also, for example, by multiplexing a video stream and an audio stream, the multiplexer (MUX) 1412 converts the streams to data (file data) in a file format for recording.

The demultiplexer (DMUX) 1413 demultiplexer a bit stream in which a video stream and an audio stream are multiplexed, according to a method corresponding to the multiplexed by the multiplexer (MUX) 1412. In other words, the demultiplexer (DMUX) 1413 extracts the video stream and the audio stream (separates the video stream and the audio stream) from a bit stream read out from the stream buffer 1414. In other words, the demultiplexer (DMUX) 1413 is able to convert the format of the stream by demultiplexing (an inverse conversion of the conversion by the multiplexer (MUX) 1412). For example, the demultiplexer (DMUX) 1413 is able to acquire a transport stream supplied from the connectivity 1321, the broadband modem 1333, or the like for example via the stream buffer 1414, and by demultiplexing, is able to convert the transport stream into a video stream and an audio stream. Also, for example, the demultiplexer (DMUX) 1413 is able to acquire file data read out from any of various types of recording media by the connectivity 1321, for example via the stream buffer 1414, and by demultiplexing, is able to convert the data into a video stream and an audio stream.

The stream buffer 1414 buffers a bit stream. For example, the stream buffer 1414 buffers a transport stream supplied from the multiplexer (MUX) 1412, and at a predetermined timing, or on the basis of an external request or the like, supplies the transport stream to the connectivity 1321, the broadband modem 1333, or the like, for example.

Also, for example, the stream buffer 1414 buffers file data supplied from the multiplexer (MUX) 1412, and at a predetermined timing, or on the basis of an external request or the like, supplies the file data to the connectivity 1321 or the like, for example, and causes the file data to be recorded on any of various types of recording media.

Furthermore, the stream buffer 1414 buffers a transport stream acquired via the connectivity 1321, the broadband modem 1333, and the like, for example, and at a predetermined timing, or on the basis of an external request or the like, supplies the transport stream to the demultiplexer (DMUX) 1413.

Additionally, the stream buffer 1414 buffers file data read out from any of various types of recording media in the connectivity 1321 or the like, for example, and at a predetermined timing, or on the basis of an external request or the like, supplies the file data to the demultiplexer (DMUX) 1413.

Next, an example of the operation of the video processor 1332 with such a configuration will be described. For example, a video signal input into the video processor 1332 from the connectivity 1321 or the like is converted to digital image data of a predetermined format such as 4:2:2 Y/Cb/Cr format in the video input processing unit 1401, and is successively written to the frame memory 1405. The digital image data is read out to the first image enlargement/reduction unit 1402 or the second image enlargement/reduction unit 1403, subjected to a format conversion to a predetermined format such as 4:2:0 Y/Cb/Cr or the like and an enlargement/reduction process, and again written to the frame memory 1405. The image data is encoded by the encode/decode engine 1407, and written to the video ES buffer 1408A as a video stream.

Also, an audio signal input into the video processor 1332 from the connectivity 1321 or the like is encoded by the audio encoder 1410, and written to the audio ES buffer 1409A as an audio stream.

The video stream in the video ES buffer 14084 and the audio stream in the audio ES buffer 1409A are read out and multiplexed by the multiplexer (MUX) 1412, and converted to a transport stream, file data, or the like. The transport stream generated by the multiplexer (MUX) 1412 is buffered in the stream buffer 1414, and then output to an external network via the connectivity 1321, the broadband modem 1333, or the like, for example. Also, the file data generated by the multiplexer (MUX) 1412 is buffered in the stream buffer 1414, and then output to the connectivity 1321 or the like, for example, and recorded to any of various types of recording media.

Also, a transport stream input into the video processor 1332 from an external network via the connectivity 1321, the broadband modem 1333, or the like for example is buffered in the stream buffer 1414, and then demultiplexed by the demultiplexer (MICA) 1413. Also, file data read out from any of various types of recording media in the connectivity 1321 or the like, for example, and input into the video processor 1332 is buffered in the stream buffer 1414, and then demultiplexed by the demultiplexer (DMUX) 1413. In other words, a transport stream or file data input into the video processor 1332 is separated into a video stream and an audio stream by the demultiplexer (DMUX) 1413.

The audio stream is supplied to the audio decoder 1411 via the audio ES buffer 1409B and decoded, and an audio signal is reproduced. Also, the video stream, after being written to the video ES buffer 1408B, is successively read out and decoded by the encode/decode engine 1407, and written to the frame memory 1405. The decoded image data is subjected to an enlargement/reduction process by the second image enlargement/reduction unit 1403, and written to the frame memory 1405. Subsequently, the decoded image data is read out to the video output processing unit 1404, format-converted to a predetermined format such as 4:2:2 Y/Cb/Cr format, additionally converted to an analog signal, and a video signal is reproduced and output.

In the case of applying the present technology to the video processor 1332 configured in this way, it is sufficient to apply the present technology according to the embodiments described above to the encode/decode engine 1407. In other words, for example, the encode/decode engine 1407 may include the functions of the image encoding apparatus 10 or the functions of the image decoding apparatus 60 described above, or both. With this arrangement, the video processor 1332 is able to obtain effects similar to each of the embodiments described above with reference to FIGS. 1 to 25.

Note that in the encode/decode engine 1407, the present technology (that is, the functions of the image encoding apparatus 10, the functions of the image decoding apparatus 60, or both) may be realized by hardware such as a logic circuit or the like, may be realized by software such as an embedded program, or may be realized by both of the above.

(Another Exemplary Configuration of Video Processor)

Figure 33:
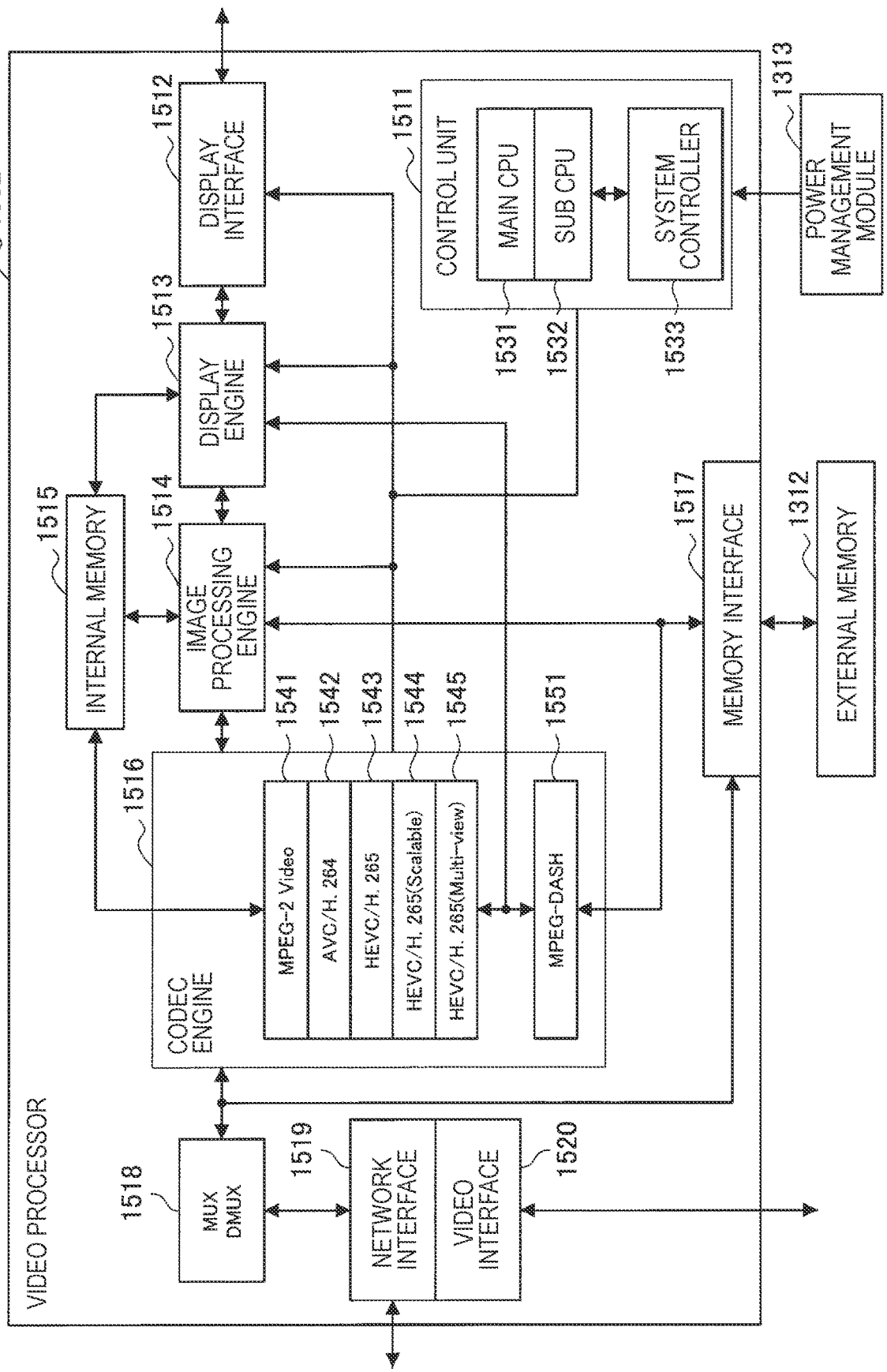
FIG. 33 is a block diagram illustrating another example of a schematic configuration of a video processor.

FIG. 33 illustrates another example of a schematic configuration of the video processor 1332 applying the present technology. In the case of the example in FIG. 33, the video processor 1332 includes a function of encoding/decoding video data according to a predetermined method.

More specifically, as illustrated in FIG. 33, the video processor 1332 includes a control unit 1511, a display interface 1512, a display engine 1513, an image processing engine 1514, and internal memory 1515. Also, the video processor 1332 includes a codec engine 1516, a memory interface 1517, a multiplexer/demultiplexer (MUX DMUX) 1518, a network interface 1519, and a video interface 1520.

The control unit 1511 controls the operation of each processing unit in the video processor 1332, such as the display interface 1512, the display engine 1513, the image processing engine 1514, and the codec engine 1516.

As illustrated in FIG. 33, the control unit 1511 includes a main CPU 1531, a sub CPU 1532, and a system controller 1533, for example. The main CPU 1531 executes a program or the like for controlling the operation of each processing unit in the video processor 1332. The main CPU 1531 generates control signals in accordance with the program or the like, and supplies the control signals to each processing unit (in other words, controls the operation of each processing unit). The sub CPU 1532 fulfills a supplementary role to the main CPU 1531. For example, the sub CPU 1532 executes child processes, subroutines, and the like of the program or the like executed by the main CPU 1531. The system controller 1533 controls the operations of the main CPU 1531 and the sub CPU 1532, such as specifying programs to be executed by the main CPU 1531 and the sub CPU 1532.

The display interface 1512, under control by the control unit 1511, outputs image data to the connectivity 1321 and the like, for example. For example, the display interface 1512 converts digital image data to an analog signal and outputs an analog signal, or outputs the digital image data directly, as a reproduced video signal to a monitor apparatus or the like of the connectivity 1321.

The display engine 1513, under control by the control unit 1511, performs various conversion processes such as format conversion, size conversion, and gamut conversion on the image data to match the hardware specs of the monitor apparatus or the like that is to display the image.

The image processing engine 1514, under control by the control unit 1511 performs predetermined image processing on the image data, such as filter processing for improving image quality, for example.

The internal memory 1515 is memory provided inside the video processor 1332, and shared by the display engine 1513, the image processing engine 1514, and the codec engine 1516. For example, the internal memory 1515 is used to exchange data between the display engine 1513, the image processing engine 1514, and the codec engine 1516. For example, the internal memory 1515 stores data supplied from the display engine 1513, the image processing engine 1514, or the codec engine 1516, and as necessary (for example, in response to a request), supplies the data to the display engine 1513, the image processing engine 1514, or the codec engine 1516. The internal memory 1515 may be realized by any kind of storage device, but since the storage device typically is used to store small amounts of data such as image data in units of blocks, parameters, and the like, it is desirable to realize the storage device with semiconductor memory that is relatively (for example, compared to the external memory 1312) small in capacity but has a fast response speed, such as static random access memory (SRAM), for example.

The codec engine 1516 executes processes related to the encoding and decoding of image data. The encoding/decoding method supported by the codec engine 1516 may be any method, and there may be one or multiple such methods. For example, the codec engine 1516 may be provided with a codec function for multiple encoding/decoding methods, and may be configured to encode or decode image data by selecting from among the multiple methods.

In the example illustrated in FIG. 33, the codec engine 1516 includes MPEG-2 Video 1541, AVC/H.264 1542, HEVC/H.265 1543, HEVC/H.265 (Scalable) 1544, HEVC/H.265 (Multi-view) 1545, and MPEG-DASH 1551 as function blocks of codec-related processing, for example.

The MPEG-2 Video 1541 is a function block that encodes and decodes image data according to the MPEG-2 method. The AVC/H.264 1542 is a function block that encodes and decodes image data according to the AVC method. The HEVC/H.265 1543 is a function block that encodes and decodes image data according to the HEVC method. The HEVC/H.265 (Scalable) 1544 is a function block that scalably encodes and scalably decodes image data according to the HEVC method. The HEVC/H.265 (Multi-view) 1545 is a function block that multi-view encodes and multi-view decodes image data according to the HEVC method.

The MPEG-DASH 1551 is a function block that transmits and receives image data according to the MPEG Dynamic Adaptive Streaming over HTTP (MPEG-DASH) method. MPEG-DASH is a technology that uses the Hypertext Transfer Protocol (HTTP) to stream video, one feature of which being that appropriate encoded data is selected and transmitted in units of segments from among multiple sets of encoded data having different resolutions or the like prepared in advance. The MPEG-DASH 1551 executes the generation, transmission control, and the like of a stream conforming to the standard, while for the encoding/decoding of image data, the MPEG-2 Video 1541 to the HEVC/H.265 (Multi-view) 1545 are used.

The memory interface 1517 is an interface for the external memory 1312. Data supplied from the image processing engine 1514 and the codec engine 1516 is supplied to the external memory 1312 through the memory interface 1517. Also, data read out from the external memory 1312 is supplied to the video processor 1332 (the image processing engine 1514 or the codec engine 1516) through the memory interface 1517.

The multiplexer/demultiplexer (MUX DMUX) 1518 multiplexes and demultiplexes various image-related data, such as a bit stream of encoded data, image data, a video signal, and the like. The multiplexing/demultiplexing method may be any method. For example, when multiplexing, the multiplexer/demultiplexer (MUX DMUX) 1518 is not only able to collect multiple pieces of data into a single piece of data, but also add predetermined header information and the like to the data. Also, when demultiplexing, the multiplexer/demultiplexer (MUX DMUX) 1518 is not only able to divide a single piece of data into multiple pieces of data, but also add predetermined header information and the like to each divided piece of data. In other words, the multiplexer/demultiplexer (MUX DMUX) 1518 is able to convert the format of data by multiplexing/demultiplexing. For example, by multiplexing a bit stream, the multiplexer/demultiplexer (MUX DMUX) 1518 is able to convert the bit stream to a transport stream, which is a bit stream in a format for transmission, or to data in a file format (file data) for recording. Obviously, by demultiplexing, the inverse conversion is also possible.

The network interface 1519 is an interface for the broadband modem 1333, the connectivity 1321, and the like, for example. The video interface 1520 is an interface for the connectivity 1321, the camera 1322, and the like, for example.

Next, an example of the operation of such a video processor 1332 will be described. For example, when a transport stream is received from an external network through the connectivity 1321, the broadband modem 1333, or the like, the transport stream is supplied to the multiplexer/demultiplexer (MUX DMUX) 1518 through the network interface 1519 and demultiplexed, and decoded by the codec engine 1516. The image data obtained by the decoding of the codec engine 1516 is, for example, subjected to predetermined image processing by the image processing engine 1514, subjected to a predetermined conversion by the display engine 1513, supplied to the connectivity 1321 or the like for example through the display interface 1512, and the image is displayed on a monitor. Also, for example, the image data obtained by the decoding of the codec engine 1516 is re-encoded by the codec engine 1516, multiplexed and converted to file data by the multiplexer/demultiplexer (MUX DMUX) 1518, output to the connectivity 1321 or the like for example through the video interface 1520, and recorded on any of various types of recording media.

Furthermore, for example, file data of encoded data in which image data is encoded that is read out from a recording medium not illustrated by the connectivity 1321 or the like is supplied to the multiplexer/demultiplexer (MUX DMUX) 1518 through the video interface 1520 and demultiplexed, and decoded by the codec engine 1516. The image data obtained by the decoding of the codec engine 1516 is subjected to predetermined image processing by the image processing engine 1514, subjected to a predetermined conversion by the display engine 1513, supplied to the connectivity 1321 or the like for example through the display interface 1512, and the image is displayed on a monitor. Also, for example, the image data obtained by the decoding of the codec engine 1516 is re-encoded by the codec engine 1516, multiplexed and converted to a transport stream by the multiplexer/demultiplexer (MUX DMUX) 1518, supplied to the connectivity 1321, the broadband modem 1333, or the like for example through the network interface 1519, and transmitted to another apparatus not illustrated.

Note that the exchange of image data and other data between each of the processing units inside the video processor 1332 is performed by utilizing the internal memory 1515 and the external memory 1312, for example. Additionally, the power management module 1313 controls the supply of power to the control unit 1511, for example.

In the case of applying the present technology to the video processor 1332 configured in this way, it is sufficient to apply the present technology according to the embodiments described above to the codec engine 1516. In other words, for example, it is sufficient for the codec engine 1516 to include the functions of the image encoding apparatus 10 or the functions of the image decoding apparatus 60 described above, or both. With this arrangement, the video processor 1332 is able to obtain effects similar to each of the embodiments described above with reference to FIGS. 1 to 25.

Note that in the codec engine 1516, the present technology (that is, the functions of the image encoding apparatus 10) may be realized by hardware such as a logic circuit or the like, may be realized by software such as an embedded program, or may be realized by both of the above.

The above illustrates two configurations of the video processor 1332 as examples, but the configuration of the video processor 1332 may be any configuration, and may be a configuration other than the two examples described above. Also, the video processor 1332 may be configured as a single semiconductor chip, but may also be configured as multiple semiconductor chips. For example, a three-dimensionally stacked LSI chip in which multiple semiconductors are stacked is possible. Also, a configuration realized by multiple LSI chips is possible.

(Example of Application to Apparatus)

The video set 1300 can be embedded into any of various types of apparatus that process image data. For example, the video set 1300 can be embedded into the television apparatus 900 (FIG. 27), the mobile telephone 920 (FIG. 28), the recording/reproducing apparatus 940 (FIG. 29), the imaging apparatus 960 (FIG. 30), and the like. By embedding the video set 1300, the apparatus is able to obtain effects similar to each of the embodiments described above with reference to FIGS. 1 to 25.

Note that as long as the video processor 1332 is included, even a part of each configuration of the video set 1300 described above can be carried out as a configuration applying the present technology. For example, it is possible to carry out only the video processor 1332 as a video processor applying the present technology. Also, for example, the processor illustrated by the dashed line 1341 as described above, the video module 1311, and the like can be carried out as a processor, module, or the like applying the present technology. Furthermore, for example, the video module 1311, the external memory 1312, the power management module 1313, and the front-end module 1314 can also be combined and carried out as a video unit 1361 applying the present technology. With any of these configurations, it is possible to obtain effects similar to each of the embodiments described above with reference to FIGS. 1 to 25.

In other words, as long as the video processor 1332 is included, any type of configuration can be embedded into any of various types of apparatus that process image data, similarly to the case of the video set 1300. For example, the video processor 1332, the processor illustrated by the dashed line 1341, the video module 1311, or the video unit 1361 can be embedded into the television apparatus 900 (FIG. 27), the mobile telephone 920 (FIG. 28), the recording/reproducing apparatus 940 (FIG. 29), the imaging apparatus 960 (FIG. 30), and the like. Additionally, by embedding any configuration applying the present technology, the apparatus is able to obtain effects similar to each of the embodiments described above with reference to FIGS. 1 to 25, similarly to the video set 1300.

(6) Sixth Application Example: Network System

Figure 34:
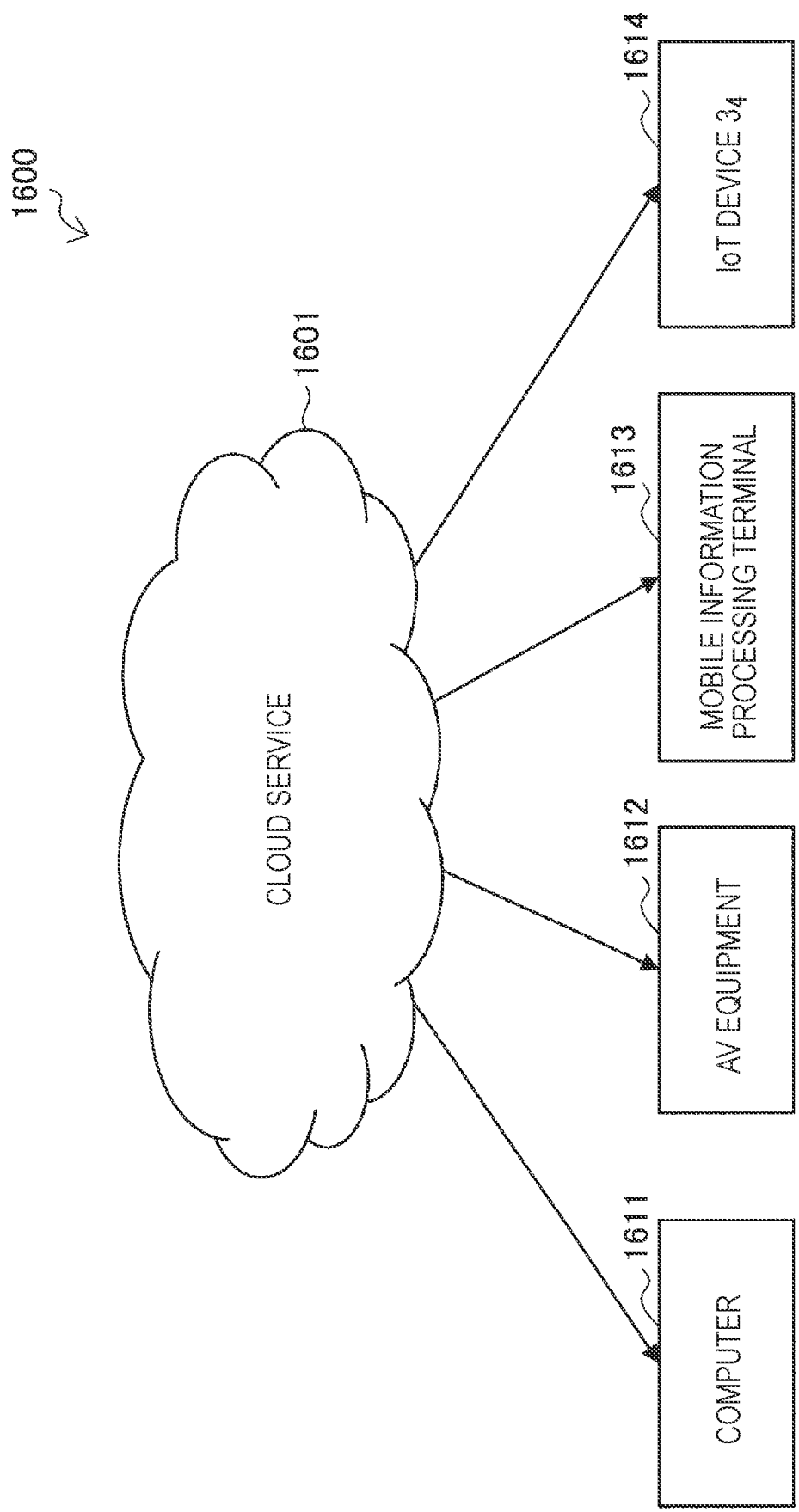
FIG. 34 is a block diagram illustrating one example of a schematic configuration of a network system.

Additionally, the present technology is also applicable to a network system that includes multiple apparatus. FIG. 34 illustrates one example of a schematic configuration of a network system applying the present technology.

The network system 1600 illustrated in FIG. 34 is a system in which devices exchange information related to images (moving images) with each other over a network. The cloud service 1601 of the network system 1600 is a system that provides a service related to images (moving images) to terminals such as a computer 1611, audio-visual (AV) equipment 1612, a mobile information processing terminal 1613, and an Internet of Things (IoT) device 1614 communicably connected to the cloud service 1601. For example, the cloud service 1601 provides a service of supplying image (moving image) content to terminals, like what is called video streaming (on-demand or live streaming). As another example, the cloud service 1601 provides a backup service that receives and stores image (moving image) content from terminals. As another example, the cloud service 1601 provides a service of mediating the exchange of image (moving image) content between terminals.

The physical configuration of the cloud service 1601 may be any configuration. For example, the cloud service 1601 may include various servers, such as a server that saves and manages moving images, a server that delivers moving images to terminals, a server that acquires moving images from terminals, and a server that manages users (terminals) and payments, as well as any type of network, such as the Internet or a LAN.

The computer 1611 includes an information processing apparatus such as a personal computer, server, or workstation, for example. The AV equipment 1612 includes image processing apparatus such as a television receiver, a hard disk recorder, a game console, or a camera, for example. The mobile information processing terminal 1613 includes a mobile information processing apparatus such as a notebook personal computer, a tablet terminal, a mobile telephone, or a smartphone, for example. The IoT device 1614 includes any object that executes image-related processing, such as a machine, an electric appliance, a piece of furniture, some other thing, an IC tag, or a card-shaped device, for example. These terminals all include a communication function, and are able to connect to (establish a session with) the cloud service 1601 and exchange information with (that is, communicate with) the cloud service 1601. Also, each terminal is also able to communicate with another terminal. Communication between terminals may be performed by going through the cloud service 1601, or may be performed without going through the cloud service 1601.

When the present technology is applied to the network system 1600 as above, and image (moving image) data is exchanged between terminals or between a terminal and the cloud service 1601, the image data may be encoded/decoded as described above in each of the embodiments. In other words, the terminals (from the computer 1611 to the IoT device 1614) and the cloud service 1601 each may include the functions of the image encoding apparatus 10 and the image decoding apparatus 60 described above. With this arrangement, it becomes possible to apply a more appropriate filter in the deblocking filter process.

6. Conclusion

As described above, the embodiment of the present disclosure makes it possible to apply a more appropriate filter in the deblocking filter process.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, control information related to the present technology described in the above embodiments may be transmitted from the encoding side to the decoding side. For example, control information that controls whether or not to allow (or deny) the application of the present technology described above may be transmitted. Also, for example, control information that specifies an upper limit, a lower limit, or both of a block size that allows (or denies) the application of the present technology described above may be transmitted.

Also, the foregoing embodiment describes an example in which the filter strength determination section 120 determines whether or not to apply the extended strong filter to a block boundary in units of four lines, but the present technology is not limited to such an example. For example, the filter strength determination section 120 may determine whether or not to apply the extended strong filter to the block boundary in units of one line. According to such a configuration, a more appropriate filter is more likely to be applied. In particular, since the extended strong filter is a powerful filter with a wider application range than the existing filters, by making the determination finely in units of one line, it becomes possible to avoid applying the powerful extended strong filter improperly.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An image processing apparatus including: a decoding section configured to decode an encoded stream to generate a decoded image;

a determination section configured to determine whether to apply an extended strong filter, which is applied in an extended application range in which an application range of a deblocking filter is extended, to pixels positioned near a block boundary of the decoded image generated by the decoding section, in accordance with a state of pixels included in the extended application range; and a filtering section configured to apply the extended strong filter to pixels for which the determination section determines to apply the extended strong filter.

(2)

The image processing apparatus according to (1), in which the determination section references the pixels included in the extended application range to determine whether to apply the extended strong filter.

(3)

The image processing apparatus according to (1) or (2), in which the determination section determines whether to apply a strong filter having a narrower application range than the extended strong filter to pixels for which the determination section determines not to apply the extended strong filter.

(4)

The image processing apparatus according to (1) or (2), in which the determination section determines whether to apply the extended strong filter on each side based on the block boundary.

(5)

The image processing apparatus according to (4), in which the determination section determines whether to apply the extended strong filter on each side of the block boundary in a case in which a determination condition related to a strong filter having a narrower application range than the extended strong filter is satisfied.

(6)

The image processing apparatus according to any one of (1) to (5), in which the filtering section applies the extended strong filter having filter coefficients obtained by combining filter coefficients related to a low-frequency component and filter coefficients related to a high-frequency component.

(7)

The image processing apparatus according to (6), in which the filter coefficients related to the low-frequency component are filter coefficients with strong low-frequency characteristics.

(8)

The image processing apparatus according to (1), in which the filtering section applies an asymmetric extended strong filter in which a tap shape of the filter is asymmetric.

(9)

The image processing apparatus according to any one of (1) to (8), in which the determination section performs a continuity determination process that determines a continuity of pixel values included in the extended application range in accordance with a condition in which the pixels to use when determining the continuity of pixel values included in the extended application range are extended continuously.

(10)

The image processing apparatus according to (8), in which the determination section independently performs a continuity determination process that determines a continuity of pixel values included in the extended application range according to a state of the block boundary.

(11)

The image processing apparatus according to any one of (1) to (10), in which the block boundary is a boundary between blocks partitioned recursively in accordance with a combination of a quadtree structure and a binary tree.

(12)

An image processing method including:

decoding an encoded stream to generate a decoded image;

determining whether to apply an extended strong filter, which is applied in an extended application range in which an application range of a deblocking filter is extended, to pixels positioned near a block boundary of the generated decoded image, in accordance with a state of pixels included in the extended application range; and applying the extended strong filter to pixels for which it is determined to apply the extended strong filter.

(13)

An image processing apparatus including:

a determination section configured to determine whether to apply an extended strong filter, which is applied in an extended application range in which an application range of a deblocking filter applied to pixels positioned near a block boundary of a locally-decoded decoded image is extended, to pixels positioned near the block boundary of the decoded image, in accordance with a state of pixels included in the extended application range;

a filtering section configured to apply the extended strong filter to pixels for which the determination section determines to apply the extended strong filter; and an encoding section configured to encode an image using the decoded image to which the filtering section has applied the extended strong filter.

(14)

An image processing method including:
  determining whether to apply an extended strong filter, which is applied in an extended application range in which an application range of a deblocking filter applied to pixels positioned near a block boundary of a locally-decoded decoded image is extended, to pixels positioned near the block boundary of the decoded image, in accordance with a state of pixels included in the extended application range;
  applying the extended strong filter to pixels for which it is determined to apply the extended strong filter; and
  encoding an image using the decoded image to which the extended strong filter has been applied.

REFERENCE SIGNS LIST 10 image encoding apparatus
11 re-ordering buffer
12 control section
13 subtraction section
14 orthogonal transform section
15 quantization section
16 lossless encoding section
17 accumulation buffer
18 rate control section
21 inverse quantization section
22 inverse orthogonal transform section
23 addition section
24 deblocking filter
25 SAO filter
26 frame memory
27 switch
28 mode setting section
30 intra-prediction section
40 inter-prediction section
60 image decoding apparatus
61 accumulation buffer
62 lossless decoding section
63 inverse quantization section
64 inverse orthogonal transform section
65 addition section
67 SAO filter
68 re-ordering buffer
69 D/A conversion section
70 frame memory
71 selector
80 intra-prediction section
90 inter-prediction section
110 application need determination section
120 filter strength determination section
130 filtering section

The invention claimed is:

1. An image processing apparatus comprising:
  a decoding section configured to decode an encoded stream to generate a decoded image;
  a determination section configured to determine whether to apply an extended strong filter, which is applied in an extended application range in which an application range of a deblocking filter is extended, to pixels positioned adjacent to a block boundary of the decoded image generated by the decoding section, in accordance with a state of pixels included in the extended application range; and
  a filtering section configured to apply the extended strong filter to pixels for which the determination section determines to apply the extended strong filter,
  wherein the determination section determines, based on a number of the pixels included in one block on one side of the block boundary and a number of the pixels included in another block on another side of the block boundary, whether to apply the extended strong filter on the one side of the block boundary independent of whether to apply the extended strong filter on the another side of the block boundary, and
  wherein the decoding section, the determination section, and the filtering section are each implemented via at least one processor.

2. The image processing apparatus according to claim 1, wherein
  the determination section references the pixels included in the extended application range to determine whether to apply the extended strong filter.

3. The image processing apparatus according to claim 1, wherein
  the determination section determines whether to apply a strong filter having a narrower application range than the extended strong filter to pixels for which the determination section determines not to apply the extended strong filter.

4. The image processing apparatus according to claim 1, wherein
  the determination section determines whether to apply the extended strong filter on the one side of the block boundary independent of whether to apply the extended strong filter on the another side of the block boundary in a case in which a determination condition related to a strong filter having a narrower application range than the extended strong filter is satisfied.

5. The image processing apparatus according to claim 1, wherein
  the filtering section applies the extended strong filter having filter coefficients obtained by combining filter coefficients related to a low-frequency component and filter coefficients related to a high-frequency component.

6. The image processing apparatus according to claim 5, wherein
  the filter coefficients related to the low-frequency component are filter coefficients with strong low-frequency characteristics.

7. The image processing apparatus according to claim 1, wherein
  the filtering section applies an asymmetric extended strong filter in which a tap shape of the filter is asymmetric.

8. The image processing apparatus according to claim 1, wherein
  the determination section performs a continuity determination process that determines a continuity of pixel values included in the extended application range in accordance with a condition in which the pixels to use when determining the continuity of pixel values included in the extended application range are extended continuously.

9. The image processing apparatus according to claim 7, wherein
  the determination section independently performs a continuity determination process that determines a continuity of pixel values included in the extended application range according to a state of the block boundary.

10. The image processing apparatus according to claim 1, wherein the block boundary is a boundary between blocks partitioned recursively in accordance with a combination of a quadtree structure and a binary tree.

11. An image processing method comprising:
- decoding an encoded stream to generate a decoded image;
- determining whether to apply an extended strong filter, which is applied in an extended application range in which an application range of a deblocking filter is extended, to pixels positioned adjacent to a block boundary of the generated decoded image, in accordance with a state of pixels included in the extended application range;
- determining, based on a number of the pixels included in one block on one side of the block boundary and a number of the pixels included in another block on another side of the block boundary, whether to apply the extended strong filter on the one side of the block boundary independent of whether to apply the extended strong filter on the another side of the block boundary; and
- applying the extended strong filter to pixels for which it is determined to apply the extended strong filter.

12. The image processing apparatus according to claim 1, wherein in a case a boundary between an object of the decoded image and a background exists only adjacent to the one side, the determination section determines to not apply the extended strong filter on the one side of the block boundary and to apply the extended strong filter on the another side of the block boundary.

13. The image processing apparatus according to claim 1, wherein in a case the number of the pixels included in the one block on the one side of the block boundary is larger than the number of the pixels included in the another block on the another side of the block boundary, the determination section determines to apply the extended strong filter on the one side of the block boundary.

14. A non-transitory computer-readable medium having embodied thereon a program, which when executed by a computer causes the computer to execute a method, the method comprising:
- decoding an encoded stream to generate a decoded image;
- determining whether to apply an extended strong filter, which is applied in an extended application range in which an application range of a deblocking filter is extended, to pixels positioned adjacent to a block boundary of the generated decoded image, in accordance with a state of pixels included in the extended application range;
- determining, based on a number of the pixels included in one block on one side of the block boundary and a number of the pixels included in another block on another side of the block boundary, whether to apply the extended strong filter on the one side of the block boundary independent of whether to apply the extended strong filter on the another side of the block boundary; and
- applying the extended strong filter to pixels for which it is determined to apply the extended strong filter.

* * * * *